United States Patent
Hyde et al.

(10) Patent No.: US 9,056,556 B1
(45) Date of Patent: Jun. 16, 2015

(54) SYSTEM AND METHOD FOR CONFIGURATION AND MANAGEMENT OF AN ENERGY STORAGE SYSTEM FOR A VEHICLE

(71) Applicant: Elwha LLC, Bellevue, WA (US)

(72) Inventors: Roderick A. Hyde, Redmond, WA (US); Jordin T. Kare, Seattle, WA (US); David B. Tuckerman, Lafayette, CA (US); Thomas Allan Weaver, San Mateo, CA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 0 days.

(21) Appl. No.: 14/188,890

(22) Filed: Feb. 25, 2014

(51) Int. Cl.
    B60L 11/18 (2006.01)
(52) U.S. Cl.
    CPC ......... B60L 11/1851 (2013.01); B60L 11/1868 (2013.01); *B60L 2240/72* (2013.01); *B60L 2240/70* (2013.01)
(58) Field of Classification Search
    CPC ............ B60L 2240/70; B60L 2240/72; B60L 11/1851; B60L 11/1868
    USPC ............... 701/123, 22, 29.1, 29.3, 29.6, 31.4, 701/34.4
    See application file for complete search history.

(56) References Cited

U.S. PATENT DOCUMENTS

| | | | |
|---|---|---|---|
| 4,056,764 A * | 11/1977 | Endo et al. | 320/101 |
| 4,066,936 A | 1/1978 | Hirota | |
| 5,612,606 A * | 3/1997 | Guimarin et al. | 320/109 |
| 5,670,266 A | 9/1997 | Thomas et al. | |
| 5,701,068 A | 12/1997 | Baer et al. | |
| 5,883,496 A | 3/1999 | Esaki et al. | |
| 5,898,282 A | 4/1999 | Drozdz et al. | |
| 6,331,365 B1 | 12/2001 | King | |
| 6,344,732 B2 | 2/2002 | Suzuki | |
| 6,622,804 B2 | 9/2003 | Schmitz et al. | |
| 6,778,894 B2 | 8/2004 | Beck et al. | |
| 6,985,799 B2 * | 1/2006 | Zalesski et al. | 700/286 |
| 7,049,792 B2 | 5/2006 | King | |
| 7,102,496 B1 | 9/2006 | Ernst, Jr. et al. | |
| 7,115,332 B2 | 10/2006 | Tanjou | |
| 7,120,520 B2 * | 10/2006 | Seto et al. | 700/297 |
| 7,206,672 B2 | 4/2007 | Mueller | |
| 7,206,704 B2 * | 4/2007 | Quint et al. | 702/63 |

(Continued)

FOREIGN PATENT DOCUMENTS

WO    WO2011130885 A1    10/2011

*Primary Examiner* — Tuan C. To
*Assistant Examiner* — Dale W Hilgendorf
(74) *Attorney, Agent, or Firm* — Foley & Lardner LLP

(57) ABSTRACT

A system and method for management of an energy storage system for a vehicle is disclosed. The energy storage system may comprise a battery system for a vehicle such as an electric vehicle or hybrid-electric vehicle. Vehicles may be in a group or fleet. The management system may be configured to use data and information available from data sources over a network or by instrumentation/sensors for vehicle systems. Data and information could be used in a system to manage the configuration and operation of the energy storage system and components, manage/control inventory and use/life-cycle of components, and/or aggregated/analyzed in analytics function for system and components. Predictive control of the battery system may be implemented through a management system using data sources external to the vehicle. Inventive concepts and features of the systems and methods are indicated in the specification and FIGURES.

30 Claims, 35 Drawing Sheets

(56) References Cited

U.S. PATENT DOCUMENTS

| | | |
|---|---|---|
| 7,313,404 B2 | 12/2007 | Anderson |
| 7,360,615 B2 | 4/2008 | Salman et al. |
| 7,415,333 B2 | 8/2008 | Anderson |
| 7,647,788 B2 | 1/2010 | Okuda et al. |
| 8,116,915 B2 | 2/2012 | Kempton |
| 8,179,245 B2 | 5/2012 | Chander et al. |
| 8,180,512 B2 * | 5/2012 | Kelty et al. ............. 701/22 |
| 8,307,223 B2 | 11/2012 | Tae et al. |
| 8,340,849 B2 | 12/2012 | Amano et al. |
| 8,341,449 B2 | 12/2012 | Daniel et al. |
| 8,345,098 B2 | 1/2013 | Grigsby et al. |
| 8,358,046 B2 | 1/2013 | Platon |
| 8,359,133 B2 | 1/2013 | Yu et al. |
| 8,360,181 B2 | 1/2013 | Wei et al. |
| RE43,956 E | 2/2013 | King et al. |
| 8,373,949 B2 | 2/2013 | Bourgeau |
| 8,374,740 B2 | 2/2013 | Druenert et al. |
| 8,381,849 B2 * | 2/2013 | Sastry et al. .............. 903/907 |
| 8,392,882 B2 | 3/2013 | Harris et al. |
| 8,400,507 B2 | 3/2013 | Grigsby et al. |
| 8,412,406 B2 | 4/2013 | Johnson et al. |
| 8,463,563 B2 | 6/2013 | Tae et al. |
| 8,495,407 B2 | 7/2013 | Watanabe |
| 8,515,607 B2 | 8/2013 | Amano et al. |
| 8,543,287 B2 | 9/2013 | Stevens et al. |
| 8,560,155 B2 | 10/2013 | Kedar-Dongarkar et al. |
| 8,630,761 B2 | 1/2014 | Severinsky et al. |
| 8,727,049 B1 | 5/2014 | Rosen |
| 8,820,444 B2 | 9/2014 | Nguyen |
| 2002/0188387 A1 * | 12/2002 | Woestman et al. ........ 701/22 |
| 2004/0074682 A1 | 4/2004 | Fussey et al. |
| 2005/0062455 A1 * | 3/2005 | Stavely et al. ............ 320/106 |
| 2005/0228553 A1 * | 10/2005 | Tryon ........................ 701/22 |
| 2006/0238033 A1 | 10/2006 | Raiser et al. |
| 2008/0021628 A1 | 1/2008 | Tryon |
| 2009/0012664 A1 | 1/2009 | Christ |
| 2009/0155673 A1 | 6/2009 | Northcott |
| 2010/0094496 A1 * | 4/2010 | Hershkovitz et al. ........ 701/22 |
| 2010/0250043 A1 | 9/2010 | Scheucher |
| 2010/0258063 A1 | 10/2010 | Thompson |
| 2011/0022254 A1 | 1/2011 | Johas Teener et al. |
| 2011/0043355 A1 | 2/2011 | Chander et al. |
| 2011/0061958 A1 * | 3/2011 | Morgan ...................... 180/68.5 |
| 2011/0066308 A1 | 3/2011 | Yang et al. |
| 2011/0112781 A1 * | 5/2011 | Anderson et al. ............. 702/63 |
| 2011/0136026 A1 | 6/2011 | Betts et al. |
| 2011/0153140 A1 * | 6/2011 | Datta et al. .................... 701/29 |
| 2011/0184677 A1 | 7/2011 | Tae et al. |
| 2011/0213521 A1 | 9/2011 | Ito et al. |
| 2011/0258471 A1 | 10/2011 | Daniel et al. |
| 2011/0270487 A1 | 11/2011 | Dickinson et al. |
| 2011/0313613 A1 * | 12/2011 | Kawahara et al. ........... 320/134 |
| 2012/0019205 A1 | 1/2012 | Kressner et al. |
| 2012/0158228 A1 | 6/2012 | Biondo et al. |
| 2012/0158299 A1 | 6/2012 | Cerecke et al. |
| 2012/0256488 A1 | 10/2012 | Lim et al. |
| 2012/0299531 A1 * | 11/2012 | Prosser et al. ............... 320/104 |
| 2012/0299544 A1 | 11/2012 | Prosser et al. |
| 2012/0303397 A1 * | 11/2012 | Prosser ...................... 705/7.12 |
| 2012/0306268 A1 | 12/2012 | Fetzer et al. |
| 2013/0002023 A1 | 1/2013 | Liu et al. |
| 2013/0054080 A1 * | 2/2013 | Jacobson .................... 701/29.3 |
| 2013/0096753 A1 | 4/2013 | Severinsky et al. |
| 2013/0116868 A1 | 5/2013 | Erko et al. |
| 2013/0221928 A1 | 8/2013 | Kelty et al. |
| 2013/0241567 A1 | 9/2013 | Boehm et al. |
| 2013/0261914 A1 | 10/2013 | Ingram et al. |
| 2013/0275031 A1 | 10/2013 | Johnson et al. |
| 2013/0289815 A1 | 10/2013 | Suzuki |
| 2013/0342310 A1 * | 12/2013 | Park et al. ..................... 701/22 |
| 2014/0067183 A1 | 3/2014 | Sisk |
| 2014/0074386 A1 | 3/2014 | McGee et al. |
| 2014/0200756 A1 | 7/2014 | Sisk |
| 2014/0214267 A1 | 7/2014 | Sellschopp |

\* cited by examiner

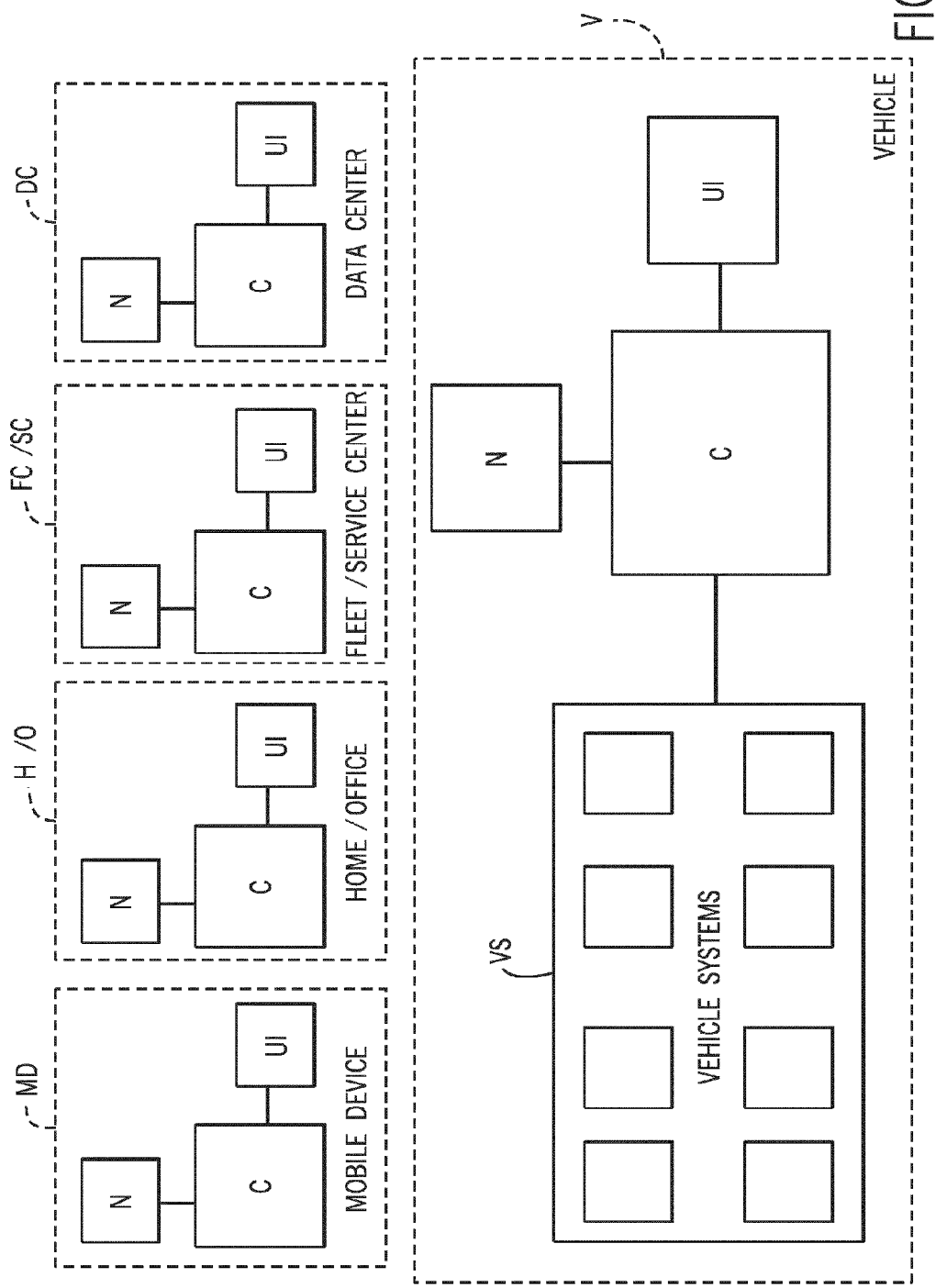

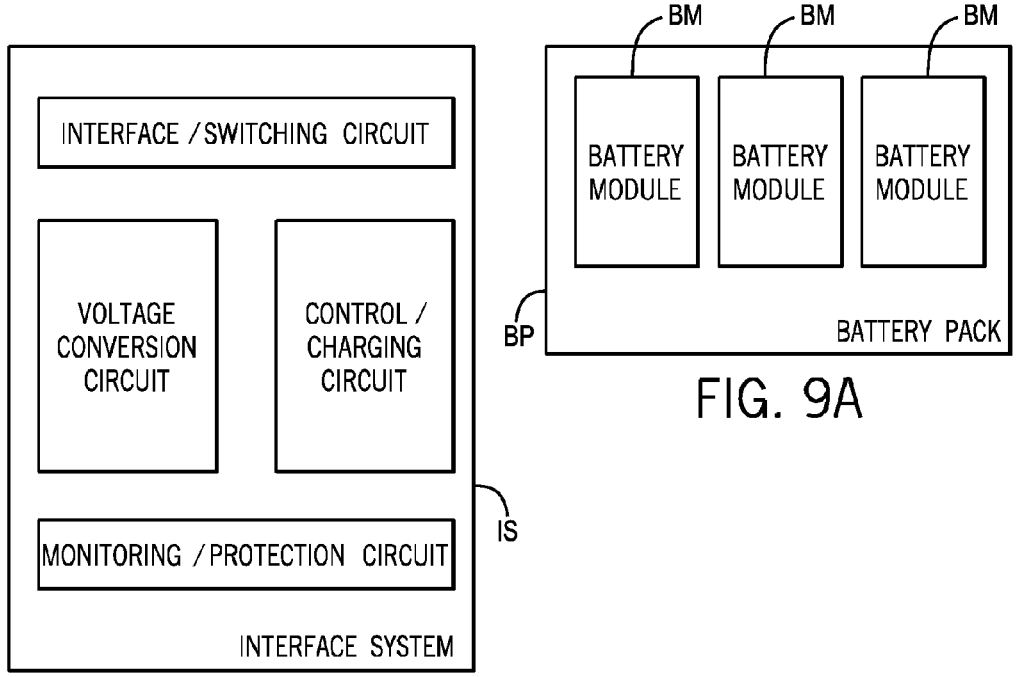
FIG. 8
FIG. 9A
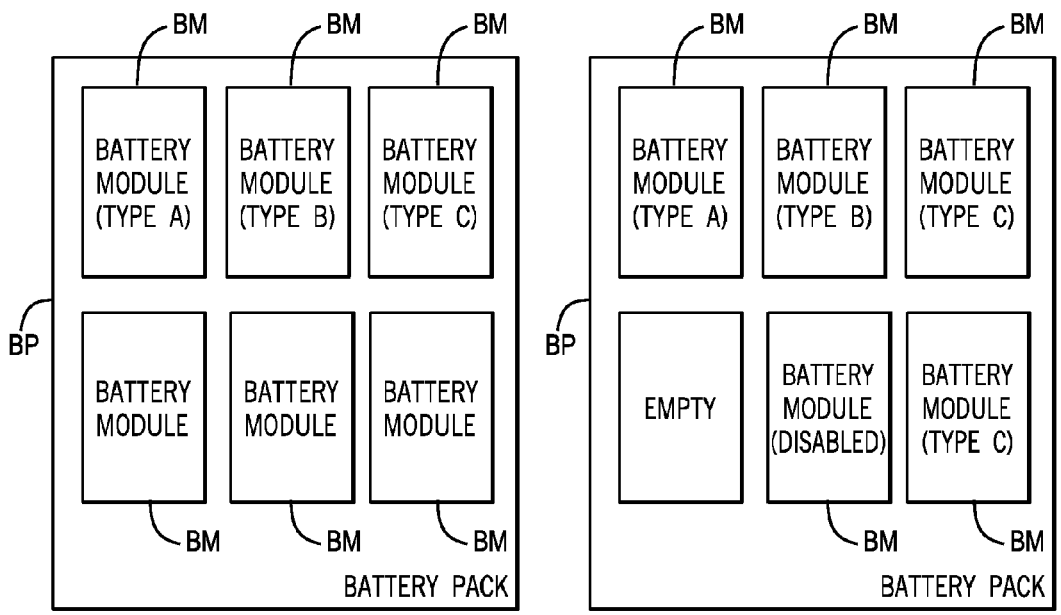
FIG. 9B
FIG. 9C

SYSTEM AND METHOD FOR CONFIGURATION AND MANAGEMENT OF AN ENERGY STORAGE SYSTEM FOR A VEHICLE

FIELD

The present invention relates to vehicles with vehicle systems such as an energy storage system. The present invention also relates to a system and method for configuration and management of a vehicle system such as an energy storage system. The present invention further relates a system and method for configuration and management of a vehicle system such as an energy storage system having modular components such as interchangeable energy storage modules. The present invention further relates to a system and method for configuration and management of a vehicle system such as an energy storage system configured to use data from data sources external to the vehicle. The present invention further relates to a system and method for configuration and management of a vehicle system such as an energy storage system implemented with a predictive control system. The present invention further relates to a system and method for configuration and management of a fleet of vehicles each with a vehicle system such as an energy storage system with interchangeable energy storage modules. The present invention further relates to a system and method for configuration and management of a vehicle system such as a battery system.

CROSS-REFERENCE TO RELATED APPLICATIONS

Priority Applications

[None]

Related Applications (a) U.S. patent application Ser. No. 14/188,916, entitled SYSTEM AND METHOD FOR MANAGEMENT OF A FLEET OF VEHICLES HAVING AN ENERGY STORAGE SYSTEM, naming Roderick A. Hyde, Jordin T. Kare, David B. Tuckerman, Thomas Allan Weaver, and Lowell L. Wood, Jr. as inventors, filed Feb. 25, 2014, is related to and incorporated by reference in the present application; (b) U.S. patent application Ser. No. 14/188,940, entitled SYSTEM AND METHOD FOR PREDICTIVE CONTROL OF AN ENERGY STORAGE SYSTEM FOR A VEHICLE, naming Roderick A. Hyde, Jordin T. Kare, David B. Tuckerman, Thomas Allan Weaver, and Lowell L. Wood, Jr. filed Feb. 25, 2014, is related to and incorporated by reference in the present application.

BACKGROUND

It is well-known to provide a vehicle with an energy storage system available to supply power for propulsion (transport) of the vehicle. For example, it is well-known to provide an electric vehicle (EV) with a propulsion system powered by electrical energy. A typical EV will be provided with an energy storage system in the form of a battery system comprising at least one battery (e.g. one battery module) and a drive system (e.g. comprising at least one electric motor) coupled to the battery system. The EV is powered by the supply of electrical energy from the battery system to the drive system (e.g. electric motors acting through at least one wheel having traction with the road surface) and can remain in operation until the energy storage system no longer has sufficient electrical energy (e.g. until the battery system is drained to below a certain level). Energy is typically supplied by recharging and/or replacing energy storage modules such as battery modules.

It is also known to provide a hybrid-electric vehicle (HEV) that includes at least two separate systems to provide energy for vehicle propulsion. One common type of HEV is provided with both a battery system with accompanying drive system (e.g. motors operated using electrical energy) as one propulsion system and an internal combustion engine (ICE) powered by a fuel such as gasoline with an accompanying drive system (such as a drive shaft, transmission/axle or transaxle, etc.) as another propulsion system. A hybrid vehicle may comprise any type of hybrid system to a parallel system with generally separate power plants/drive systems and a series/serial system with at least some shared components/systems for propulsion of the vehicle.

It is known to provide an EV or HEV with a battery system comprising a battery pack or battery modules. The battery pack or battery modules for the battery system are typically rechargeable. The capability (e.g. type, capacity, performance) and configuration of the battery pack or battery module is typically a design consideration of an EV or HEV. Battery modules are an important component of the battery system of an EV or HEV.

It is known to use instrumentation to acquire data from components of vehicle systems to monitor and/or control the operation of vehicle systems. For example, the battery system in an EV or HEV may include a management system to manage and monitor the use and operation of the battery/battery module during operation of the vehicle. The management system may include a processor functioning as a controller with a control program coupled to instrumentation on the battery system; the management system operates the program to provide signals that can be used to manage and monitor the battery system in use and operation. See, for example, U.S. Patent Application Publication No. 2011/0184677A1.

It is also known to provide on a vehicle (such as a work vehicle) a network or data bus that is connected to one or more vehicle systems, for example, as indicated in U.S. Pat. No. 7,206,672 (data bus in motor vehicle shown as automobile) and U.S. Pat. No. 6,665,601 (data bus in work vehicle shown as tractor). A network (or data bus) on a vehicle allows for communication of data and information between vehicle systems for use and management of the vehicle. Vehicle networks are provided in a variety of forms for a variety of different types of vehicles.

It is further well-known to provide computing devices such as smart phones/mobile telephones that are able to be connected to networks such as the internet and/or local area networks, etc. to share and access data. Such devices (which are becoming ubiquitous in large segments of society) are able to access a variety of types and content of data from a variety of network-accessible sources. Data and information available over the internet and other networks may have direct and/or indirect relation to the operation and performance of a vehicle and vehicle systems and components. Network-connectivity capability of such systems and devices is expanding; with the expansion of network-connectivity capability comes an expansion of access to data/data sources available to manage network-connected systems and devices including vehicles and vehicle systems.

Vehicles and vehicle systems are not typically operated and managed using data and information that could be accessed from data sources by means of network connectivity or configured to use the wide range of data and information that may be accessible. Vehicles and vehicle systems are typically configured and operated using a reduced or limited set of data/information from a reduced or limited set of data sources. As a result, such vehicles may not be configured or operated/managed in a manner that is optimal for performance of duties to be performed by the vehicle.

SUMMARY

It would be advantageous to provide vehicles with vehicle systems such as an energy storage system that can be configured and/or managed and/or operated using data and information from data sources. It would also be advantageous to provide a system and method for configuration and management of a vehicle system such as an energy storage system such as a battery system for a vehicle. It would be advantageous to provide an energy storage system for a vehicle having interchangeable/modular components such as a battery system having interchangeable battery modules. It would further be advantageous to provide a system and method for configuration and management of a vehicle system such as an energy storage system configured to use data from data sources external to the vehicle. It would further be advantageous to provide a system and method for predictive control of a vehicle system such as an energy storage system implemented through a management system configured to use data sources including external to the vehicle. It would further be advantageous to provide a system and method for configuration and management of a vehicle system such as a battery system implemented with a predictive control system. It would be advantageous to provide a fleet management system for a fleet of vehicles having an energy storage system with modular components. It would further be advantageous to provide a system and method for configuration and management of a fleet of vehicles each with a vehicle system such as a battery system with interchangeable battery modules.

It would be advantageous to provide an energy storage system for a vehicle with a management system configured to use data and information available over a network or by instrumentation and configured to enhance or optimize the performance of the energy storage system and/or other vehicle systems. Data and information may be made available from external data sources accessible over a network such as the internet and/or from data sources on the vehicle such as by data communications, instrumentation and sensors for vehicle systems.

The present invention relates to a system and method for management of an energy storage system for a vehicle having vehicle systems including the energy storage system. The vehicle may be operated in a configuration to perform at least one duty in conditions of operation such as travel on a route. The energy storage system may be a battery system with battery modules. The management system may be configured to plan and operate vehicle systems such as the energy storage system based on data and information available from data sources on the vehicle and from connectivity to data sources external to the vehicle. The management system may comprise a computing system configured to manage at least one vehicle system including the energy storage system. The computing system may be configured to use data from data sources to create a management plan for operation of the vehicle and the energy storage system based on criteria such as objectives and predicted conditions. Data from the data sources may be available to the computing system during operation of the vehicle and the energy storage system so that the management plan can be adapted to conditions of operation. Performance of the vehicle and the energy storage system in operation of the duty may be managed according to the management plan and the conditions of operation. The energy storage system may be a battery system with battery modules.

The present invention also relates to an energy storage system for a vehicle having interchangeable/modular components. The energy storage system may be configured by selection and installation of components or modules. The modules may be of different type so that the capability and intended performance of the system and vehicle can be modified or adapted by configuration of the system with selective installation of modules. The energy storage system may be a battery system with battery modules.

The present invention also relates to a fleet management system for vehicles having an energy storage system. The fleet management system may use data and information available from data sources and from connectivity to networks. Data from the data sources may be available to the fleet management system to allow configuration and deployment/use of vehicles in the fleet according to conditions of operation and other considerations. The energy storage system may be a battery system with battery modules.

The present invention also relates to an inventory management system for components of a vehicle system such as an energy storage system for a vehicle. The energy storage system may comprise interchangeable/modular components managed as inventory of outlets. Data from the data sources may be available to a computing system of the inventory management system so that the management of inventory of components provided to outlets (such as service centers where components are installed and replaced) is performed according to specified objectives and considerations/criteria. The energy storage system may be a battery system with battery modules.

The present invention also relates to a life-cycle management system for components of a vehicle system such as an energy storage system. The life-cycle management system may use data and information available from data sources and from connectivity to networks and from components. The life-cycle management system may be configured to allow deployment/use of components in vehicle systems in a manner intended to extend the useful life of the component. The energy storage system may be a battery system and the components may be battery modules.

The present invention also relates to a data analytics system for vehicle systems and components for vehicles in use in various conditions of operation. The data analytics system may use data and information available from data sources and from connectivity to networks including from databases containing data records from vehicles and vehicle systems using components. The data analytics system may be configured to perform data operations and to facilitate the management and maintenance/update of data relating to components and/or conditions of operation, including data models and operating programs for vehicle systems and components. The energy storage system may be a battery system with battery modules.

The present invention further relates to a system and method of predictive management of an energy storage system in a vehicle comprising vehicle systems including the energy storage system. The method may comprise the steps of obtaining data relating to the vehicle in data categories from data sources, determining a route and duty for the vehicle, determining the configuration of vehicle systems, evaluating data to predict anticipated conditions for the route and duty, determining a plan for operation of the vehicle and vehicle systems according to criteria such as objectives, operating the vehicle, and monitoring the operation of the vehicle. The energy storage system may be a battery system with battery modules.

The present invention further relates to other systems and methods described and disclosed in the specification including the FIGURES.

FIGURES

FIG. 4A is a schematic block diagram showing types/categories of computing devices connectable with a vehicle by network according to an exemplary embodiment.

FIG. 8 is a schematic block diagram of an interface system for an energy storage system for a vehicle according to an exemplary embodiment.

FIGS. 9A to 9E are schematic block diagrams of battery pack/module configurations for an energy storage system such as a battery system for a vehicle according to an exemplary embodiment.

TABLES

TABLE A is a listing of data sources available to provide data items to the management system according to an exemplary embodiment.

TABLE B is a listing of data items for an energy storage system (such as a battery system) available to the management system according to an exemplary embodiment.

TABLE C is a listing of data items for vehicle type and use available to the management system according to an exemplary embodiment.

TABLE D is a listing of data items for route/duty (such as event/trip/activity data) available to the management system according to an exemplary embodiment.

TABLE E is a listing of data items for resources/facilities available to the management system according to an exemplary embodiment.

TABLE F is a listing of data items for operator/driver identification and preferences available to the management system according to an exemplary embodiment.

TABLE G is a listing of data items for road conditions/traffic (such as occurring at a location or on a route or at a destination) available to the management system according to an exemplary embodiment.

TABLE H is a listing of data items relating to date (including date and time and time of year/season) available to the management system according to an exemplary embodiment.

TABLE I is a listing of data items for environmental conditions such as weather (such as occurring at a location or on a route or at a destination) available to the management system according to an exemplary embodiment.

TABLE J is a listing of data items of plan objectives for a management system for a vehicle system such as an energy storage system according to an exemplary embodiment.

DESCRIPTION

Referring to the FIGURES, a system and method for management of a vehicle system such as an energy storage system (e.g. a battery system) for a vehicle is shown according to exemplary embodiments; the system and method uses data from a variety of sources including data sources from vehicle systems and data sources external to the vehicle such as databases and data available over networks such as the internet.

Vehicle/Vehicle System Configurations

Figure 1A:
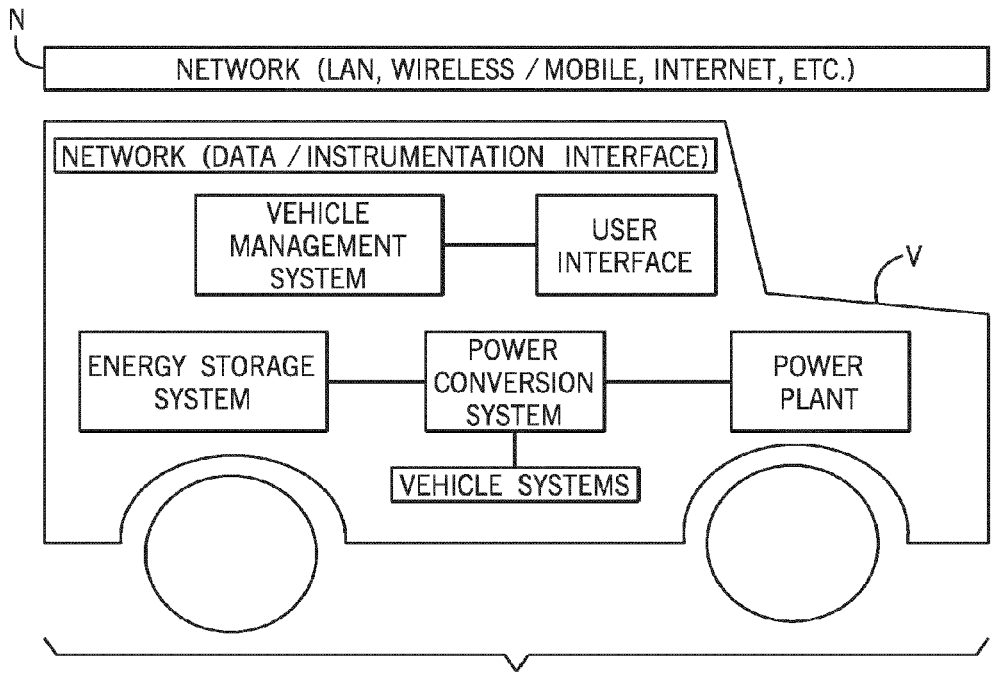
FIGS. 1A and 1B are schematic block diagrams of a vehicle with a management system for vehicle systems including an energy storage system according to an exemplary embodiment.
Figure 1B:
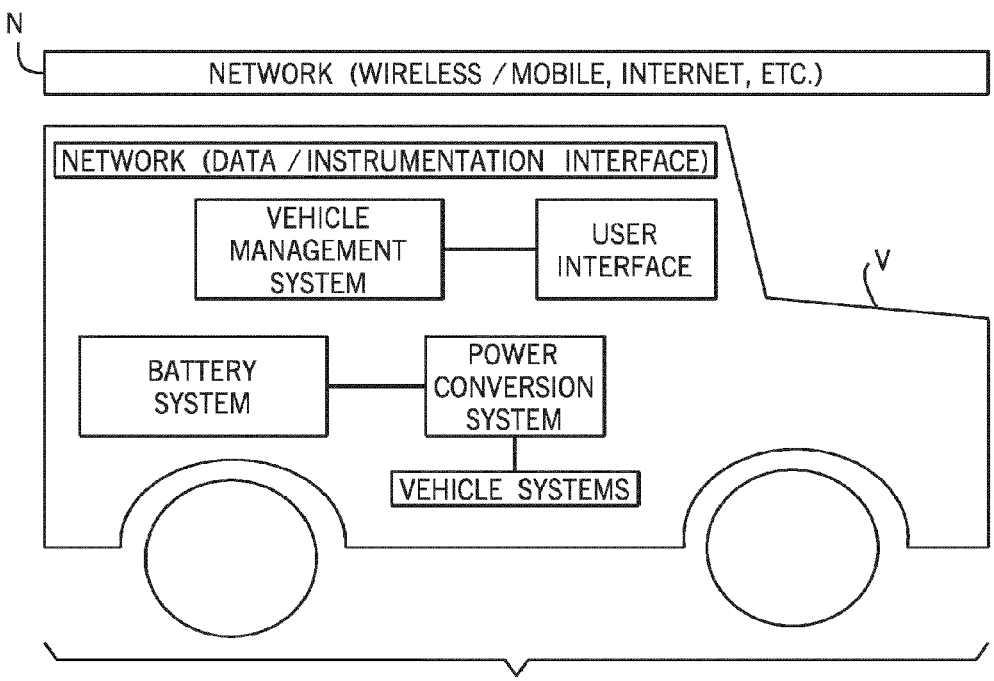

Referring to FIGS. 1A and 1B, a vehicle V with a management system for vehicle systems including an energy storage system is shown schematically according to an exemplary embodiment. According to an exemplary embodiment, as indicated representationally in FIGS. 1A and 2A-2B, the systems shown and disclosed may be of a type provided for any of a wide variety of vehicles including but not limited to electric vehicles and hybrid/hybrid-electric vehicles. (A hybrid vehicle may comprise any type of hybrid system including but not limited to a parallel system with generally separate power plants/drive systems and a series/serial system with at least some shared components/systems for propulsion of the vehicle.)

FIG. 1A shows a hybrid electric vehicle (HEV); FIG. 1B shows an electric vehicle (EV). As shown schematically in FIGS. 1A and 1B, each vehicle (HEV and EV) comprises the energy storage system with a power conversion system and a vehicle management system.

As shown schematically in FIG. 1A, the energy storage system is a vehicle system representing any system or component of the vehicle configured to store and deliver energy to other vehicle systems. As shown schematically in FIG. 1B, the energy storage system may comprise a battery system. According to an exemplary embodiment, the energy storage system may also comprise other systems or components such as a fuel cell system, capacitor system/circuit, fly wheel, thermal storage, thermal/waste heat sources/supply, auxiliary vehicle systems, etc. (e.g. any systems, subsystems, sources on or associated with the vehicle that may provide or generate energy available for vehicle systems), as well as additional systems or components such as charging circuitry, switching circuitry, safety/protection circuitry, sensors, temperature control devices, etc. The power conversion system (shown schematically) is a vehicle system comprising systems and components to convert energy into a form for use and storage by or for vehicle systems (e.g. mechanical energy into electrical energy such as for a generator to charge a battery system and electrical energy into mechanical energy such as for a motor in a drive in a system). The vehicle management system (shown schematically) represents a computer-based system for managing (e.g. controlling, monitoring, coordinating, etc.) operation of the vehicle and vehicle systems. The vehicle management system is connected to a user interface that allows presentation of information (e.g. text, video, audio, etc.) for the operator and occupants of the vehicle and interaction by the operator with the vehicle and vehicle systems.

As shown schematically in FIG. 1A, the hybrid-electric vehicle (HEV) comprises a power plant (e.g. such as an internal combustion engine) that is configured to provide power to vehicle systems such as a drive system (e.g. through a drive shaft and transmission/transaxle) for propulsion of the vehicle; the hybrid vehicle also comprises an energy storage system (e.g. comprising a battery system and/or other systems) that is configured to provide power to vehicle systems such as a drive system (e.g. through the power conversion system to one or more electric motors) for propulsion of the vehicle.

As shown schematically in FIG. 1B, the electric vehicle (EV) comprises an energy storage system shown as a battery system supplying power to the drive system (e.g. for propulsion of the vehicle) and other vehicle systems. As indicated, according to other exemplary embodiments, each of the vehicle systems of the vehicle may comprise multiple components or multiple types of components (e.g. in the energy storage system and drive system); the vehicle may comprise multiple power plants.

Figure 1C:
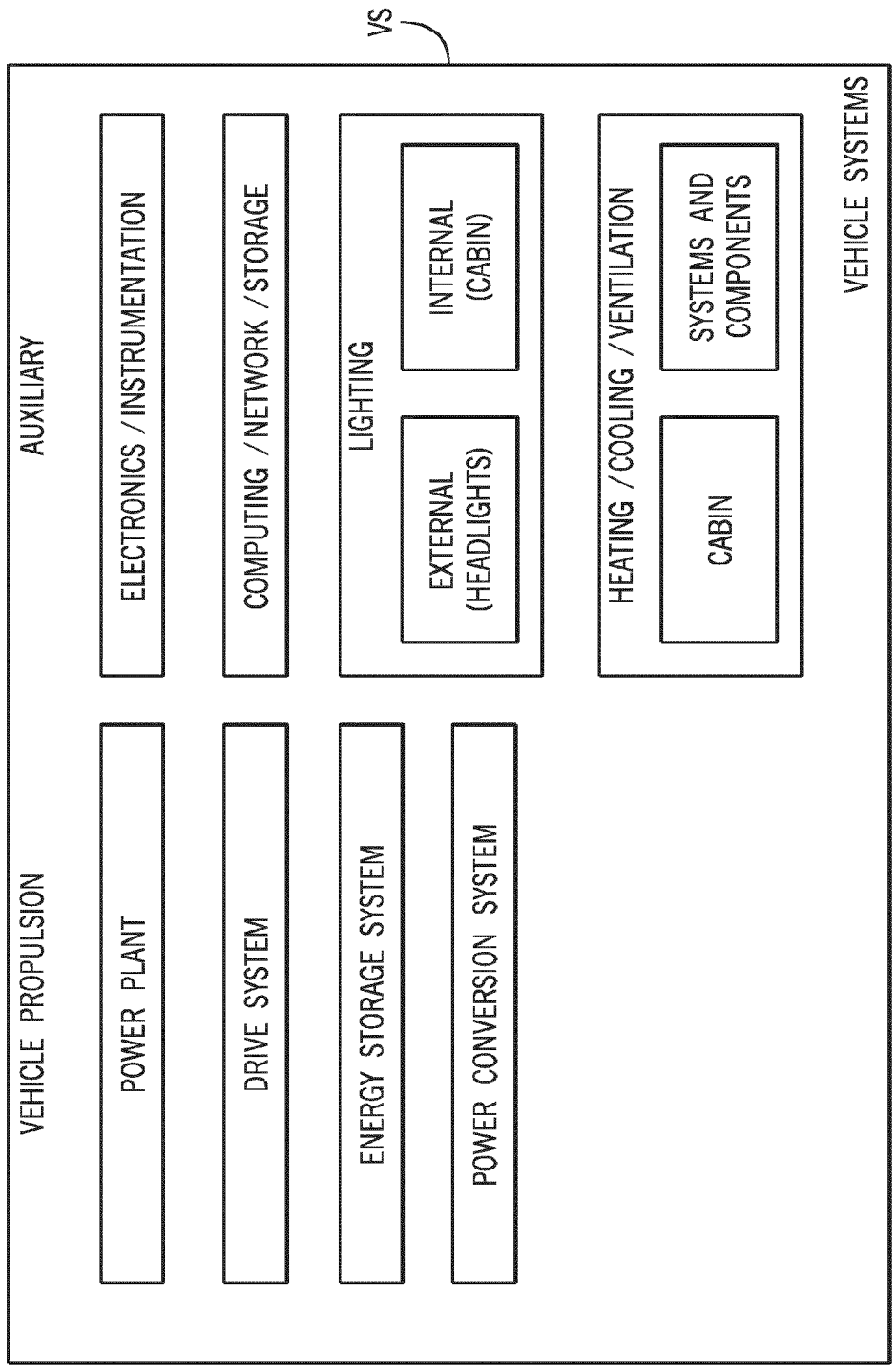
FIG. 1C is a schematic block diagram of vehicle systems according to an exemplary embodiment.

As indicated schematically in FIG. 1C, according to an exemplary embodiment, the vehicle systems of a vehicle may be categorized into related systems (and subsystems); for example, a vehicle may comprise vehicle systems relating to vehicle propulsion including the power plant (or power plants), drive system (or systems), energy storage system (including energy sources), power conversion system (or systems) and other subsystems/components (e.g. sensors, instrumentation control) supporting vehicle propulsion.

Figure 2A:
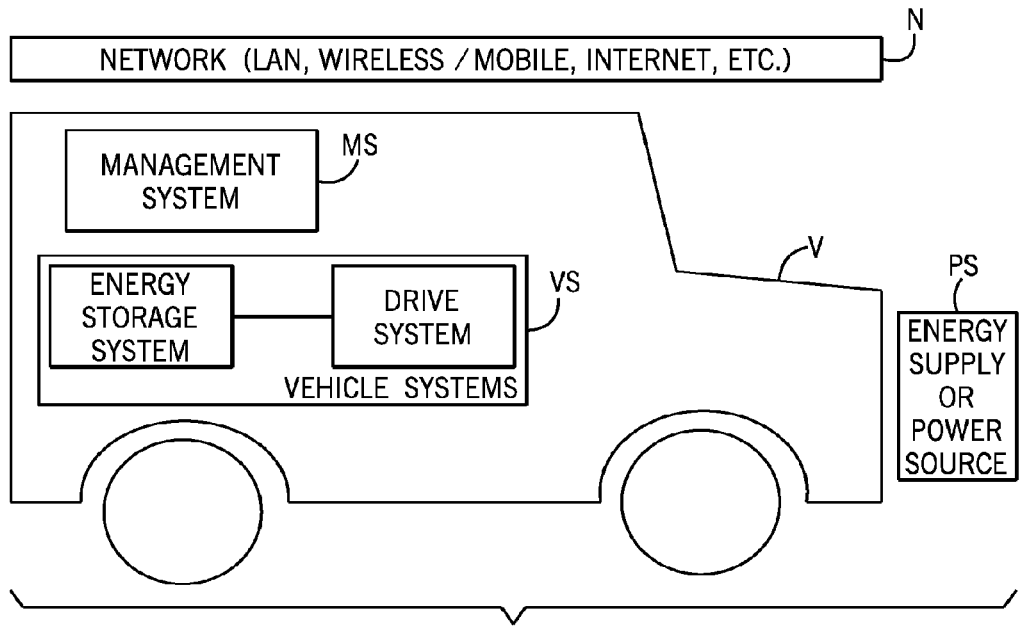
FIGS. 2A and 2B are schematic block diagrams of a vehicle with management system for vehicle systems shown as an energy storage system and a drive system and shown with network connectivity according to an exemplary embodiment.

The energy storage system and power plant are connected to the power conversion system (shown schematically in FIGS. 1A and 1B) which converts power into a form for use in the vehicle. As indicated, in a hybrid-electric vehicle or electric vehicle, the power conversion system and drive system can comprise a generator and electric motor at one wheel or at multiple wheels; the power conversion system converts electrical energy from the battery system to mechanical energy delivered to a wheel of the drive system and/or mechanical energy from a regenerative braking system at a wheel to electrical energy to recharge a battery module in the battery system. According to an exemplary embodiment for a hybrid-electric vehicle, the power plant may be configured to supply energy to the energy storage system through the power conversion system (e.g. to charge, recharge, operate, etc. components of the energy storage system). For example, as indicated the power plant can supply mechanical energy at a drive shaft to a generator to generate power to recharge the battery system in the vehicle. According to an exemplary embodiment, the vehicle V may be configured to obtain a supply of energy from external sources (such as fueling stations, electric outlets, wireless power transmission, etc. shown schematically as power/energy source PS) connected or supplied to the energy storage system or other vehicle systems VS. See FIG. 2A. As indicated in FIG. 2A, the vehicle may be configured to obtain power/energy by a wireless connection directed (e.g. beamed, radio frequency radiated or otherwise transmitted power) from a power source or supply of energy (e.g. made available when the vehicle is stationed, serviced, parked, stopped for a time in operation, etc.). The vehicle may comprise an auxiliary or other power/energy collection systems or devices. For example, vehicle systems on the vehicle may comprise additional power sources or energy storage devices such as a waste heat recovery system configured to use waste heat from vehicle systems, a solar panel on vehicle exterior, auxiliary electric generator system, etc. to generate electric power. According to an exemplary embodiment, the vehicle may be configured to use electrical energy or heat (e.g. waste heat) as at least one source of supply for the energy storage system (e.g. as energy to be supplied while the vehicle is stationed and/or in operation). See FIGS. 2A-2B.

As indicated, the power plant may comprise any of a wide variety of power-generation systems, engines, etc. According to an exemplary embodiment, the power plant may comprise an internal combustion engine of a type configured to use gasoline (or a blend) as a fuel; according to other exemplary embodiments, the power plant may comprise an engine configured to use any of a wide variety of other fuels such as bio-fuels (fuels derived from biological matter, including ethanol, butanol, bio-diesel, etc.), diesel fuel, natural gas (including liquid natural gas), propane, hydrogen, etc. According to an exemplary embodiment, in which the vehicle is a hybrid electric vehicle, the power plant may be configured for use of any of a variety of fuels such as gasoline, ethanol, bio-fuel, diesel, liquid natural gas, nature gas, methane, hydrogen, etc. The vehicle may comprise a plug-in electric vehicle (e.g. configured to connect by wire to be supplied with electrical energy at a charging station). According to an exemplary embodiment, the vehicle systems of the vehicle may comprise a fuel cell system as part of the power plant and/or as part of the energy storage system (e.g. in conjunction with a battery system).

The vehicle systems VS as indicated schematically in the FIGURES may be any type of system operated on or in a vehicle such as drive system, electrical system, control system, energy conversion system, heat transfer/exchange system, computing system, communication system, monitoring system, lighting system, auxiliary power system, heating/air-conditioning system, security system, instrumentation system, safety system, occupant comfort/convenience system, etc.

According to an exemplary embodiment as indicated in the FIGURES, the vehicle is shown schematically to indicate a generally conventional type of wheeled vehicle. According to other exemplary embodiments, the vehicle may comprise any type of vehicle including but not limited to personal vehicles, commercial vehicles, work vehicles, agriculture vehicles, industrial vehicles, factory vehicles, delivery vehicles, emergency services vehicles, light-duty vehicles, heavy-duty vehicles, recreational vehicles, military vehicles, boat or marine vehicles, land vehicles, drone/unmanned vehicles, remote-controlled vehicles, etc. The vehicle could be configured using wheels, tracks, treads, fans, propellers, legs (e.g. robotic legs), magnetic levitation systems, etc. for propulsion/traction, support and/or control of the vehicle (e.g. through the drive system or other apparatus and systems of a type used in vehicles).

Figure 12A:
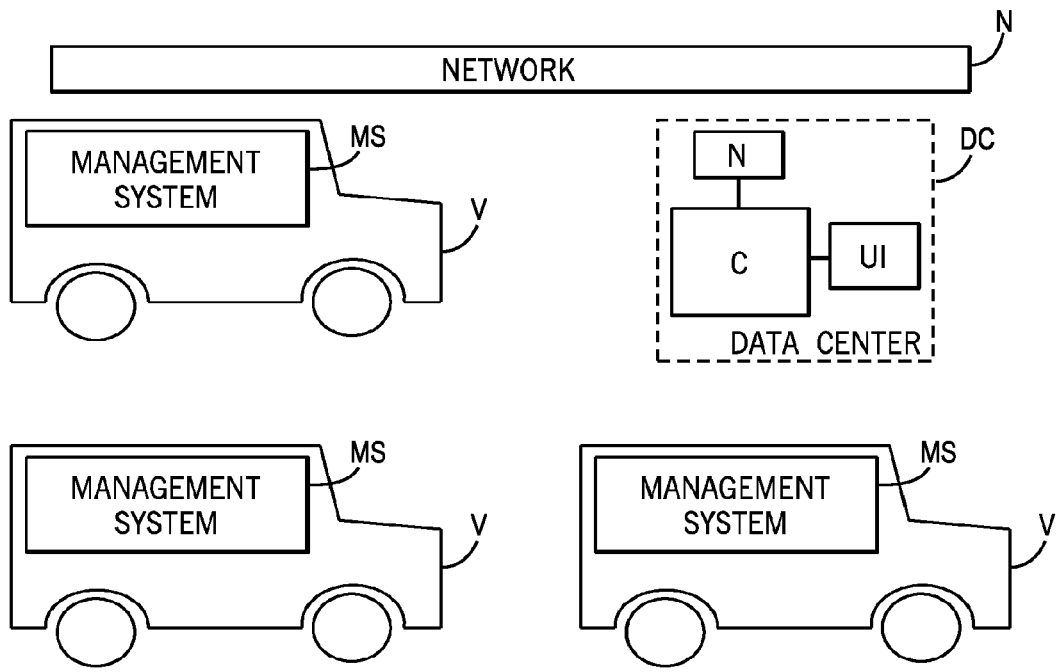
FIGS. 12A and 12B are a schematic system block diagrams of a set or fleet of vehicles with a management system and battery system accessible by network to a computing device according to an exemplary embodiment.
Figure 12B:
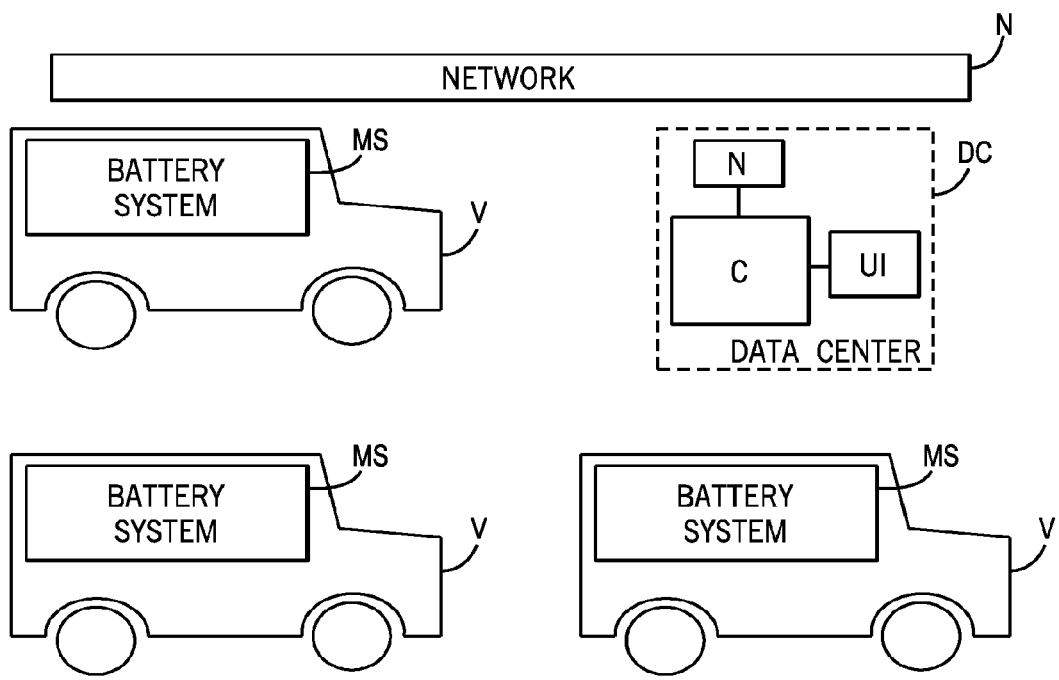
Figure 31:
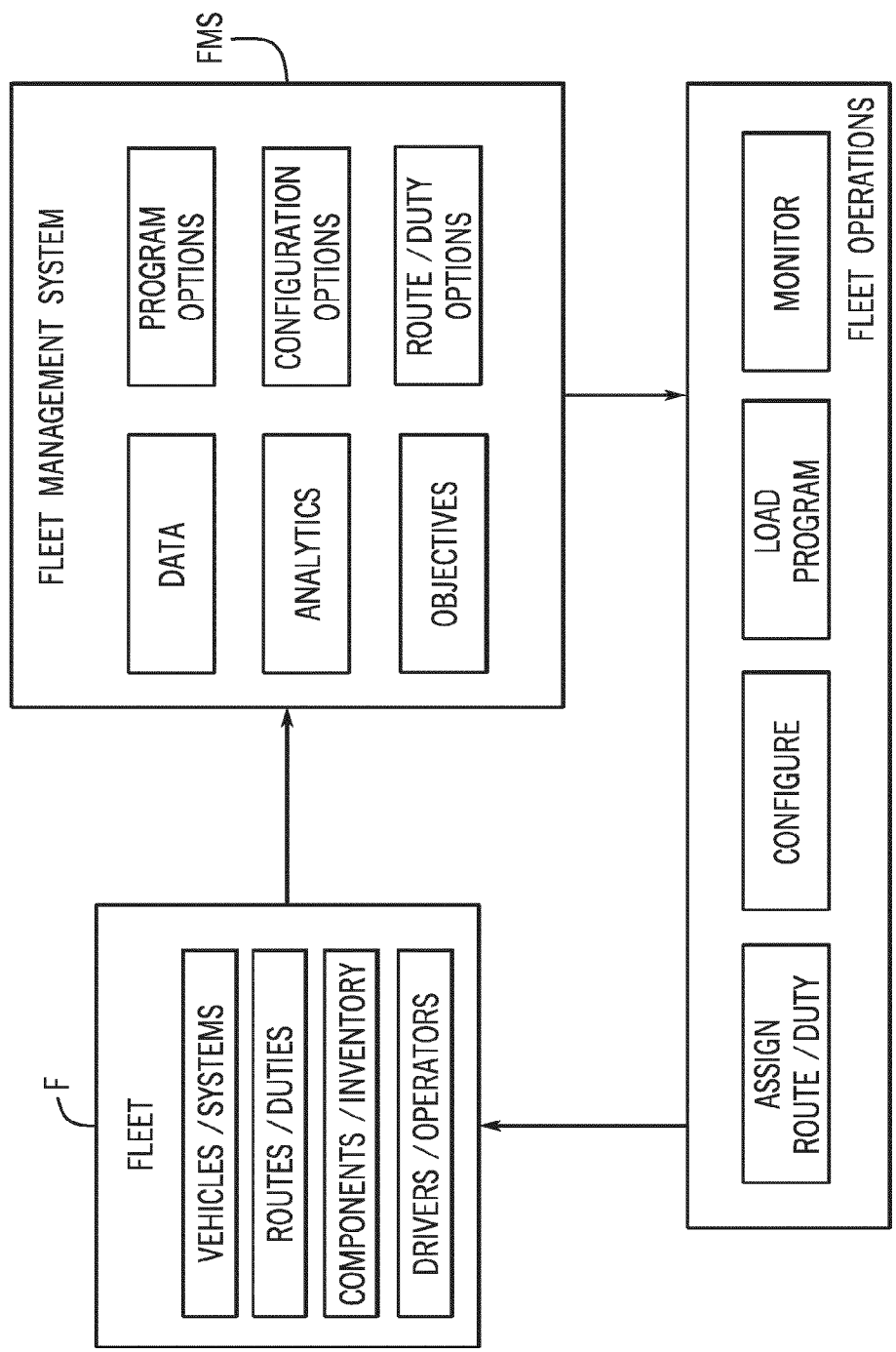
FIG. 31 is a schematic block diagram of a system/data operations for a fleet management system for vehicles with an energy storage system such as a battery system according to an exemplary embodiment.

The vehicle may be part of a set/group or fleet F operating from multiple locations (see e.g. FIGS. 12A-12B and 31). The vehicle may be configured specifically for certain tasks or may be a general purpose vehicle.

Vehicle Network Connectivity

Figure 2B:
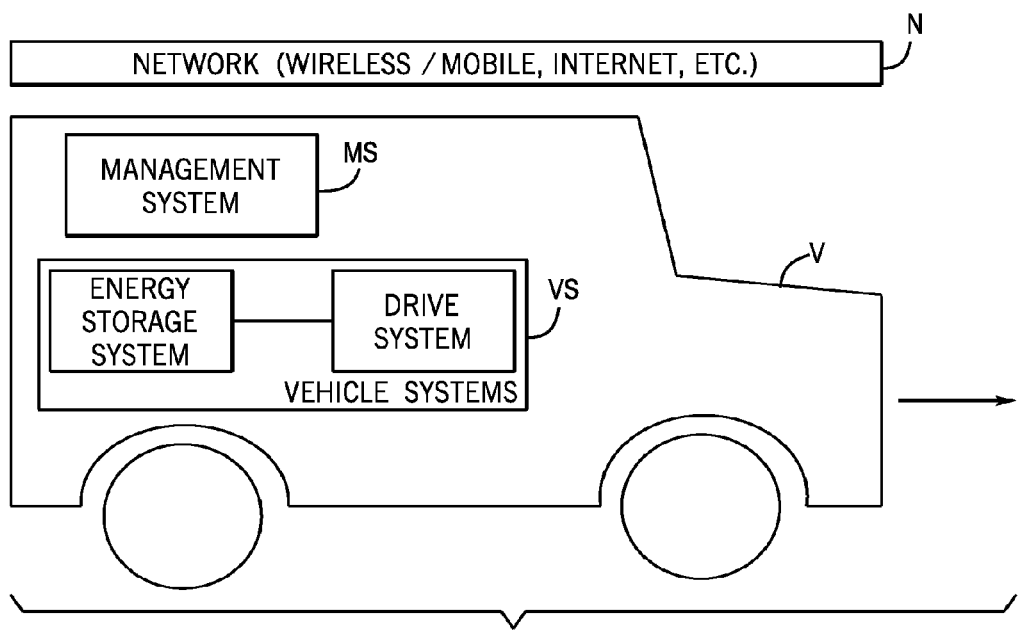
Figure 3:
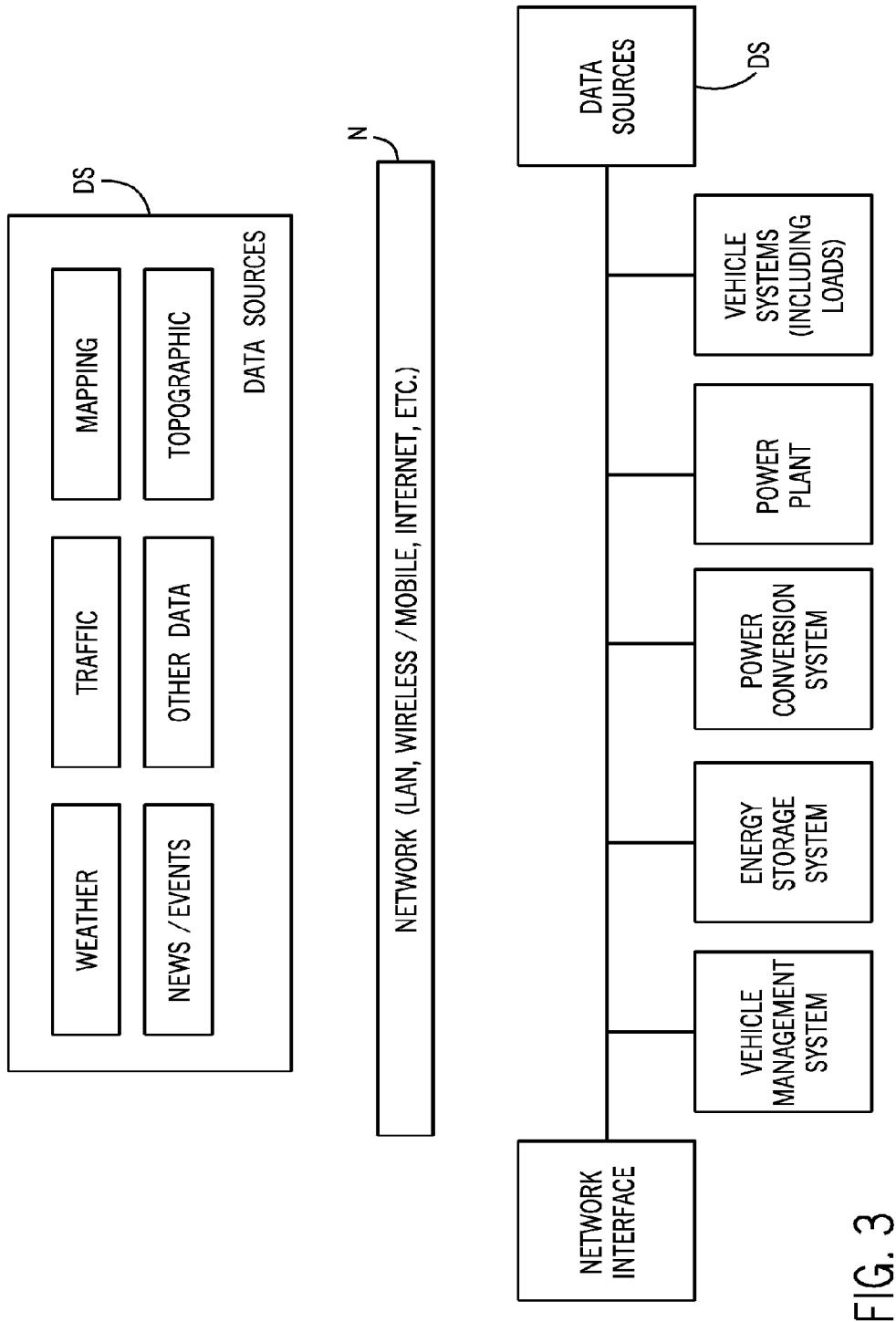
FIG. 3 is a schematic block diagram of a network for a vehicle with a management system for vehicle systems and a network interface to data sources according to an exemplary embodiment.

Referring to FIGS. 2A and 2B, a vehicle V is shown schematically with a management system MS (e.g. intended to represent a vehicle management system or any management system for a vehicle system or component) and network connectivity according to an exemplary embodiment. As shown in FIGS. 2A and 2B, the vehicle V including the management system MS may be configured to obtain and maintain a network connection to data sources DS (see FIG. 3) in various modes of use and operation (e.g. wired, wireless, short-range, long-range, etc.). As indicated schematically in FIG. 2A, according to an exemplary embodiment, the vehicle is stationed (e.g. not in active use or duty) and may be connected with an energy supply or power source (such as for refueling or recharging the energy storage system); as indicated schematically in FIG. 2B, the vehicle is in use in typical operation of a duty (e.g. travel on a route and/or to perform an activity). According to an exemplary embodiment, when stationed (e.g. parked, refueling or recharging) (FIG. 2A) and when in operation (e.g. performing a duty, traveling on a route) (FIG. 2B) the vehicle will be connectable to a network N and the management system will have access to network-based sources. (According to an exemplary embodiment, the vehicle may also be provided with a system to supply power to the energy storage system or other vehicle systems in operation, for example, through a regenerative braking system, a waste heat recovery system, a transmitted/wireless recharging system, a solar power/energy collection system, etc.)

According to an exemplary embodiment, the vehicle will be configured for data/network connectivity to data sources/ networks when stationed or stopped or in operation; for example, when the vehicle is stationed (e.g. at a station/outlet such as a garage or parking location or a home base) a generally continuous and/or relatively reliable intermittent data connection (wired or wireless) may be available for relatively high-speed data transmission/communications (e.g. at a relatively high bandwidth); when the vehicle is in motion/operation (e.g. performing a duty, traveling on a route, etc.) the data connection will typically be wireless and may not be continuous or reliable (or available at high speed/bandwidth). See FIGS. 2A and 2B. According to an exemplary embodiment, the management system may be configured to employ a data/network connectivity strategy or routine to interchange (e.g. transmit/receive) higher volumes of data or certain types of data (e.g. important data) when a high bandwidth data connection is available and established; lower volumes of data or background data may be interchanged with regularity at times when data/network connectivity of any type is established. See FIGS. 2A and 2B. According to an exemplary embodiment, in the course of operation of the vehicle, intermittent periods when the vehicle can establish a high-speed/high-bandwidth data/network connection (such as when the vehicle is stationed/parked at a location/facility) can be scheduled/anticipated or in any event used for high-volume data interchange; other periods when the vehicle has a wireless data/network connection that has limited bandwidth (even if generally continuous connectivity such as during travel on a cellular carrier network) can be used for lower volume data interchange (e.g. with data buffered and stored as/for transmission).

Referring to FIGS. 3 and 4A-4C, a vehicle network for a vehicle comprising vehicle systems is shown schematically according to an exemplary embodiment; as indicated, the on-vehicle network (or data bus) comprises a network interface and various systems and components such as the vehicle management system, energy storage system, power conversion system, power plant and other vehicle systems or loads (such as the drive system). As indicated in FIGS. 2A-2B, 3 and 4A-4C, the vehicle is connectable to various other off-vehicle networks, including proprietary networks, local networks, wireless networks, cellular/telecommunication carrier networks, commercial networks, etc. and the internet.

Referring to FIG. 4A, types of computing devices connectable to a network along with a vehicle are shown schematically according to an exemplary embodiment; the vehicle V and network N may be configured to allow access to the vehicle and network from a user interface UI on the vehicle (see FIGS. 1A-1B) and/or from a user interface on other computing devices C such as mobile devices MD, home/office H/O, service centers SC, data centers DC, etc. (e.g. external to the vehicle). According to an exemplary embodiment, a system or device on the network may comprise a network device, computing device or a computing system. Referring to FIG. 5, a computing system C is shown schematically according to an exemplary embodiment (generally of a conventional type). According to an exemplary embodiment, the computing system configured for use with the system may be of any suitable type for the vehicle or network. As indicated in FIG. 5, according to an exemplary embodiment, the computing system may comprise a conventional computer/microcomputer system; according to other exemplary embodiments, the computing system may comprise any type of computing device or system configuration to interchange and process data. Data storage and interchange may be provided by any suitable method or devices, including but not limited to USB/USB-connected or other storage/devices, network-connected storage/devices, cloud-based systems/infrastructure, etc. (e.g. interchangeable/storage and use of data shown schematically as data D in FIGS. 14 and 22).

Figure 4B:
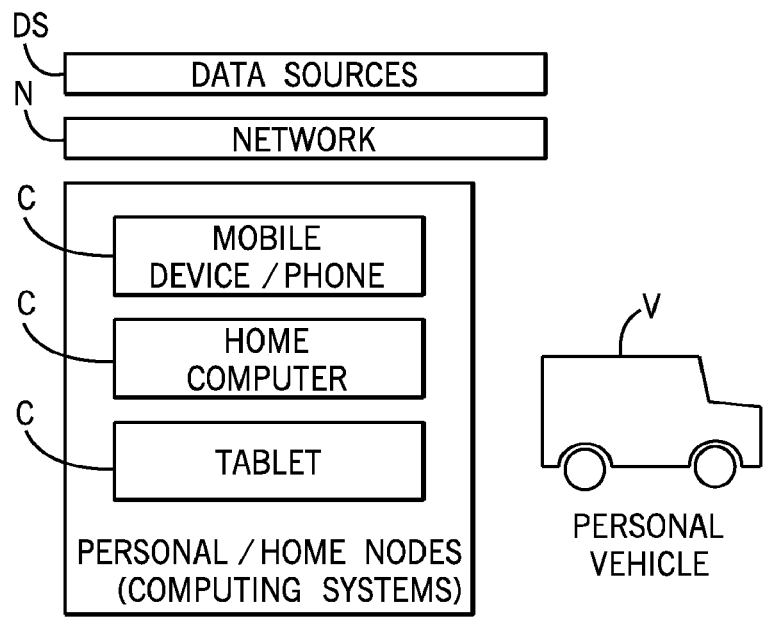
FIG. 4B is a schematic block diagram of a configuration of network connectivity for a personal vehicle according to an exemplary embodiment.
Figure 4C:
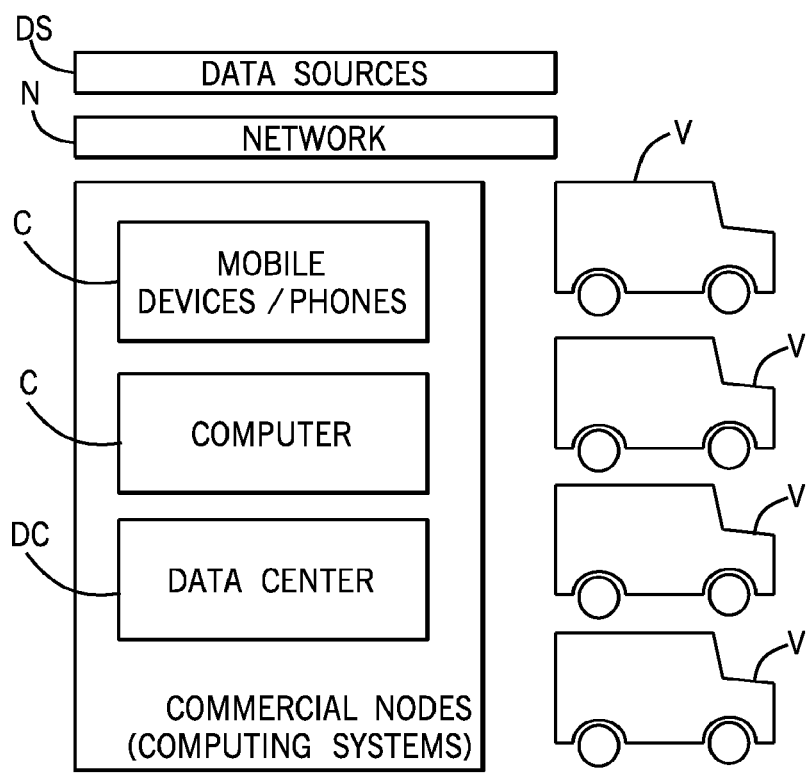
FIG. 4C is a schematic block diagram of a configuration of network connectivity for a fleet of vehicles according to an exemplary embodiment.
Figure 5:
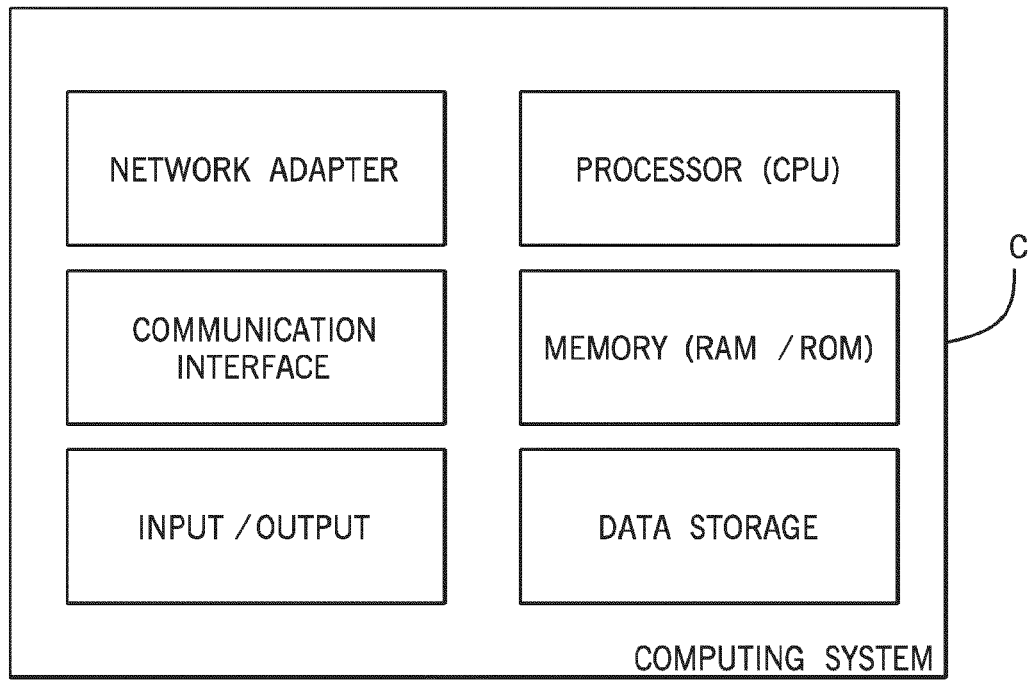
FIG. 5 is a schematic block diagram of a computing system according to an exemplary embodiment.

Referring to FIGS. 4B and 4C, according to an exemplary embodiment, the configuration of nodes of the network and computing device access to a vehicle V and vehicle systems VS are shown schematically for a personal vehicle (see FIG. 4B) and a fleet of multiple commercial/industrial/other vehicles (see FIG. 4C). Personal vehicles can be part of a group or fleet of multiple vehicles. As indicated in FIG. 4B, for a personal vehicle (or personal vehicles for a household) the nodes or network access points for the vehicle owner/operators may include network-connected computing systems and devices such as a mobile device (e.g. cell phone, smart phone, tablet, etc.) or a home computer (or other computer such as accessible to the owner/operator, such as at home, office, hotel, etc.). As indicated in FIG. 4C, the nodes or network access points for commercial/industrial vehicles in a fleet may comprise computing systems that include mobile devices, computers, data centers, etc. (e.g. accessible to staff, employees, operators, etc.) for multiple vehicles in the fleet. See also FIGS. 12A-12B and 31.

As indicated in FIGS. 4A-4C (and 12B), vehicles may be operated individually (e.g. as a personal/family or small-business vehicle) or may be operated in fleets (e.g. by entities such as commercial entities, rental agencies, governmental/municipal entities, etc.). According to an exemplary embodiment, multiple individual or fleet vehicles may be aggregated or associated in one or more groups or fleets (e.g. fleets or groups according to common or shared attributes such as type, manufacturer, model, location, service center/pattern, component configuration, driver/operator association or type, use or use history, etc.); data/network connectivity and data operations for groups (formal, informal, or selective) may be configured based on the needs, interests or capabilities of the group/fleet and network/user interfaces and nodes developed or configured for vehicles (and operators of vehicles) in the group or fleet. For example, a group of vehicles sold by or serviced at a vehicle dealer, from a particular manufacturer, registered with an association or club (e.g. automobile association/club, etc.) or otherwise affiliated in some manner or with a collective interest/purpose may be provided with shared network and data connectivity (e.g. operated under a fleet management system and with shared use of related data/information access).

Figure 18:
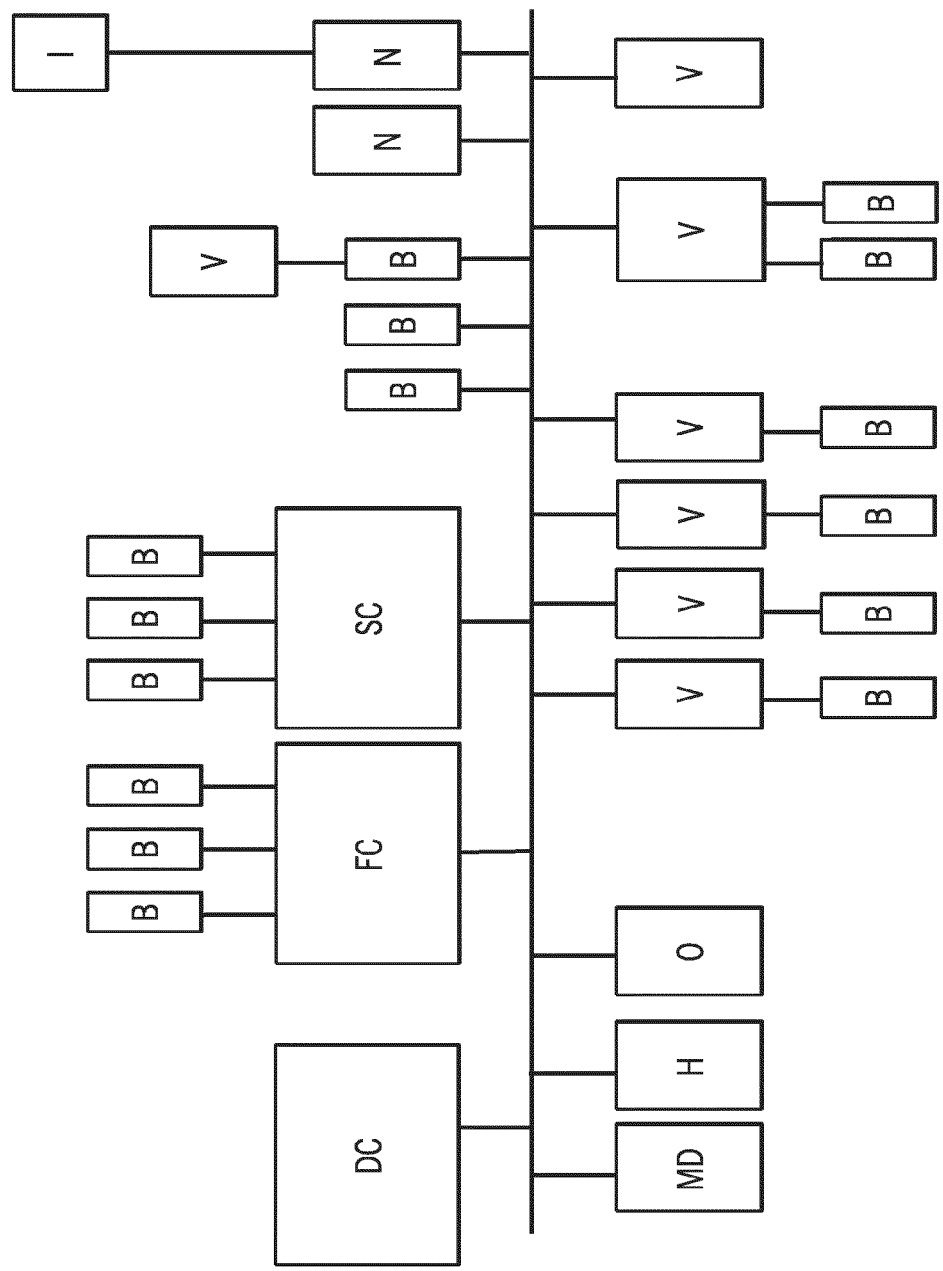
FIG. 18 is a schematic block diagram of a network of vehicles and components of vehicle systems and data centers/computing devices and other networks for the system according to an exemplary embodiment.

As shown schematically in FIG. 18, according to an exemplary embodiment, a network may comprise various computing devices such as at a data center DC, service center SC, fleet management center FC, office O, home H, in communication with vehicles V having energy storage systems shown as battery systems B and connected to other networks N such as the internet I. (As indicated, vehicle systems and components (such as systems or components with embedded or other computing systems) may be provided with individual/separate data/network connectivity).

According to an exemplary embodiment, the vehicle comprises a network N with data/instrumentation interfaces for vehicle systems and connectivity to other networks. As shown schematically in FIGS. 2A-2B and 3, the network is configured to allow data communication/transmission between vehicle systems and components (e.g. internal to the vehicle as shown in the FIGURES) as well as with other systems external to the vehicle including through connectivity to other networks such as a local area network (LAN) and the internet. According to an exemplary embodiment, the vehicle provides a user interface (e.g. audio input/output and visual display and/or other input device such as touchscreen and/or keypad, etc.) to facilitate interaction and communications between the user (e.g. operator or manager) and the vehicle and vehicle systems. See FIGS. 1A, 1B and 5.

According to an exemplary embodiment, the user interface for a management system for a vehicle and/or vehicle system may be provided in any of a variety of configurations depending upon any of a variety of considerations (including but not limited to considerations of data access and security/safety). For example, a vehicle system may have a user interface provided in the vehicle instrument panel (e.g. within the standard vehicle user interface such as in a dashboard or console), in a separate control panel (e.g. on or associated with the vehicle system), in a dedicated terminal (e.g. at a data center or fleet/service center) remote to the vehicle, in a restricted-access area on a vehicle (e.g. for a rental vehicle on a control panel/user interface in a restricted-access location such as a vehicle trunk that is not intended to be accessed by the operator but only by an authorized service attendant of the dedicated interface), etc. According to an exemplary embodiment, the user interface can be provided for a computing device or terminal connected over a network (e.g. in a manner typically or conventionally used for network-connected devices of any type) so that data access and updates as well as system/data operations (such as status review and data/firmware/software program maintenance and updates) can be provided from external computing locations such as through a standard program/computer interface or other application including an application program (e.g. mobile app available for a mobile device such as a smart phone or tablet computer). For example, the management system for a personal vehicle may be made available to an owner-operator (or family) via a user interface provided on a personal computing device (e.g. smart phone, tablet computer, home computer, etc.); the management system for a fleet vehicle such as a rental car/truck may be made available via one type of user interface providing full/remote control on the computing system at the fleet management center and via a second type of limited/restricted local user interface made available to the person operating the vehicle (e.g. renting the car/truck) (or alternatively no access/user interface).

Management System for Vehicle Systems

According to a preferred embodiment, the energy storage system will comprise a management system as indicated schematically in FIGS. 1A-1B, 2A-2B, and 6. The management system (MS) is configured to use data and information from a wide range of data sources (DS) to provide control signals used for operation of vehicle systems (VS) (such as an energy storage system (ESS) and perform monitoring/reporting function as indicated schematically in FIG. 13 (e.g. a schematic system block diagram of system functions/programs for the management system for a vehicle according to an exemplary embodiment). According to an exemplary embodiment, the management system will comprise a computing device or system (C) with a central processing unit (CPU) or micro-computer module and other related systems (e.g. memory management, networking, etc.). See FIG. 5. According to an exemplary embodiment, the computing system may be configured for the processor (e.g. CPU or micro-computer) to operate an application program (e.g. routine or algorithm) that comprises the management system. According to a preferred embodiment, the management system will be configured with a control routine or program to perform monitoring and data-based management operations (e.g. using algorithms, computation, look-up tables/data values, correlations, comparisons, etc.) for the vehicle system.

According to an exemplary embodiment, the computing resource or device operating the management system (e.g. program/processor) may be located in the vehicle or operation may be divided/distributed among multiple computing/data resources at multiple locations on or accessible by the vehicle. According to an exemplary embodiment, the management system is located (operated) remote from the vehicle and has only intermittent data/network connectivity and communication with the vehicle; the vehicle comprises suitable data storage to store data (e.g. sensor data and other obtained and acquired data) and operating parameters (e.g. rules/routines, instructions, etc.) during periods when data/network connectivity and communications to the management system operation (e.g. remote computing resource) is unreliable or not available; the vehicle system may be configured with dedicated data storage for data/operating parameters and programs and/or may be configured to use data storage associated with one or more other vehicle systems (e.g. entertainment system, engine/power plant control system, energy storage system, etc.) to facilitate operation of the management system on the vehicle with continuity.

According to an exemplary embodiment, the management system may be implemented to operate on a primary computing system for the vehicle (e.g. system with control vehicle CPU) and/or to operate on other computing systems for other vehicle systems (e.g. shared computing resources) and/or to operate using computing systems and resources available over a network (N) (e.g. by network connectivity); for example, if the management system is operated over a network but data/network connectivity is disrupted, a program for the management system may operate on available computing resources (e.g. dedicated or distributed) on the vehicle during the period of disruption of network connectivity; according to an alternative embodiment, the vehicle system may be configured to operate with a stored and/or default operating program on the vehicle or otherwise available within the vehicle if other intended computing resources become unavailable (e.g. so that at least basic functionality can be provided for the management system at virtually all times).

According to an exemplary embodiment, the management system can be configured to incorporate or allow access/interaction with multiple vehicle systems as well as other devices and components (e.g. functions) that can be integrated or interconnected with the management system for control, monitoring, data connectivity, etc. (e.g. components, devices or control systems and other instrumentation in or associated with the vehicle) as available on a vehicle network (e.g. network, data bus or other data connection). See FIG. 3. The management system is configured to interface with vehicle systems such as the energy storage system (e.g. battery system) through data communications over established input/output channels and/or network/data connectivity. See FIGS. 2A-2B.

As shown schematically in FIGS. 2A-2B, 6 and 7A-7C, according to an exemplary embodiment, the management/control system for a vehicle system such as an energy storage system (shown as a battery system) may be distributed to computing/data resources on multiple systems on the vehicle (e.g. at a system/subsystem/component level) or may be centralized (e.g. operated at a central control/management system for the vehicle). As shown schematically in FIG. 7, according to an exemplary embodiment, the control/management system for a battery system may comprise a computing system (e.g. processor and etc.) with a control/management program or subroutines (e.g. such as in a computation/data model with algorithms and/or data tables) and data storage for the control/management system.

Energy Storage System Configuration

Figure 6:
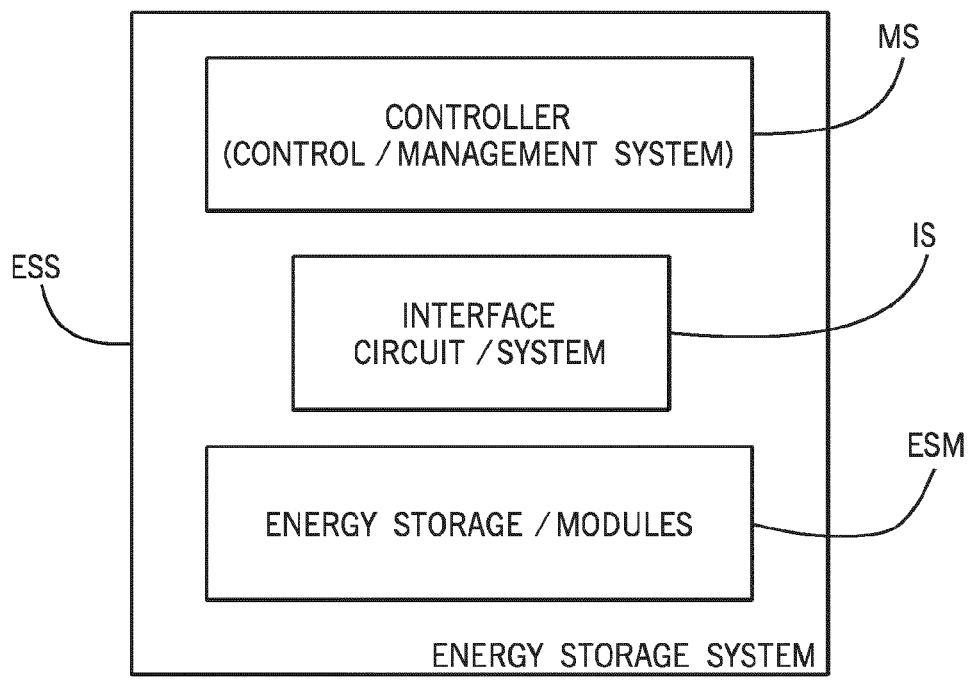
FIG. 6 is a schematic block diagram of an energy storage system for a vehicle according to an exemplary embodiment.

Referring to FIG. 6, an energy storage system (ESS) for a vehicle is shown schematically according to an exemplary embodiment, to comprise energy storage modules (ESM) along with an interface circuit (IS) and management system (MS). According to an exemplary embodiment, the energy storage system may comprise a battery system as indicated in FIGS. 1B, 6, 7A-7B, 9A-9C and 11A-11C. According to other exemplary embodiments, the energy storage system may comprise any of a variety of energy storage devices such as a capacitor system (e.g. capacitor circuits/devices such as an ultra-capacitor) and/or a fuel cell system in combination with a battery system; as indicated schematically in FIG. 9C, the energy storage system with fuel cell system and/or a capacitor system may be configured with a battery system to provide an energy storage system to handle varying levels of demand such as peak demand (charge and discharge) using each component according to its capability (e.g. a capacitor to deliver current at high-rate and the fuel cell system to extend capacity and rechargeable battery modules for storage capacity and delivery of energy). According to any preferred embodiment, the energy storage system (and any other power plant) for the vehicle will be configured to operate the vehicle in a cost-efficient/energy-efficient manner to perform the designated duties and functions of the vehicle in its application.

Referring to FIGS. 6 and 8, an interface system for the energy storage system is shown schematically according to an exemplary embodiment; the interface system may comprise an interface/switching circuit to facilitate operation and control of the energy storage system as well as a protection circuit to protect components of the energy storage system.

Data Connectivity for Management System

Data and information for data sources used by the management system can be acquired or obtained by connection to a variety of sources including "local" data sources to a vehicle and vehicle system (such as the energy storage system) and "remote" data sources accessible by use of systems providing data communications and network connectivity as indicated schematically in FIGS. 2A-2B, 3 and 18. See also TABLES A-J. According to an exemplary embodiment, the system will include a network connection to the computing system, such as a network on the vehicle, a telecommunications network, the internet, wireless network, vehicle-based network, LAN, etc. See FIGS. 3, 4A-4C and 18. Data is interchanged with computing devices and systems from the vehicle over the network and used and shared over the network to operate vehicle systems via the management system. Data and information for the vehicle can be obtained directly from components and devices in use/operation, from sensors and instrumentation, from user input, from internal data storage (e.g. local to the vehicle), from external sources (e.g. remote from the vehicle such as available from connectivity to networks such as the internet), etc. See e.g. TABLE A. Components of the vehicle systems such as the energy storage system may have data models (e.g. data records and stored data sets and computational models/algorithms or tables to model component performance); data models and data sets for vehicle systems and components may be accessed and used as data sources for the management system as shown schematically in FIG. 14 (representation of categories of data sets for the management system according to an exemplary embodiment).

According to an exemplary embodiment, the vehicle systems and vehicle will be configured with a combination of sensors and instrumentation as well as with network connectivity (e.g. to networks such as the internet) with data storage to make data and data sets available for the management system (and with data and information acquired at or near real time or periodically updated at suitable intervals for reliable use and accurate functioning); programs and routines can be established for maintenance and updating data and for data/information availability according to the need and importance of the data and information (e.g. need for accuracy, reliability, sensitivity) to the proper operation of the management system and the vehicle system.

Data Management

According to an exemplary embodiment, the management system can be configured to function with any of a wide variety of categories of data and information from data sources (DS) regularly available or periodically available to the vehicle (e.g. including categories of information that may only periodically be available such as dependent upon connectivity to external networks including the internet); the management system can be programmed to use the data and information as is available and/or to perform operations to acquire or obtain data and information (e.g. updated) from sources according to a hierarchy or routine intended to ensure that reliable/accurate data and information is used according to availability and may have redundancy in data sources to enhance system reliability. See FIGS. 2A-2B, 3 and 18.

The management system may be configured to anticipate need and use of data and information and to obtain updates in advance (e.g. autonomously or by routine or program) as useful or necessary when updated data and information is available (e.g. when the vehicle is parked at a location where network access is available such as when in a garage where a Wi-Fi connection can be established or when traveling in a location where a mobile or wireless connection can be made to a network such as the internet). See, e.g., FIGS. 2A-2B. According to a preferred embodiment, the management system will be provided with associated memory to store data and information needed for use and operation (e.g. an associated database in a data storage component/system such as a hard drive or solid state memory unit/SSD). According to a preferred embodiment, items of data and information for the system may be structured in categories relating to the type of the item of data and information and the manner in which the item of data and information can be acquired or otherwise obtained for the management system.

According to an exemplary embodiment, data sources provide data as a data record accessible to the computing system by data communications or from data storage (e.g. managed in a database and/or data files). The data sources on the vehicle may include instrumentation of systems and components associated with vehicle systems. According to an exemplary embodiment, instrumentation is associated with vehicle systems such as the battery system; instrumentation may comprise a global positioning system, an accelerometer, data acquisition systems for monitored systems and components, a thermal monitoring system (e.g. thermocouple or other temperature monitoring system or device), etc.; the instrumentation devices may comprise data storage capability (e.g. to buffer and store data to be transmitted).

According to an exemplary embodiment, the computing system may also be connected to a network external to the vehicle so that the data sources external to the vehicle comprise data sources on the network external to the vehicle (e.g. sources available on an external proprietary network or the internet). See FIGS. 2B, 3, 4, and 18 and TABLES A-I. According to an exemplary embodiment, data sources provide data relating to operating conditions for the vehicle in duty, such as duty or route of the vehicle, operator of the vehicle, type of the vehicle, configuration of vehicle systems, operating conditions of the vehicle in the duty and environmental conditions of the vehicle in the duty. According to an exemplary embodiment, operating conditions available from data sources (on the vehicle and external to the vehicle) will include at least one of temperature, weather, weather forecast, time of day, day of week, day of year, global positioning system (GPS) location data, traffic conditions at location, route information for the duty and available resources for vehicle systems. According to an exemplary embodiment, available resources for vehicle systems comprise facilities for refueling and/or recharging, energy cost data and network connectivity to the internet; the system can be configured so that on-vehicle data is used when available and external data is obtained or used as an alternative. According to an exemplary embodiment, the management system will be configured to use/incorporate data from existing and/or other types of available data sources, including but not limited to internet-available data, commercially-available data, subscriber-service data, etc. or other databases.

According to an exemplary embodiment, data and information from the management system can be retrieved and accessed at network-connected computing device for purposes of review, backup, evaluation, forensic and analytics. Data and information from multiple vehicles can be collected, combined and compared and used for any of a wide variety of purposes, including evaluating of system/vehicle/component performance, driver/operator profiling, trend identification, optimization program/routine development and modification, business analytics, resource and facility planning, pattern identification, profile development, capacity monitoring and development, performance comparison, product evaluation, cause-effect evaluation, experimentation, etc. As indicated, according to an exemplary embodiment, data can be acquired from/for individual vehicles, fleets of vehicles, groups of vehicles (formal or informal); individual vehicle data may be aggregated over time for a personal vehicle; multiple vehicle data may be aggregated over time for a fleet or group.

Figure 16:
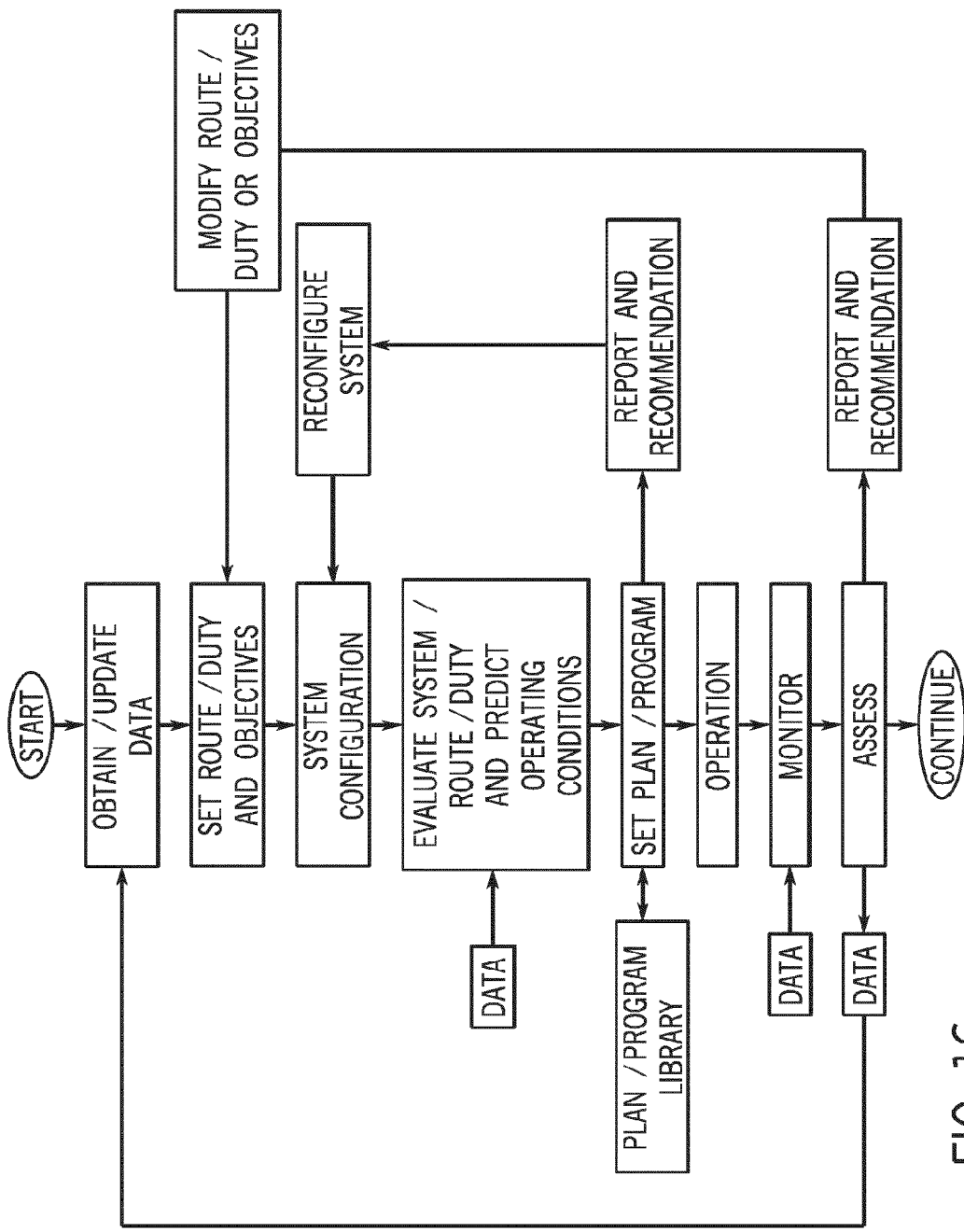
FIG. 16 is a schematic flow diagram of the operation of a management system with predictive control for a vehicle system such as an energy storage system for a vehicle according to an exemplary embodiment.
Figure 17:
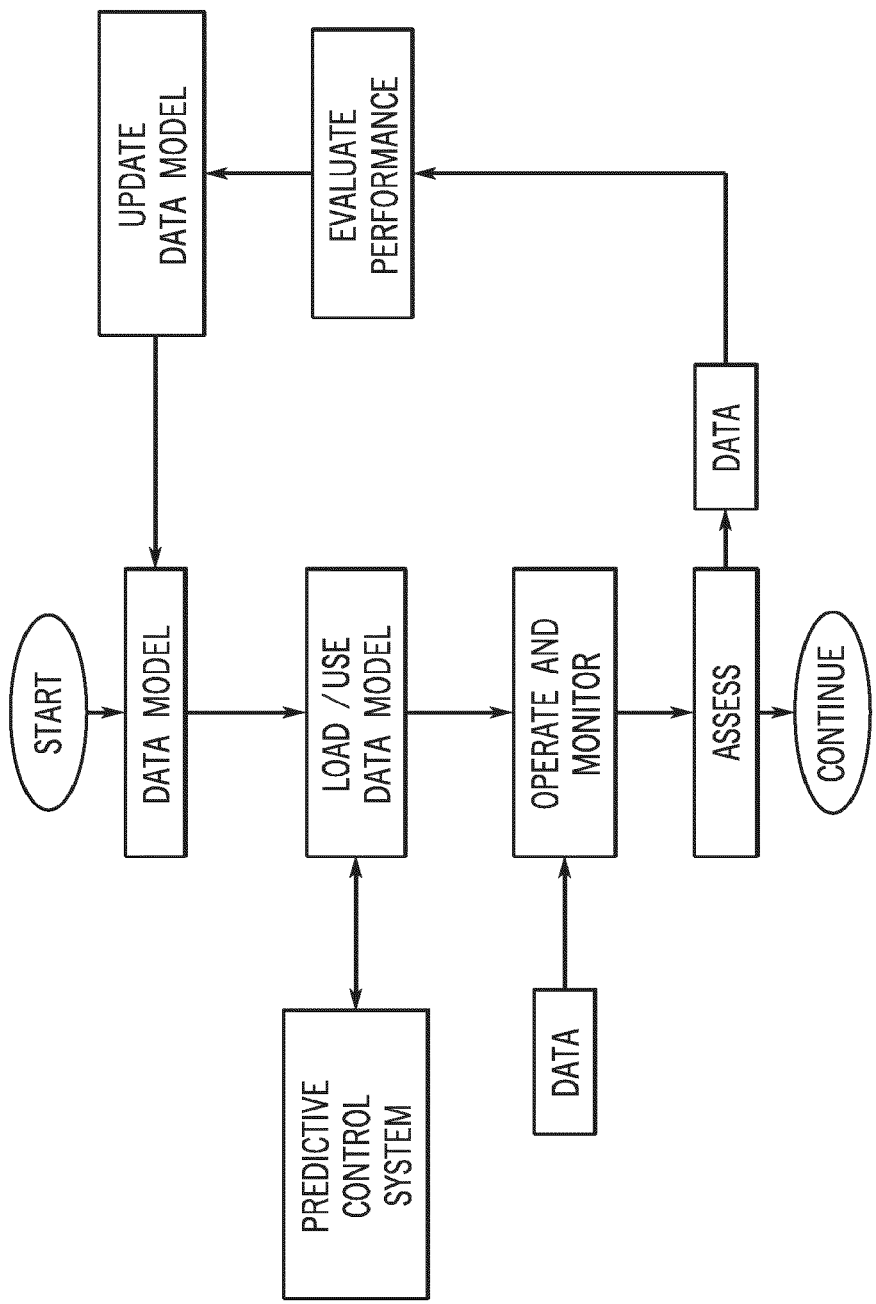
FIG. 17 is a schematic flow diagram of an analytics function of a management system for a vehicle system with predictive control operating according to a data model according to an exemplary embodiment.

As indicated schematically in FIGS. 16 and 17 according to an exemplary embodiment, data acquired and processed for the analytics function can be used to improve the detail or accuracy of data models for components of the vehicle systems. For example, actual performance data for a particular type of battery module may be processed in an analytics function to improve the accuracy of the data model associated with battery module; an updated data model may be made available to management systems for vehicles using the battery module in a battery system.

According to any exemplary embodiment, the management system is configured to use data from data sources to enhance the performance of the energy storage system and/or vehicle in operation, for example, to improve energy efficiency to extend component life, to optimize performance of duties, to reduce the occurrence of malfunctions/failure, to ensure proper use of components, to manage service routines, to manage and optimize product life-cycle, etc.

Management of Energy Storage System

According to an exemplary embodiment, the management system is configured to manage operation, configuration and other functions of an energy storage system for a vehicle. See FIGS. 1A-1B, 2A-2B and 13.

According to an exemplary embodiment, the vehicle with an energy storage system is operated in a configuration to perform duties such as travel on a route at the direction of the management system under the operating conditions. See FIG. 2B. The duty to be performed by a vehicle in a particular configuration may comprise a route having a destination and/or activities.

According to a preferred embodiment, the vehicle will be configured and operated duty to fulfill objectives and criteria considered by the management system for vehicle systems. See TABLE J.

According to an exemplary embodiment, the management system is configured to use data in combination with objectives/considerations in a plan to manage the energy storage system in the performance of each duty assigned to or performed by the vehicle. See FIGS. 2A-2B and 6 and TABLES A-J. According to an exemplary embodiment, management of the energy storage system comprises management of operation of a battery system (and if also in operation a fuel cell, capacitor circuit, fly wheel, thermal storage, etc.). See FIGS. 6 and 9A-9C. According to an exemplary embodiment, the vehicle may be provided with other vehicle systems to be related to the energy storage system under management such as a wireless power source (e.g. beamed/transmitted power available at a station or at a street location) or a solar collector (e.g. an array of solar cells) to obtain energy for the energy storage system (e.g. the battery system to provide energy to charge components of the battery system); vehicle systems related to the energy storage system under management may also comprise a regenerative braking system to provide energy to the energy storage system. According to any preferred embodiment, the management system will be configured with a computing system as a control system (among other components) to manage the operation of any such systems in coordination with the energy storage system and power conversion system as indicated schematically in FIGS. 1A-1B, 3, 6 and 7A-7B.

Figure 14:
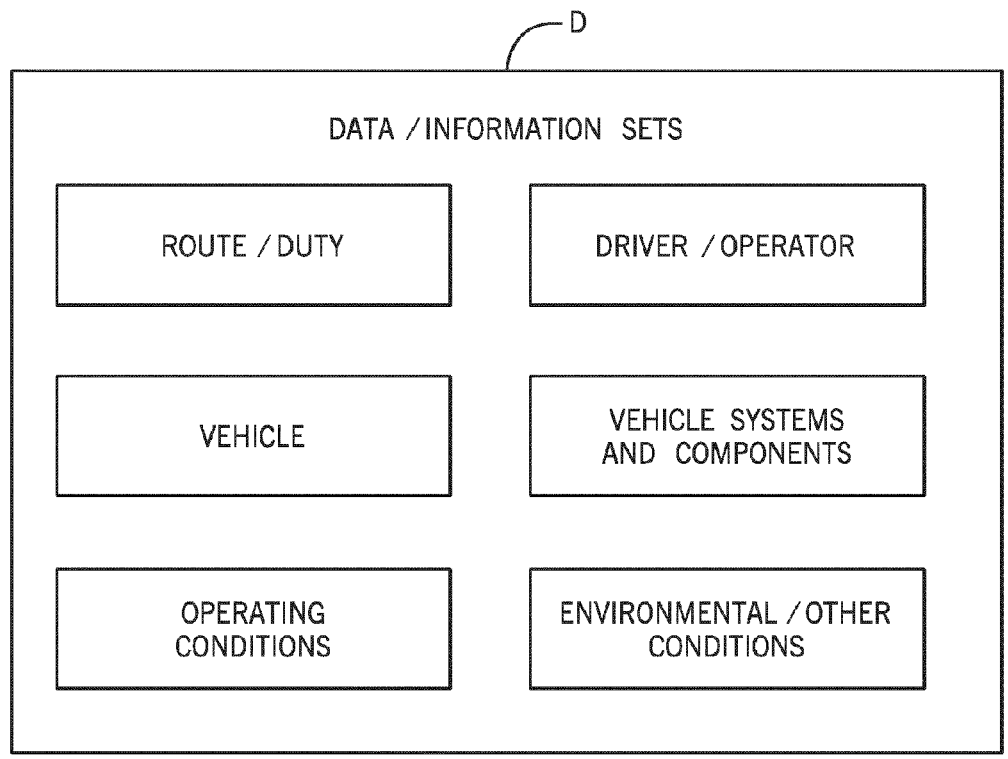
FIG. 14 is a schematic system block diagram of types/categories of data sets for a management system for a vehicle according to an exemplary embodiment.

The management system is configured to use data and information to plan the operation of vehicle systems such as the components of energy storage system based on data and information available to the management system from data sources at the vehicle and from connectivity to data sources external to the vehicle as indicated in FIGS. 2B and 14. According to an exemplary embodiment, data connection for the management system may comprise connection to a vehicle computer system, a vehicle network, a remote network comprising the internet, a local area network, a home network, a wireless network, a data transfer interface to a network, commercial network, proprietary network, or to a data transfer interface to a network. See FIGS. 2A-2B, 3 and 18. According to an exemplary embodiment, wireless data transfer may be used for data backup to a data center or to an inventory management system for components of the energy storage system (such as battery modules of a battery system) as indicated schematically in FIGS. 4A-4C, 10A-10G and 12A-12B.

According to an exemplary embodiment, the management system comprises a network-connected computing system configured to manage and direct operation of vehicle systems related to the energy storage system. See FIGS. 2A-2B, 3, 5 and 6. As indicated in FIGS. 4A-4C, 6, 7A-7B and 8, the management system provides and/or is connected to a controller or control system (including the interface system) for each vehicle system and for the energy storage system. According to an exemplary embodiment, the computing system is connected to data sources on the vehicle (e.g. providing data relating to the vehicle and vehicle systems) and to data sources external to the vehicle (e.g. providing data related to operation of the vehicle and vehicle systems).

According to an exemplary embodiment, the computing system is configured to use data from data sources to create a management plan for operation of the vehicle and vehicle system such as the energy storage system (e.g. battery system) to perform the duties assigned to the vehicle based on criteria such as objectives and predicted conditions. See FIG. 14. According to an exemplary embodiment, the objectives for the management plan may include optimization of considerations such as energy efficiency, total operating cost, energy availability, emissions, extending component life, etc. See TABLE J.

As indicated in FIG. 14, the data/information sets may comprise route/duty data (e.g. database containing items of data and information as listed in TABLE D), driver/operator data (e.g. database containing items of data and information as listed in TABLE F), vehicle data (e.g. database containing items of data and information as listed in TABLE C), vehicle systems and components data (e.g. database containing items of data and information as listed in TABLES B and C), operating conditions data (e.g. database containing items of data and information as listed in TABLES G and H), environmental/other conditions data (e.g. database containing items of data and information as listed in TABLE I), resource/facility data (e.g. database containing items of information as listed in TABLE E).

Figure 13:
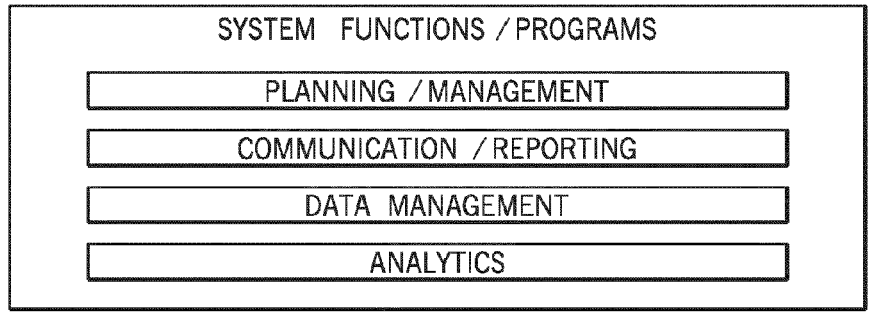
FIG. 13 is a schematic system block diagram of system functions/programs for a management system for a vehicle according to an exemplary embodiment.

Referring to FIGS. 13 and 14, according to an exemplary embodiment, the management system comprises a set of functions (functional modules) or programs and data/information sets for operation. Functional modules/programs comprise routines that may be implemented for a computing system by any means known or available suitable for the system (including but not limited to software programs, application programs/APIs, firmware, algorithms, data tables, etc. or other routines). As indicated in FIG. 13, the functional modules/programs comprise a planning/management module/program configured to perform the functions as shown in FIG. 16 as well as a communication/reporting module/program and a data management module/program (and optionally or according to an alternative embodiment an analytics module/program).

As indicated in FIG. 16, the management system under the management plan will provide signals to the controller for vehicle systems such as the energy storage system to operate the vehicle; data from the data sources is available to the computing system during operation of the vehicle and the vehicle system so that the management plan can be adapted to conditions of operation; according to an exemplary embodiment, performance of the duty during operation of the vehicle and the vehicle system can be monitored and assessed and managed according to management plan and according to the conditions of operation of the vehicle.

According to an exemplary embodiment, referring to FIGS. 14 and 16, a method of managing an energy storage system (such as a battery system) may comprise the steps of obtaining data relating to the vehicle in data categories from data sources, determining a route and duty, determining the configuration of vehicle systems, evaluating data to predict anticipated conditions for the route and duty, determining a plan for operation of the vehicle and vehicle systems, operating the vehicle; and monitoring the operation of the vehicle. The method may also perform the step of providing a report and recommendation for the operator or a manager. The method may further comprise the step of configuring the vehicle or re-configuring the systems and components of the vehicle before or during duty (e.g. configuring the battery pack or battery modules of the battery system). The method may also comprise in operation the steps of assessing the status of the vehicle systems, modifying the route or duty, providing a modified plan for operation, and obtaining data from data sources.

According to an exemplary embodiment, the computing system for the management system is configured with an operating system and programming a set of functions including a planning and management function to provide the management plan, a communication and reporting function to provide information relating to the vehicle, a data management function to manage data available to the computing system from data sources, and an analytics function to provide data to create a database relating to the performance of at least one vehicle system in operation. See FIG. 13. (According to an exemplary embodiment, the computing system comprises a micro-processor, data storage and a network interface and operates a program to implement the management plan as indicated schematically in FIG. 5.) Data storage comprises a set of stored programs to implement the management plan; a stored program can be accessed and loaded into the computing system from data storage to implement or adapt a stored program for the management plan. See FIG. 16 (indicating use of program from program library).

According to an exemplary embodiment, the computing system comprises a predictive controller configured to process data relating to anticipated conditions in the duty of the vehicle; the predictive controller provides a signal that comprises a control signal that is at least partially based on data from data sources to operate the energy storage system.

According to an exemplary embodiment, the communication and reporting function includes providing a report of the management plan and communicating information to an operator of the vehicle regarding the management plan in operation of the vehicle, such as instructions, recommendations and alerts to devices including over a network as indicated in FIGS. 1A-1B, 4A-4C, 13, 16 and 18. The information may be reported to a management center (such as a fleet management center). See FIGS. 10A-10G and 23 and example data sources for such data are listed in TABLE A.

The system is provided with connectivity to a data center at which a database is created so that analytics can be performed using data provided to the database from a plurality of vehicles. See FIG. 12A-12B. The database may include data from components of the vehicles, data from operating conditions of the vehicle, data from operation history of vehicle systems, or other data. The database for analytics is a data source for the computing system to develop the management plan.

Battery Management System

According to an exemplary embodiment where the energy storage system comprises a battery system, the management system for the battery system (e.g. battery management system) is configured to use data and information to plan the operation of the battery system based on data and information available to the management system from data sources at the vehicle and from connectivity to data sources external to the vehicle. See FIGS. 15A and 15B. As indicated schematically in FIGS. 7A-7C, 9A-9E, 10A-10G and 11A-11D, the battery system (BS) may comprise battery modules (BM) and/or battery pads (BP) for the vehicle (V). The battery management system for the battery system includes (a) a computing system configured to manage the battery system; (b) a controller to direct operation of the battery system; (c) connectivity to data sources on the vehicle providing data relating to the vehicle and the battery system; (d) connectivity to data sources external to the vehicle. The computing system is configured to use data from data sources to create a management plan for the battery system in operation of the vehicle to perform the duty based on criteria such as objectives and predicted conditions and to provide control signals for the battery system to operate the vehicle according to the management plan. Data sources are available during operation of the vehicle so that the management plan can be adapted to the conditions of operation. Performance of the battery system (including components such as battery modules) of the vehicle and the vehicle in operation of the duty can be monitored, assembled and managed according to management plan and the conditions of operation.

According to an exemplary embodiment, the management plan may direct and/or may at least partially based on the configuration of the battery system including the types of battery modules to be installed in the battery system. According to an exemplary embodiment, the battery management system comprises and/or directs a battery system controller for the battery system; the controller for the battery system accordance with the management plan directs the flow of energy into and from the battery system (and each battery module) according to the type of each installed battery module and the operating conditions for the vehicle.

According to an exemplary embodiment, the controller directing the use and supply energy to the battery system may be configured to control operation of battery system components and modules; the controller may also be configured to direct operation of systems such as the interface system of the battery system, a switching circuit for the battery system, a protection circuit for the battery system, a voltage balancing circuit for the battery system, a thermal/environmental management system, and other circuits and systems of the battery system. According to an exemplary embodiment, the controller of the battery system controls an interface circuit/system for the battery system under direction of the management plan of the management system. See FIGS. 6 and 8.

The battery management system is configured to manage the discharge and charge of each battery module of the battery system according to the management plan during operation of the vehicle. See FIGS. 15A-15B. According to an exemplary embodiment where the energy storage system comprises a battery system, the data sources will generally comprise data relating to battery system configuration, installed battery modules/packs, battery system controller functions, battery system status and battery system operating history. See FIGS. 15A and 15B. According to an exemplary embodiment, the battery system comprises interchangeable battery modules so that a battery pack of the battery system can be selectively configured by selection and installation of individual battery modules that each provide a characteristic so that the battery pack provides a composite characteristic based on respective characteristic of each battery modules in the set of battery modules. See FIGS. 9B, 10 and 11A-11C.

Figure 15A:
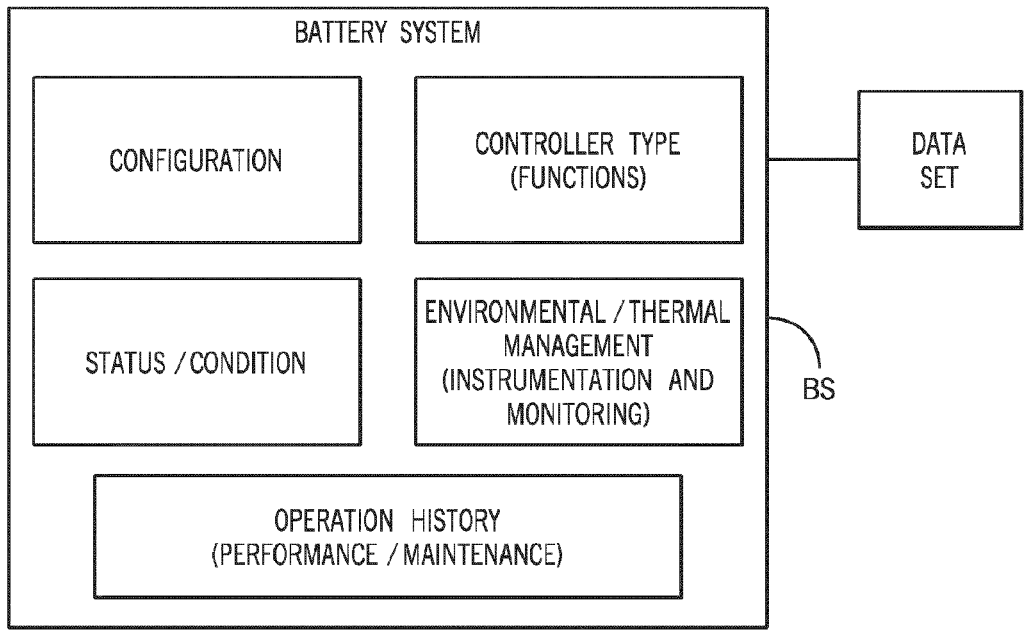
FIGS. 15A and 15B are schematic system block diagrams of types/categories of data from a vehicle system shown as a battery system and from components of a battery system for a vehicle according to an exemplary embodiment.
Figure 15B:
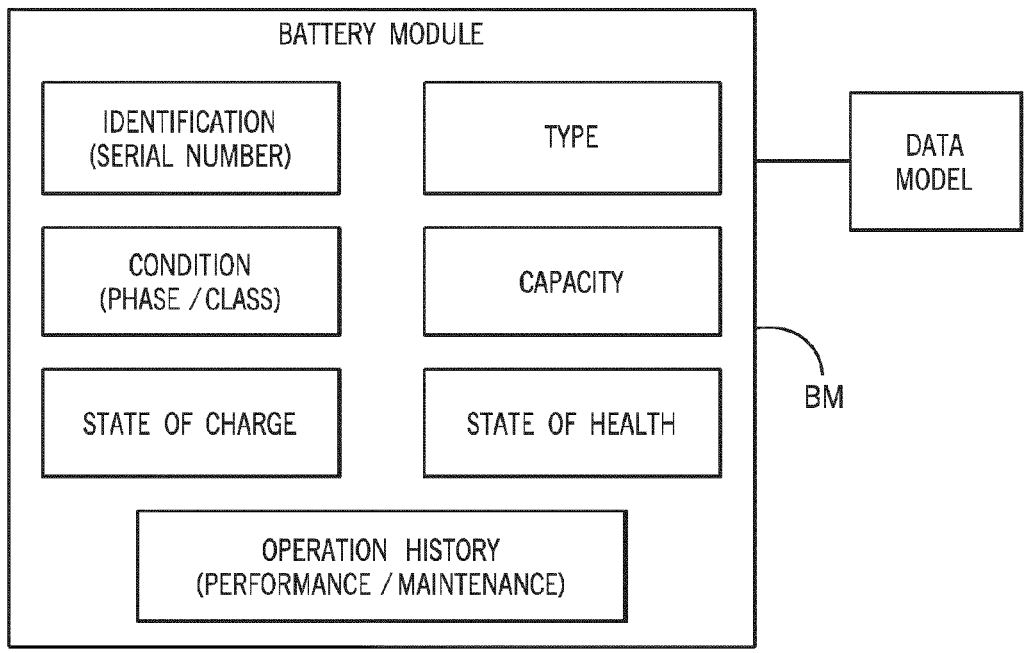

FIG. 15B is a schematic block diagram of a battery module for the battery system of a vehicle according to an exemplary embodiment. As shown schematically in FIG. 15B, each battery module type and battery module will have a data set comprising a data model (e.g. data records and stored data/software model of expected performance) that can be accessed and used in the battery management system so that performance of the battery module (e.g. individually and in combination in the battery pack/system) can be modeled, predicted and managed according to a management plan or program/routine. Analytic data as to performance of a battery module type and individual battery module can be recorded and stored and evaluated and shared to improve the accuracy of the data model and/or other data used by the management system. Data as to performance flaws/limitations for a battery module (e.g. individual module or type) can be recorded and used in updated databases accessible by the management system to enhance operation of the battery system (e.g. improve data quality/accuracy). Data records such as data models for battery types and modules may be updated periodically in the data model and/or for access and use by the battery management system.

According to an exemplary embodiment, the battery system and each battery module in the battery system in combination are configured to provide data to the management system. Items of data may be measured or calculated (or estimated) or obtained from storage depending upon the configuration. See TABLES A-I. Data and information provided by the battery system to the management system includes the system configuration (e.g. the type of battery packs/modules and other components such as ultra-capacitors, etc.), the type of controller for the battery system (e.g. the functionality of or commanded by the controller such as to shunt current or to perform voltage shifting/balancing between battery modules, etc.), the status and condition of the battery system, the instrumentation and functionality of the environmental and thermal management system (e.g. heat exchangers, fans, temperature monitoring devices, etc.), and operation history (e.g. data acquired during operation of the battery system and of service or maintenance of the battery system such as charging/recharging and reconditioning, other stored data, etc.). See FIGS. 15A and 15B.

As indicated in FIGS. 15A-15B and TABLE B, data and information provided by a data source and/or from a data model for an individual battery module (e.g. a single-cell or multi-cell module) includes an identification (e.g. serial number and manufacturer, manufacture date, service date, etc.) as to facilitate tracking, the type (e.g. cell configuration, chemistry, operating parameters and capability such as high-rate charge/discharge, high power, deep discharge, long cycle life, etc.), the condition of the module (e.g. classification of the module conditions, temperature, etc.), the capacity of the module (e.g. voltage and amount of stored energy available), state of charge (e.g. voltage and related parameters), state of health (e.g. age/aging factors, impedance, capacity variations, life cycle status, energy throughput, etc.), and operation history (e.g. performance of module, discharge and charge data/life cycle data, maintenance and reconditioning, event history, other stored data, etc.).

According to an exemplary embodiment, data sources will be provided to interchange data with (e.g. make data available from-to) the battery management system; data sources will comprise various sets of updated/recorded and stored data records associated with the battery system in the management of the battery system. According to an exemplary embodiment, the data records available on the network can be used at a data center for an analytics function to manage the use of battery modules in vehicles, for example, to facilitate life-cycle management of each battery module in a battery system or inventory (e.g. the life-cycle for the battery module is managed according to data records to suggest recommended use of each battery module). Data records available on the network may be used to optimize use of battery modules in vehicles according to battery type, based on state of charge of the battery module, state of health of the battery module, operation history of the battery module; the battery module recommended by the management plan/system for a battery system configuration for a vehicle performing duty following a route may be based on predicted needs in consideration of corresponding data records for each installed/available battery module (e.g. type, rate of energy charge and discharge, energy storage capacity, depth of charge and discharge or number of charge-discharge cycles, etc.).

According to an exemplary embodiment, data sources will comprise a set of data records for each individual battery module, such as a model number of the battery module, a serial number of the battery module, an initial use date for the battery module, a manufacturer name and manufacturing date for the battery module, a rating for the battery module, history of use information, battery chemistry type, manufacturer information for the battery module, battery form type information for the battery module, battery usage data for the battery module, total energy throughput for the battery module, battery maintenance data for the battery module, service information for the battery module, the operation history for each battery module, projected remaining life for the battery module, environmental conditions of use for the battery module, event history for the battery module, state of health for the battery module, state of charge for the battery module, vehicle installation history for the battery module, vehicle service history, recommended use of the battery module, recorded use of the battery module, environmental suitability, temperature range suitability, vibration resistance rating, remaining useful life for the battery module, recommended use, vehicle compatibility, environmental conditions history, etc. Data records for the battery system can be correlated using data from other data sources, such as commercially available data or other available databases, for example, by regulating use and deployment.

According to an exemplary embodiment, the system may provide an identification tag for each battery module (for example an RFID tag or RFID device or other data transmission element, wireless transmitter/receiver) that may contain data records and a data model for the battery module. See FIGS. 10A-10C (showing identification tags schematically as indicating "A" or "B" or "C").

According to an exemplary embodiment, data records may comprise characteristics and attributes of the battery module, such as battery cell chemistry, cell performance for the battery module, battery design information, battery type, cost for the battery module, performance characteristic for the battery module, vehicle compatibility information for the battery module, prior vehicle installation use for the battery module, recommended use of battery module in a vehicle, prohibited use of battery module in a vehicle, performance characteristics for the battery module weight, brand/manufacturer, date of manufacture, life-cycle data for the battery module, warranty information for the battery module, battery management system data, battery module use/misuse data, projected remaining life, state of battery charge, state of battery health and prior use history. Data records available on the network may be used by the management system to optimize useful life of each battery module.

Predictive Controller Implementation

According to a preferred embodiment, the management system (shown schematically in FIGS. 1A-1B, 2A-2B and 13) will comprise a predictive control system configured to use data from network-connected data sources (see TABLES A-J) to operate a management/control program through a management plan (implemented through a computing system, see FIG. 5). FIG. 16 is a schematic flow diagram of the method of operation of a management system with predictive control for an energy storage system for a vehicle according to an exemplary embodiment. (FIG. 17 shows the use of data from the method to update the data model of a component such as a battery module used by the predictive controller of a battery system.)

According to a preferred embodiment, the management system is configured to employ program and routines that implement a predictive controller (e.g. operating program or routine) to enhance system performance and optimize operation for a system configuration in the operating conditions; the predictive controller of the system may be configured to use stored/available data and information to plan and predict and anticipate and evaluate conditions and then implement control routines for the system in operations as to optimize performance against specified or selected criteria (or according to a selected mode of operation in the conditions of operation (e.g. in real-time). See FIGS. 13-14 and 16, 18. See also TABLES A-J.

According to an exemplary embodiment, the predictive controller routine of the management system will be configured to use data and information including the current battery system configuration to manage (e.g. optimize) energy storage and energy discharge for the battery system. According to a preferred embodiment the management system will be programmable to manage wide variety of battery system configurations that will comprise packs/battery modules of a wide variety of types over a wide variety of conditions (e.g. use/demand, operating, environmental, etc.). See FIGS. 10A-10F and 16.

According to an exemplary embodiment as indicated in FIG. 16, the predictive controller of the management system will use (among other data) monitored/internal configuration and state of charge/health information as to each battery module from the battery system in combination with external/acquired information such as driver identity, anticipated duty/use, vehicle driving patterns, location/route, time of day, traffic and weather, regulations and restrictions, local energy/fuel cost and availability, other programming or user input information (e.g. as to preferences, usage, duty/load, etc.) to manage the operation of the battery system according to a management plan or program. The management plan is based on predicted conditions of operation (see TABLES E, G, H, I) for the battery system and vehicle and objectives for the system operation (see TABLE J) in view of the configuration (see TABLES B, C). The predicted conditions may comprise operating conditions of the vehicle expected in the duty, such as environmental conditions in which the vehicle is expected to operate, route topography and grade, etc.

According to an exemplary embodiment, the management system will be configured to implement (predictive) energy transfer to allow control and optimization of the installed battery system configuration in anticipated operating conditions for the duty/route of the vehicle according to considerations and objectives. See TABLE J. The management plan may comprise the plan for the entire route or duty to be performed by the vehicle and contingent plans or routines for stages or segments of the route in the operating conditions. For example, if the route includes travel along a variety of segments having varied road conditions such as uphill grades and downhill grades and/or in segments in varied traffic conditions such as city and highway operation, the management system will be configured to create and operate plan segments as to manage the battery system (e.g. charge, discharge and transfer of energy) for each segment of the plan.

The management plan will be created in accordance with the conditions predicted to be encountered by the vehicle in the duty/route according to the capability of the vehicle as configured. For example, with a battery system configured with a battery pack comprising high-rate battery modules, operation of the vehicle by the plan may be directed as follows: (a) advance of anticipated periods of available energy from the regenerative braking system such as on downhill grades or in stop-and-go traffic conditions the battery system will discharge high-rate battery modules so that regenerative power can be accepted and used for charging; (b) in advance of anticipated increased demand such as on uphill grades or entering an expressway from an on-ramp the system will charge the high-rate battery modules so that power is available for discharge and acceleration of the vehicle; (c) identified available periods of reduced intensity of use can be used for management operations such as voltage-level shifting or cell balancing between battery modules. According to an exemplary embodiment, if the vehicle comprises alternative systems/sources of energy supply (such as a waste heat recovery system or a solar panel array configured to provide energy for recharging battery modules), the management system can use route/direction and weather and time of day to plan optimize utilization of the system/source to charge the battery system.

According to an exemplary embodiment, if any battery module monitored is determined to be exhibiting a problem or potential malfunction, the management system can be configured to adapt to the condition, for example, to adjust the determined capacity of the module, to limit use of the module (e.g. pending further evaluation), to run a set of diagnostic tests, to perform a re-conditioning operation on the module, etc. The predictive control system can evaluate components of the battery system in an effort to prevent serious malfunction while not comprising functionality (when possible) by adapting the management plan. In operation, the management system will provide a communication to the operator (and others), will adjust the program/routine for the route or duty and will adjust demand on the other battery modules in the battery system in the operating conditions. For example, if a battery module is determined to have developed an increased internal resistance or impedance (a condition likely to cause potentially higher operating temperatures) the management system can direct the thermal management system to attempt to maintain proper/desired operating temperatures in the battery system (e.g. cooling the battery compartment) while limiting the use of the battery module so that the risk from the battery module is reduced (e.g. the module is used only at or within a reduced ambient or environmental temperature range and is used in a reduced-demand manner such as for backup capacity rather than as high-rate battery module). According to an exemplary embodiment, a battery module that is otherwise susceptible to overheat conditions can be managed to reduce the risk of serious malfunction of the system (e.g. a risk of failure or fire/hazard); a battery module that is at a reduced capacity can be managed to reduce the risk of serious malfunction of the system (e.g. a risk of anticipated energy called upon by the vehicle not being available).

According to an exemplary embodiment, the array of battery modules in the battery system can be managed during use so that after a use event such as sudden braking and supply of regenerative energy to high-rate modules in the battery system a routine can be performed to balance the voltage levels of the battery modules (e.g. to reset voltage levels for the battery modules to a pre-determined system baseline voltage level); for example, on a route that may comprise intermittent periods of relatively intense high-rate charge and discharge of energy and then reduced intensity of energy demand/use, the management system may be programmed to perform a periodic voltage-leveling operation during use of the battery system.

The system may be configured to coordinate management of the battery system with operation of other vehicle systems. For example, the management plan may predict (based on energy cost and use/demand) when a power plant or other energy source can or should be used for recharging the battery system.

User Interface for Management System

According to an exemplary embodiment, the management system will provide a user interface (UI) that provides information and options at the vehicle or to remote/mobile or other computing devices/systems. See FIGS. 1A-1B, 3, 4A-4C and 5.

According to an exemplary embodiment, the user interface for a vehicle and/or vehicle system may be provided in any of a variety of configurations depending upon any of a variety of considerations (including but not limited to data access and security/safety). For example, a vehicle system may have a user interface provided in the vehicle instrument panel (e.g. within the standard vehicle user interface), in a separate control panel (e.g. on or associated with the vehicle system), in a restricted-access area (e.g. for a rental vehicle with the control panel/user interface in a restricted-access location such as a vehicle trunk that is not intended to be accessed by the operator but only by an authorized service attendant of the dedicated interface). According to an exemplary embodiment, the user interface can be provided over a network (e.g. in a manner used for network-connected devices of a variety of type) so that data access and updates as well as system/data operations (such as status review and data/firmware/program maintenance and updates) can be provided from external computing locations (e.g. with a standard program/computer interface or other application including an application program such as a "mobile app" or program available for a mobile device such as a smart phone or tablet computer).

Information provided at a user interface for the system may include regular (or on-demand) real-time reporting and communication of operator status (e.g. monitoring of selected systems), system capacity and availability, usage history, use suggestions/recommendations, current forecast conditions, reminders, cautions/warnings, maintenance suggestion/recommendations, messaging (e.g. text or email), GPS data/maps, facility/resource locations and types, current operating mode, system help, etc. Options provided for a vehicle to a user/operator (e.g. driver of vehicle or fleet manager or data center) may include driver identification/preferences, data storage operations (save/store/open/load/etc.), GPS (e.g. routing, display, etc.), operating modes (e.g. power/efficiency/balanced/custom/etc.), operating programs (for management systems), network access options, internet/browser access, communications options (e.g. device/network interface and connectivity), emergency/911 contact, trip plans and profiles, resource/facility use plans, maintenance and service plans, condition report format, status report format, etc. Data communications at a user interface may be presented in any form such as visual, audio, audio-visual, etc.

According to an exemplary embodiment, the management system can be configured to provide a user interface/display through a dedicated display/device or to allow display/communication and access through existing or installed/other systems in the vehicle or other computing devices available on the network through an application/program or by an internet/web browser (or by other means). According to an exemplary embodiment, the management system will be configured so that data and information (including as to real-time status and operation) can be accessed by network when network access is available by designated users (e.g. at work/home computing devices, by mobile devices/smart phones/tablets, at data centers, at fleet management centers, at other vehicles, etc.). See FIGS. 1A-1B, 3 and 4A-4C. Access to the management system (by network connection) can be configured to require a security code or password (e.g. using conventional/known security protection systems). As shown schematically according to an exemplary embodiment in FIGS. 4A-4C, a vehicle having vehicle systems (such as an energy storage system, etc.) is provided with a computing system with a computing device C and network interface/adapter Nanda user interface UI; the computing system is connected to the management system of the vehicle and allows certain management operations to be performed by the operator or occupant of the vehicle (e.g. before, during or after use of the vehicle for duty). See also FIGS. 12A-12B and 18 (indicating networked data connection to vehicles and energy storage systems such as battery systems/packs).

Battery System Configuration

According to an exemplary embodiment, the energy storage system comprises a battery system. See FIGS. 1A-1B and 2A-2B. As indicated schematically in FIGS. 7A-7C, 9A-9E, 10A-10G and 11A-11D, the battery system (BS) may comprise battery modules (BM) and/or battery pads (BP) for the vehicle (V). As indicated schematically in FIGS. 7A, 9A-9D, 10A-10G and 11A-11E the battery system (or array) may comprise one or more battery packs that comprise one or more battery modules (e.g. component batteries of single-cell or multiple-cell construction) of different types and characteristics. According to an exemplary embodiment where the energy storage system is a battery system, the management system will comprise a battery management system as shown schematically in FIGS. 7A-7B. As indicated schematically, the battery management system of the vehicle may be configured to allow network-connected access from various other computing systems, such as mobile devices, home/office computers, fleet/service center, data center, etc. See FIGS. 4A-4C.

According to an exemplary embodiment, the energy storage system may comprise a battery system with battery pack and other energy storage/delivery components (e.g. non-chemical energy storage systems). See e.g. FIGS. 9A-9E. For example, as shown schematically in FIG. 9E, according to an exemplary embodiment, the energy storage system comprises a battery system/pack with a set of battery modules and a fuel cell module (configured to produce energy) and capacitor module (e.g. with ultra-capacitor system configured to store energy).

Figure 7A:
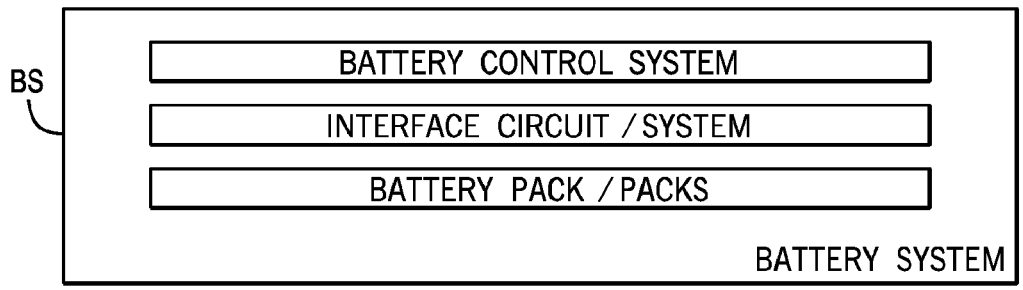
FIGS. 7A to 7C are schematic block diagrams of a battery system for a vehicle according to an exemplary embodiment.
Figure 7B:
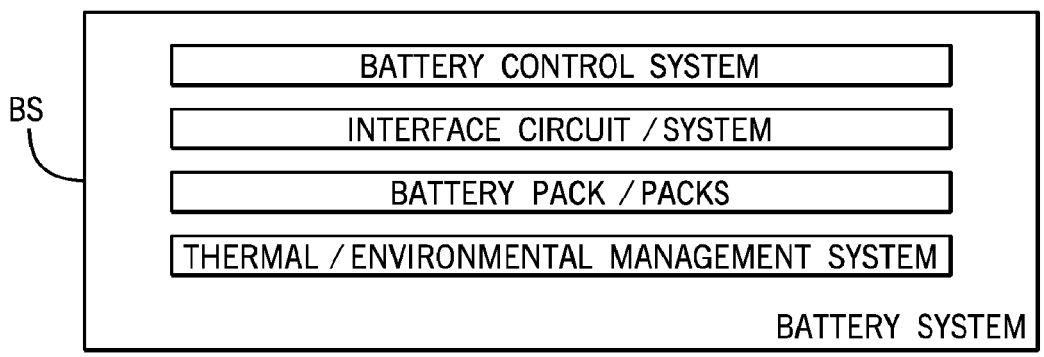
Figure 7C:
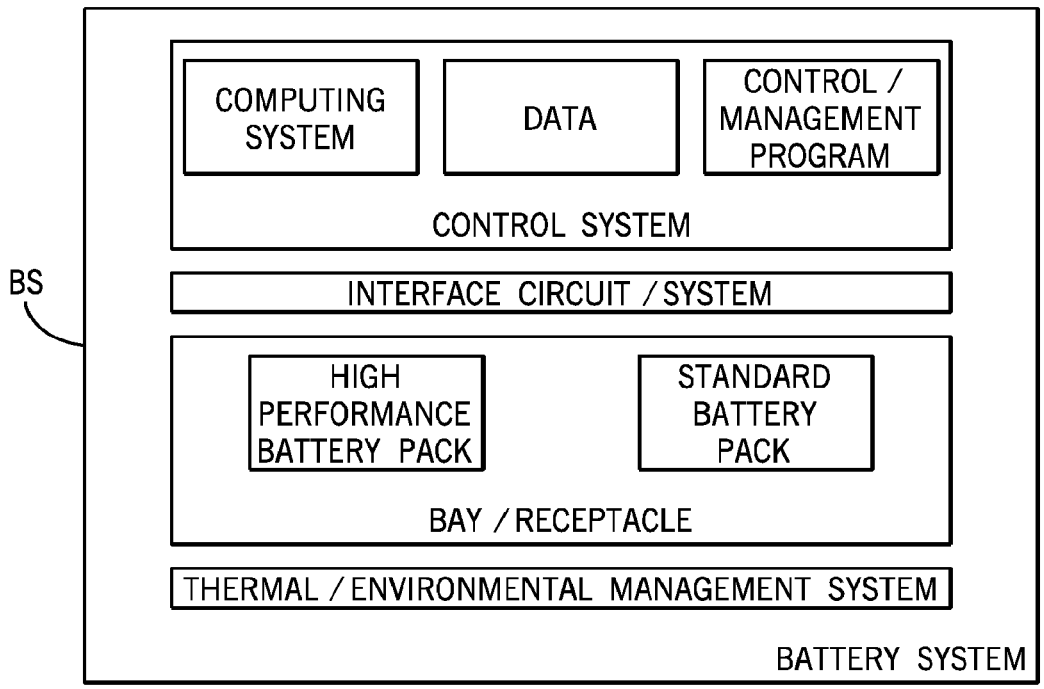

Referring to FIGS. 7A and 7B, energy storage systems shown as battery systems for a vehicle are shown schematically according to an exemplary embodiment. The energy storage system may comprise a battery system including a set of battery packs (each pack comprising a set of battery modules comprised of at least one battery/cell); the battery system may also comprise an interface circuit (comprising a switching circuit) and other components to vehicle systems and loads that are to be powered by the battery system. See FIGS. 6, 7A-7B, 8, 9A-9E and 11A-11D. The energy storage system/battery system may also comprise a thermal/environmental management system configured to monitor and control the temperature and environment of the system components (e.g. battery modules) within desirable or proper limits (or to shut down and protect components as appropriate). See FIGS. 7B and 8.

The battery modules (or component batteries) may have different cell chemistries and/or forms so that the battery system is itself a hybrid battery pack. For example, a battery module may comprise a lead-acid cell chemistry, lithium-ion cell chemistry, lithium-polymer cell chemistry, nickel cadmium cell chemistry, etc.; the battery module may comprise various types of forms or configurations within a cell chemistry category, e.g. flooded cell or dry cell, flow cell, cylindrical or prismatic form, etc. Categories of battery type may include a high capacity, high power, high energy, deep discharge, extended cycle life, high efficiency and rapid recharge, etc. (or other types available now or with future advances in technology).

As shown schematically in FIGS. 9A-9E, according to an exemplary embodiment, the battery system may be configured to comprise a battery pack (FIGS. 9A-9C and 9E) or a set of battery packs (FIGS. 7A-7C and 9D); a battery pack may be configured to comprise a set of battery modules (e.g. a battery or battery cell/combination of cells). As shown schematically in FIG. 7C, the battery system may be configured with multiple bays or receptacles for installation of (modular) battery packs; according to an exemplary embodiment, the battery system may be configured as indicated with a bay for a high-performance battery pack (or battery module) and a bay for a standard battery pack (or battery module). As indicated, according to an exemplary embodiment, separate bays may be configured for installation of different types (e.g. sizes, fits, interconnection, etc.) of battery packs/modules; separate bays may be configured identically according to an exemplary embodiment. As shown schematically in FIG. 9C, bays or receptacles for battery modules in a battery system or battery pack may be configured for installation of different types of interchangeable battery modules (or may remain empty or may contain a battery module that is or has been disabled, e.g. after a fault condition has been detected).

As indicated schematically in FIGS. 8 and 10A-10G, a battery pack/battery module for the battery system may be configured to include the battery (e.g. energy storage component such as electrochemical cells) and other components (e.g. interface system and data components) for interfacing the battery system. According to an exemplary embodiment, the battery system will be configured to provide mechanical adapters and/or electrical (interconnect) adapters to accommodate physical fit and proper use of any of a wide variety of types of battery modules. According to a preferred embodiment, battery modules will use standard connector configurations (e.g. plugs and interconnects).

As shown schematically in FIG. 15B, each battery module type and/or battery module will have a data set comprising a data model (e.g. data records and stored data/software model of expected performance) that can be accessed and used by the battery management system. As indicated, the data model for component or vehicle system may comprise a data set and/or a computational model/program or algorithm to predict performance and condition/status of the component. (The term "data model" is intended to cover any type of data-based model, algorithm-based model, computational-based model, etc. for any type of component or system, without limitation.) As indicated schematically in FIGS. 11A-11E, the battery module type (e.g. A, B, C, D, etc.) can be indicated on an identifier such as an identification tag (e.g. RFID tag) for the battery module; the tag may also comprise data storage such as the data model for a battery module and other data records for the battery module. According to an exemplary embodiment, the identifier may be a tag or other element to contain and interchange data such as data records for the battery module (in addition to a data model).

As shown schematically in FIGS. 9A-9E, a battery pack for a battery system for a vehicle may comprise a plurality of battery modules, for example, with the number of battery modules of the battery system/vehicle dependent upon the type of vehicle and the duty. For example, as shown schematically in FIGS. 1B, 9A and 11A-11E, the vehicle has a (reconfigurable or interchangeable) battery pack comprised of three (interchangeable) battery modules. As shown schematically in FIGS. 1B and 9B-9C, the vehicle has a battery pack comprised of at least three battery modules. The battery pack may comprise battery modules of different types indicated representationally as three types designated schematically as type A, type B and type C in FIGS. 9B, and 11A-11E (or a greater number of battery types). For example, a light duty vehicle such as a passenger vehicle or hybrid-electric vehicle may have a battery pack for the battery system comprised of fewer battery modules (e.g. one or two or three or four, etc.); a heavy-duty vehicle such as a work vehicle or passenger vehicle configured for long-distance transport may have a battery pack for the battery system comprised of a greater number of battery modules (e.g. three or four or five or six or more, etc.).

Figure 11A:
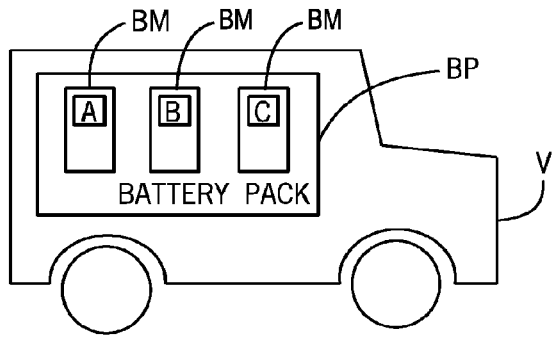
FIGS. 11A to 11D are schematic block diagrams of a vehicle with an installed configuration of interchangeable battery packs/modules for a battery system according to an exemplary embodiment.
Figure 11B:
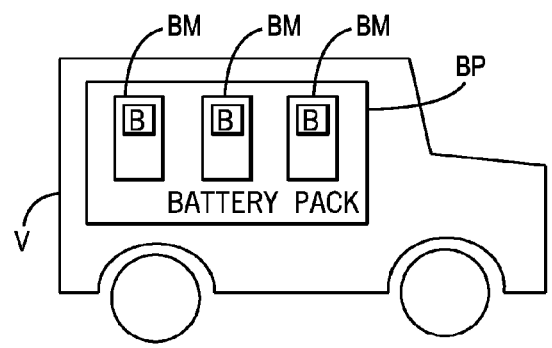
Figure 11C:
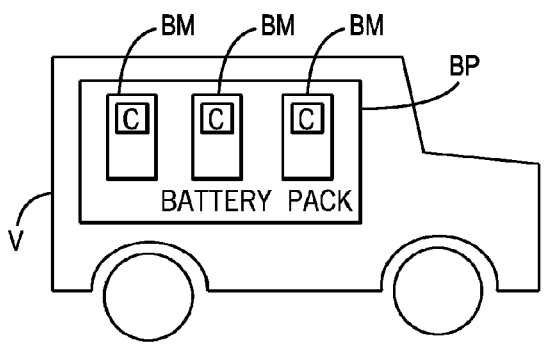
Figure 11D:
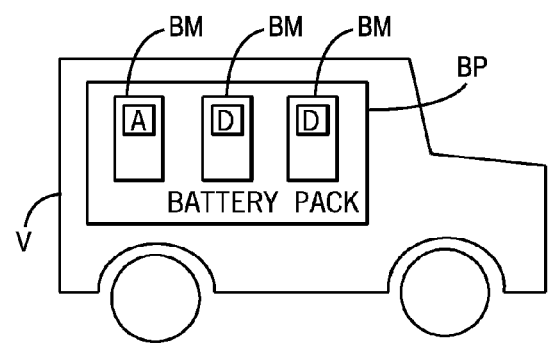
Figure 11E:
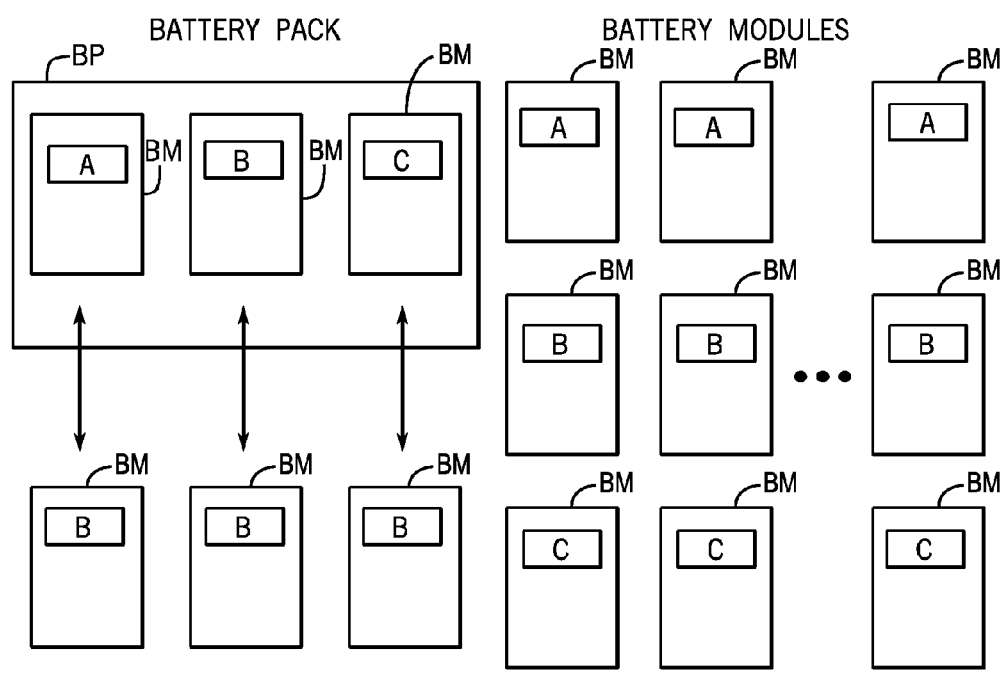
FIG. 11E is a schematic block diagram of a service center to service battery systems comprising installed interchangeable battery packs/modules for vehicles according to an exemplary embodiment.

Referring to FIG. 11E, a center for servicing and configuring battery systems for vehicles are shown schematically according to an exemplary embodiment. According to an exemplary embodiment, the battery system may be configured at any of a variety of outlets, including service centers, dedicated battery module interchange and/or installation outlets (e.g. "swap" centers), automated installation stations, fueling/recharging locations, community centers, home/residential garages or outlets, etc. As indicated schematically in FIG. 11E, the vehicle service center or location for service/maintenance of a vehicle may maintain an inventory of battery modules of different types for configuring a battery pack for a vehicle or vehicles. As indicated in FIG. 11E, according to an exemplary embodiment, the battery pack can be configured and reconfigured at a service center with various combinations of battery modules of different types depending upon the situation and planned/predicted use of the vehicle. As indicated schematically in FIGS. 9B and 11A-11D, according to an exemplary embodiment, the battery system for the vehicle may comprise a reconfigurable or interchangeable battery pack or interchangeable battery modules. As indicated schematically in FIG. 11E, interchangeable battery modules may comprise multiple types: for example, type A is a high-rate charge/discharge battery module; type B is a high-capacity battery module; type C is a battery module designed to withstand harsh environmental conditions (e.g. temperature extremes, shock/vibration, etc.); inventory may comprise various other types of battery modules indicated such as a "standard" type (e.g. type D) designed to balance use considerations for typical/standard conditions and/or to be suitable for lower-cost/high-volume production.

Interface System

Figure 10A:
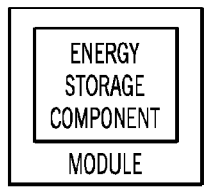
FIGS. 10A through 10G are schematic block diagrams of a module for an energy storage system such as a battery system according to an exemplary embodiment.
Figure 10B:
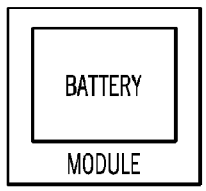
Figure 10C:
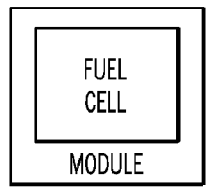
Figure 10D:
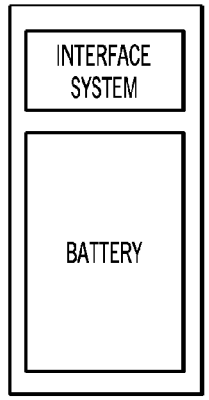
Figure 10E:
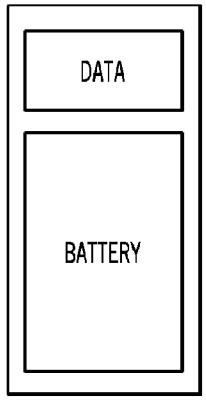
Figure 10F:
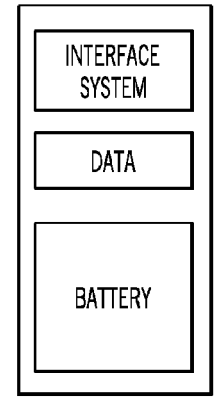
Figure 10G:
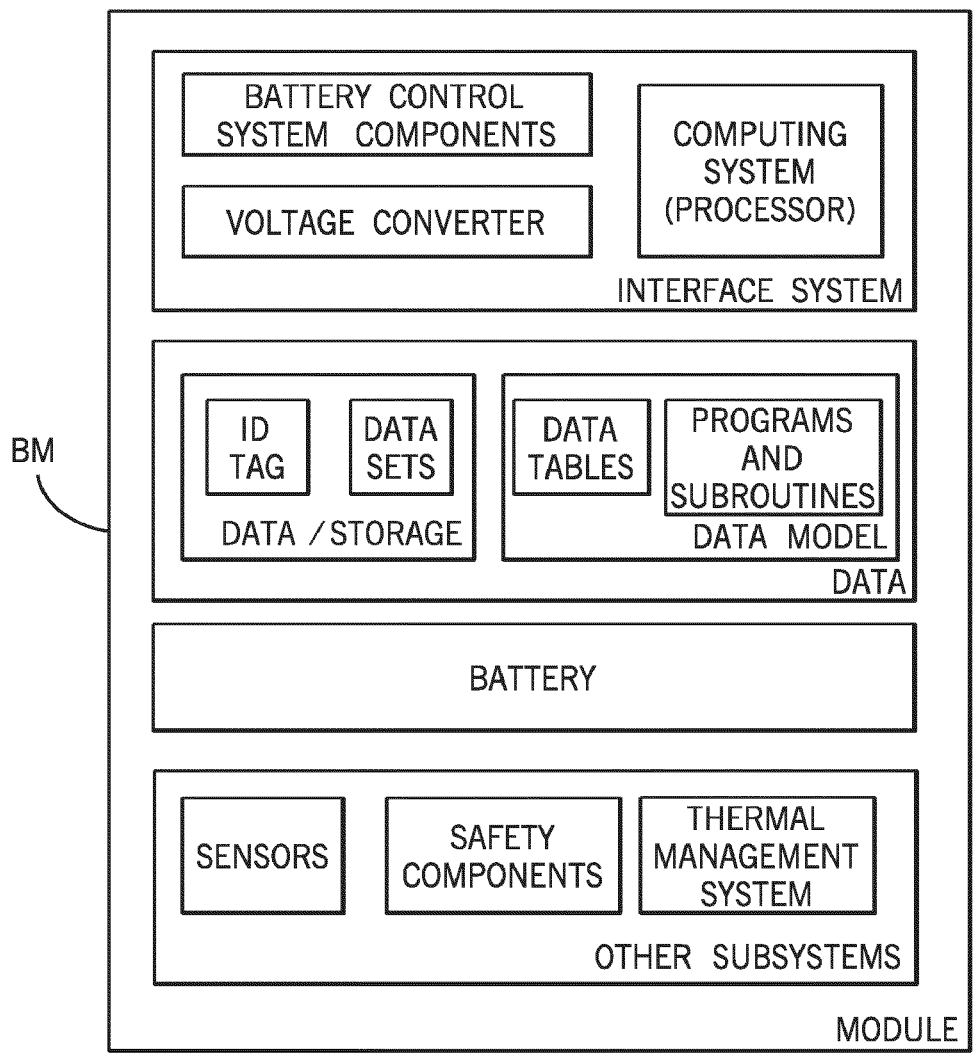

According to an exemplary embodiment, as shown schematically in FIGS. 6, 8 and 10G, an energy storage system (ESS) may comprise an interface system (IS); the interface system for an energy storage system such as a battery system may comprise an interface/switching circuit (e.g. for vehicle system interfaces), a voltage conversion circuit (e.g. to manage/balance voltage levels into and across modules/components), a control/charging circuit (e.g. to control and/or modulate charge/discharge waveforms/levels), and a protection circuit (e.g. to implement protection such as shutdown or selective shutdown as may be required under conditions). According to an exemplary embodiment, the interface system will be implemented with various known components and systems/strategies suited for operation and to facilitate interconnection/interface with vehicle systems.

According to an exemplary embodiment, as indicated in FIGS. 1B, 7A-7B and 8, the interface of the battery system is connected to the power conversion system of the vehicle and configured to allow for efficient control and management/monitoring of charge and discharge of battery packs and battery modules for use, operation, maintenance, etc.; as indicated schematically, the interface system/circuit is configured so that battery packs (and/or battery modules) are connected both to the power conversion system and interconnected to each other in the installed battery pack (battery module) so that operation of components/modules of the battery system can be managed as a complete system (e.g. optimized according to a control program for the installed battery system).

According to an exemplary embodiment, as indicated schematically in FIGS. 8 and 10G, the interface circuit of the battery system may comprise power switching circuitry (e.g. devices and components) configured to source or sink available energy and to facilitate voltage-level shifting between battery modules and control of charge and discharge (demand) of modules in operation at the direction of the management system. The management system and interface/control system will allow direction of operation of the battery system based upon the current battery system configuration and state and/or upon a control program/routine and/or operating conditions (e.g. regulating demand, state of charge/health, etc. based on state or status, time of day, external signals and internal measurements, pre-set conditions or parameters, model-based determinations, prediction/anticipation of conditions, monitoring/interpretation of conditions, etc.). See also FIGS. 15A-15B.

Referring to FIGS. 10A-10G, as shown schematically according to an exemplary embodiment, an interchangeable module for an energy storage system such as a battery system may be provided in a variety of configurations (e.g. suited for the configuration of the vehicle as indicated in FIGS. 1A-1B and TABLES C and D).

As indicated in FIGS. 10A-10C, the energy storage/source component for the module may comprise a battery (e.g. set of battery cells) or a fuel cell (or other component to provide energy for the vehicle); the module (as configured) may or may not comprise other associated components for the interface and interconnection to the energy storage system (e.g. dependent upon system design and/or whether the other associated components are installed within the energy storage system external to the module); the installation of the interchangeable module comprises a physical/electrical connection to the energy storage system (which will control and manage the module operation).

As indicated in FIGS. 10D-10F, the energy storage/source component shown as a battery for an interchangeable battery module (with an energy storage element such as a battery) for a battery system may be combined with other components and subsystems on the battery module, for example, an interface system and/or data/data storage component; the installation of the interchangeable battery module comprises the physical/electrical connection as well as electronic/data/network connection to (and through) the battery system for the vehicle as to facilitate control/management and data interchange (as indicated in FIGS. 14 and 15A-15B). As indicated, according to an exemplary embodiment, different vehicles and vehicle types and battery systems and battery types (e.g. size, chemistry) may have different battery module types for different uses. See e.g. FIG. 11E.

As shown schematically in FIG. 10G, the module (with an energy storage element such as a battery) may comprise an interface system with a computing/control system capability and control components such as a voltage converter (e.g. with suitable current/charging voltage); the module may comprise data such as data storage with data sets and identification for the module (see FIGS. 15A-15B and TABLE B) and a data model that may comprise data tables and programs/algorithms and subroutines (e.g. computational model) for the model; the module may comprise other subsystems and components such as sensors, instrumentation, safety components (such as alarm components and bypass/protection circuits and shutdown/fire protection systems, etc.) and a thermal management system (e.g. heat exchanger/heater, cooling system or interconnection to related vehicle systems). As indicated, according to an exemplary embodiment, the configuration of the module may be designed or adapted in a variety of forms to fit a wide variety of vehicles and vehicle systems and uses/duties.

According to any preferred embodiment, the configuration of the interface system will be arranged to match the configuration of battery packs/battery modules to be used in the battery system (e.g. including interchangeable battery packs/battery modules). See FIGS. 8, 10A-10G and 11A-11E.

Interchangeable Components/Battery Modules

According to an exemplary embodiment as shown schematically in FIG. 6, the energy storage system (ESS) may comprise interchangeable components or modules (ESM). As indicated in FIGS. 9A-9E and 11A-11E, interchangeable components of the energy storage system may have different performance characteristics (e.g. source/sink power such as electrical power at differing/varying rates and power/energy scale). According to an exemplary embodiment, when the energy storage system is a battery system (BS) with interchangeable battery packs/modules (BP/BM), the battery system and vehicle can be configured for variations in need or demand in duty or for the intended performance in the intended or anticipated conditions of use and operation of the vehicle by configuration (selection and installation) of interchangeable/modular battery packs and modules. See FIGS. 7A-7C, 9A-9E, 10A-10G, 11A-11E and 15A-15D.

As indicated in FIGS. 7A-7C, 9A-9E, 11A-11D and 15A-15D, in a vehicle comprising a battery system having a battery pack with interchangeable battery packs/modules, the ability and performance of the battery system to source and sink electrical power to vehicle systems can be modified by configuration of the battery system with the interchangeable components such as battery modules. See also TABLES A-J. According to an exemplary embodiment, the interchangeable battery modules may be categorized according to their respective ability to source/sink electrical power as a function of time and on a varying power/energy scale (e.g. by type/condition and operating parameters according to a set of standards) as shown schematically in FIG. 15B; the capability of the battery system will be a composite of (among other factors) the configuration of the interchangeable battery modules as shown schematically in FIG. 15A. According to an exemplary embodiment, the battery system is configured so that each battery pack comprises interchangeable battery modules that provide an equal output voltage (e.g. through the interface system, see FIG. 8) to vehicle systems such as the drive system (see FIGS. 1A-1C and 2A-2B) over a range of power/energy demand conditions.

Interchangeable battery modules may be characterized or classified by type (e.g. chemistry/design, number of cells, design/physical configuration, power density, energy density, cycle life, rate of charge/discharge, depth of charge/discharge, etc.) and by condition (e.g. age/phase of life, state of health, state of charge, measured/monitored parameters such as impedance/interval resistance and temperature, model-based interpretation of performance, history of use, etc.). See TABLES B-I. According to an exemplary embodiment, the configuration of the battery system can be adapted as indicated in FIGS. 11A-11E for specialization and/or optimization of the configuration for the anticipated duty/needs of the vehicle/system. As indicated schematically in FIGS. 1B, 9A-9C and 11A-11E, with multiple various types of interchangeable battery modules available, according to other exemplary embodiments it is possible to configure and reconfigure a vehicle or vehicles (e.g. in a fleet) with a battery pack/system in any of a wide variety of combinations intended to suit any of a wide variety of duty/route and activity conditions predicted or anticipated in a particular situation. As shown schematically in FIG. 9D, a battery system may comprise a set of battery packs having battery modules of a different type or age/phase/stage of life-cycle. See also FIGS. 26A and 26B.

According to an exemplary embodiment, each battery pack or battery module will provide a set of predicted or anticipated characteristics, as indicated in FIGS. 9A-9C, 11A-11D, 14 and 15B. For example, a first battery pack may be configured to provide a type of battery module that allows a relatively higher rate of discharge and charge acceptance (e.g. high rate module); a second battery pack may be configured to provide a type of battery module that has a relatively higher energy storage capacity (e.g. high capacity module); a third battery pack may be configured to provide a type of battery module that allows relatively deeper discharge of total energy in operation (e.g. deep discharge module); a fourth battery pack may be configured to provide a type of battery module that allows relatively more use cycles or total energy throughput during useful life (e.g. high cycle life module). Expected characteristics and performance of the battery system (and the vehicle in duty) can be modified to match or suit conditions by selective configuration of the battery pack/battery modules. Referring to FIGS. 9A-9C, configurations of battery packs for the battery system of a vehicle are shown schematically according to an exemplary embodiment. FIGS. 11A-11D each show schematically a vehicle with a battery system providing a battery pack with different configurations of battery modules according to exemplary embodiments. According to a preferred embodiment, the battery system will comprise at least two battery packs with each battery pack comprising at least two battery modules. As indicated schematically in FIGS. 9A-9C, 10A-10G and 11E, the battery system/pack may comprise a variety of types of battery modules or battery cells (e.g. component batteries/cells and modules of different structure and components/capability, chemistry, etc.).

As shown schematically in FIG. 11E, interchangeable battery modules for the vehicle may be categorized in inventory (available for installation in a vehicle and/or selected and installed in a battery system/pack for in-vehicle use) according to type and various other characteristics such as age, performance, remaining life, phase of life-cycle, etc. For example, as indicated in FIG. 11E, interchangeable battery modules may comprise multiple types; type A is a high-rate charge/discharge battery module; type B is a high-capacity battery module; type C is a battery module designed to withstand harsh environmental conditions (e.g. temperature extremes, shock/vibration, etc.); inventory may comprise various other types of battery modules indicated such as a "standard" type designed for standard use considerations. For a planned duty or route predicted to involve a relatively wide range of operating conditions, the vehicle may be configured with a composite battery pack having one battery module of each type (A, B, C) as shown schematically in FIG. 11A; for a duty or route involving travel or a long distance or high energy demand with reduced ability to recharge, the vehicle may be configured with a battery pack having a multiple battery module of a high-capacity type (type B) as shown schematically in FIG. 11B; for a duty or route involving harsh environmental conditions, the vehicle may be configured with a battery pack having multiple battery modules of a type (type C) designed/manufactured to withstand harsh conditions as shown schematically in FIG. 11C.

Figure 19:
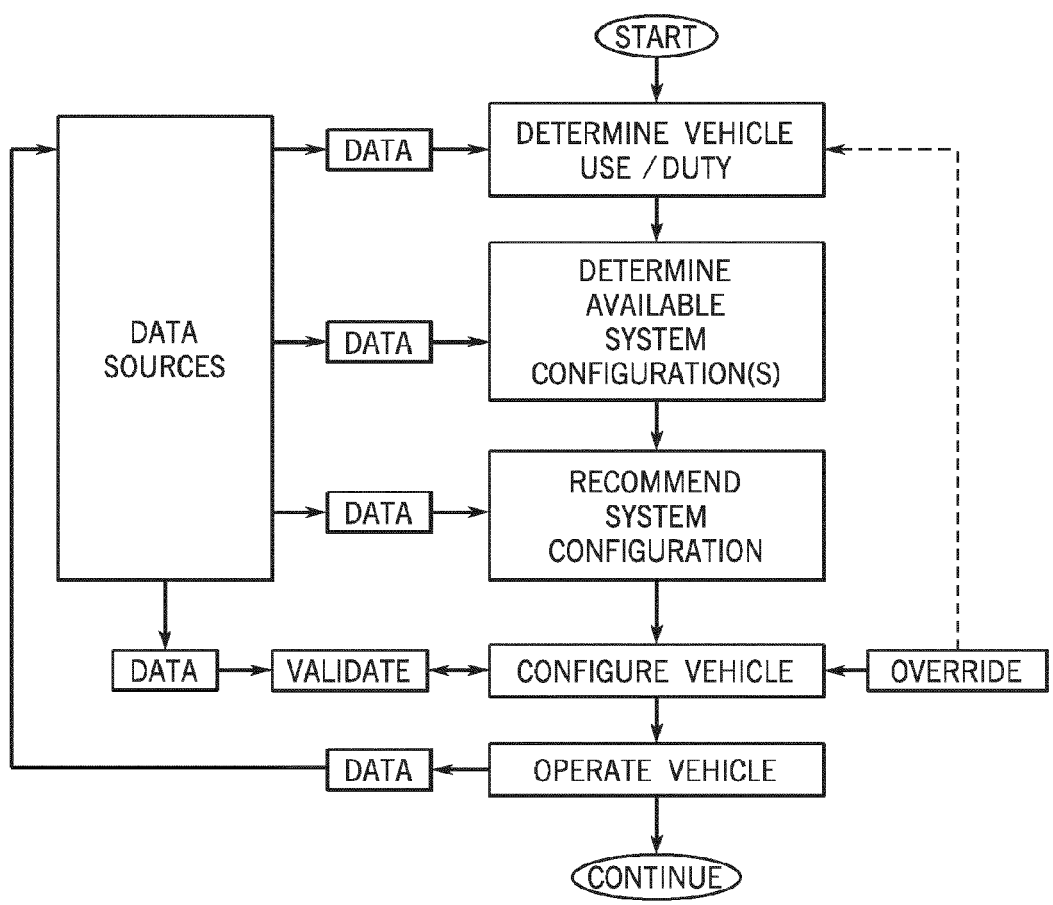
FIG. 19 is a schematic flow diagram of a system to configure vehicle systems such as an energy storage system comprising a battery system according to an exemplary embodiment.

Referring to FIG. 19, a method of configuring an energy storage system such as a battery system with interchangeable components such as battery modules is shown schematically according to an exemplary embodiment. Data from data sources (see e.g. TABLES B-I and FIGS. 2A, 3 and 15A-15B) is used to determine the anticipated use/duty for the vehicle/system and to determine available configurations of the system (e.g. based on the vehicle design and/or on available inventory of components such as battery modules); a recommended configuration of the system is provided in the form of a report/recommendation of components to install (e.g. a selective combination of interchangeable battery modules of type/phase/condition); the vehicle/system can be configured as recommended and the recommended configuration can be validated for use and operation (e.g. by testing to ensure that the system and components operate as planned/intended); override of the recommended configuration may be permitted at or during installation (e.g. based on factors identified by persons such as service center workers or operators that may not have been identified by the system). The vehicle/system with the recommended or directed configuration of the energy storage system is then ready for use/operation; according to an exemplary embodiment, as indicated, use/operation of the vehicle with the battery system as configured may provide data that can be acquired/stored and made available for future use according to the method and system.

Figure 20A:
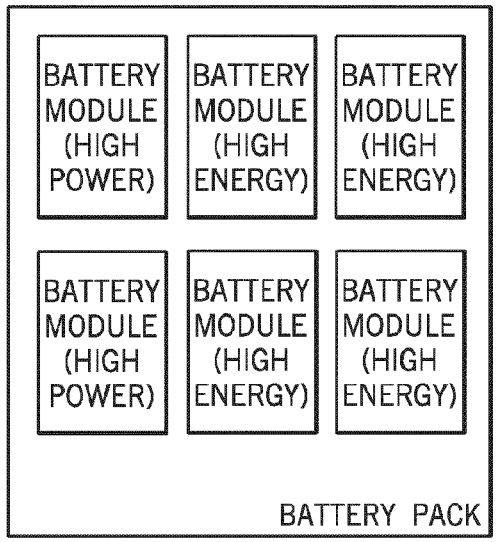
FIGS. 20A to 20C are schematic block diagrams of battery pack/module configurations for a battery system comprising interchangeable battery modules according to an exemplary embodiment.
Figure 20B:
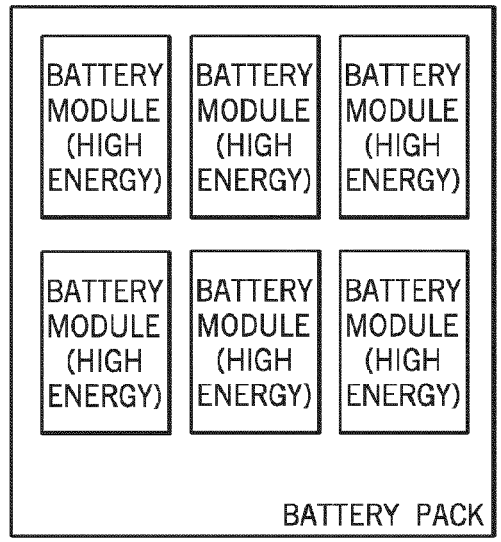
Figure 20C:
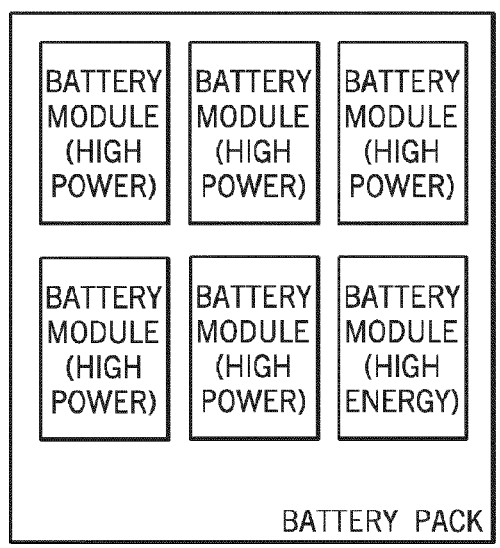

Referring to FIGS. 20A-20C, where the energy storage system is a battery system with interchangeable battery modules, different configurations of the battery system may be recommended and installed/implemented for different anticipated operating conditions through installation of different types of battery modules in the vehicle. See also FIGS. 11A-11E. For example, where battery types comprise a high energy type (e.g. with enhanced range/capacity) and a high power type (e.g. with enhanced rate of power delivery/energy transfer), the vehicle may be configured with an objective to enhance performance in the corresponding anticipated conditions of operation: for typical commuting, two high power modules and four high energy modules (FIG. 20A); for a long trip (accepting reduced acceleration but increased range), six high energy modules (FIG. 20B); for intensive recreation activity such as street racing or mountain driving, five high power modules and one high energy module (FIG. 20C). As indicated, with various other (interchangeable) battery modules of various other type/phase/condition, the battery system can be configured to provide a wide range of performance characteristics adapted or adaptable to suit intended specialization/optimization objectives or requirements comprising or according to any of a wide variety of other objectives and considerations such as energy efficiency, total cost, life-cycle management, components availability, etc. See TABLE J.

Figure 9D:
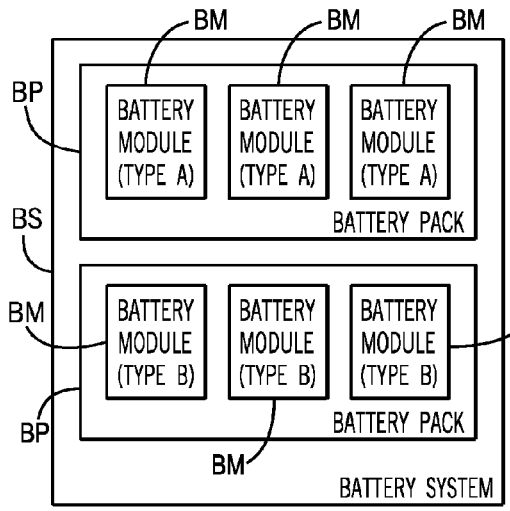
Figure 9E:
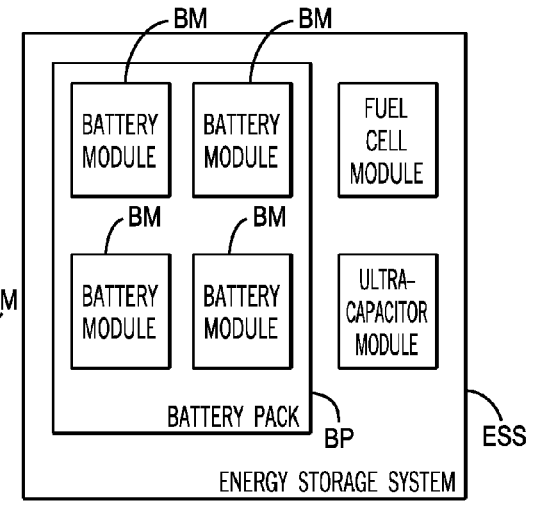
Figure 21A:
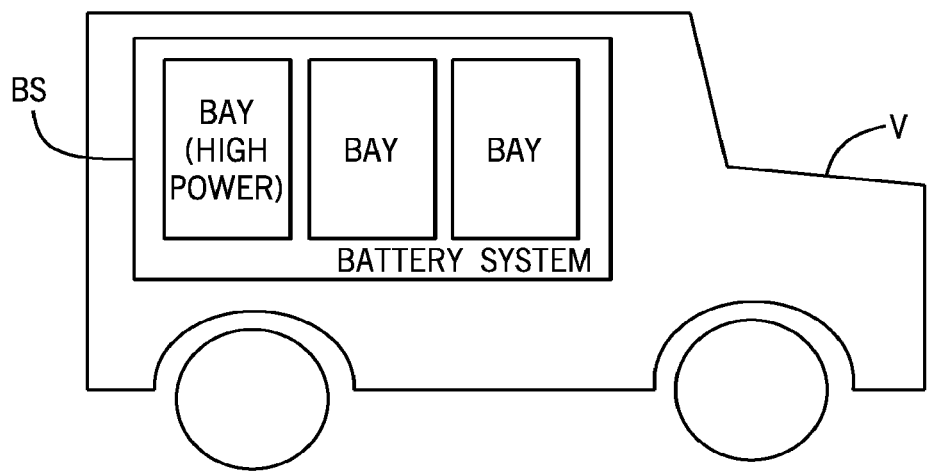
FIGS. 21A and 21B are schematic block diagrams of vehicles having a battery system with interchangeable battery packs according to an exemplary embodiment.
Figure 21B:
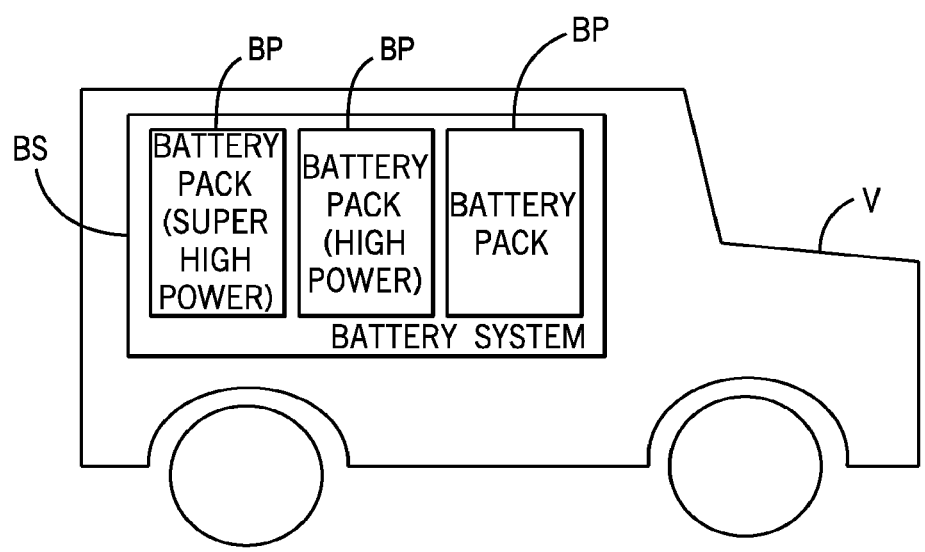

As shown schematically in FIGS. 21A and 21B, the vehicle may be designed to facilitate the use of specialized components; for example, the battery system of the vehicle may be adapted to accommodate different types of battery packs/modules to permit specialization/optimization. See e.g. FIG. 7C. As indicated in FIG. 21A, a bay or receptacle for a battery pack/module may be configured for a specific type or category of battery pack/module; for a high power module the bay may be provided with an enhanced physical and electrical interface as well as with enhanced instrumentation and monitoring/management (e.g. thermal management and circuit protection system); a standard bay may have a standard interface with a standard instrumentation and monitoring/management arrangement. As indicated in FIG. 21B, a specialized component such as a super high power battery pack/module may fit for installation and use in the high-power bay of the battery system/vehicle; standard components may fit interchangeably in each standard bay. (As indicated in FIG. 9D, according to an exemplary embodiment, the battery system may be configured to be operated with an empty bay or with a disabled battery module.)

Inventory Management System

According to an exemplary embodiment, a system can be implemented for managing the inventory and use/deployment of components of vehicle systems such as the energy storage system. As shown schematically in FIGS. 11E and 22-26B, according to an exemplary embodiment where the energy storage system is a battery system comprised of components in the form of interchangeable battery modules an inventory management system (IMS) may be provided. As indicated in FIGS. 22-26B, the inventory management system (using data available from data sources) can be provided to manage the use and deployment of battery modules from the supply chain and/or inventory/stock according to considerations relating to the battery modules and other considerations such as the vehicle, duty, climate/condition, maintenance, etc. See also FIGS. 3, 4A-4C and I IE and TABLES A through J (data categories and sources).

Referring to FIG. 11E, a center for servicing and configuring battery systems for vehicles is shown schematically according to an exemplary embodiment. As indicated in FIG. 11E, the vehicle service center or location for service/maintenance of a vehicle may maintain an inventory of battery modules of different types for configuring a battery pack for a vehicle. Categories of battery/battery module type may include a high capacity, high power, high energy, deep discharge, extended cycle life, high efficiency and rapid recharge, etc. As indicated in FIG. 11E, the battery pack for a battery system can be configured and reconfigured with various combinations of battery modules of different types depending upon the situation and planned/predicted use of the vehicle from inventory of interchangeable battery modules: for example, type A is a high-rate charge/discharge battery module; type B is a high-capacity battery module; type C is a battery module designed to withstand harsh environmental conditions (e.g. temperature extremes, shock/vibration, etc.); type D is a "standard" battery module for standard/typical use. Interchangeable battery modules for the vehicle may be categorized in inventory (and selected and installed in a battery system/pack for in-vehicle use) according to type and various other characteristics such as age, performance, remaining life, etc. For planned duty or route predicted to involve a range of operating conditions, the vehicle may be configured with a composite battery pack having one battery module of a different type (A, B, C) as shown in FIG. 11A; for a duty or route involving travel or a long distance or high energy demand with reduced ability to recharge, the vehicle may be configured with a battery pack having a multiple battery module of a high-capacity type (type B) as shown schematically in FIG. 11B; for a duty or route involving harsh environmental conditions, the vehicle may be configured with a battery pack having multiple battery modules of a type (type C) designed/manufactured to withstand harsh conditions as shown schematically in FIG. 11C. In standard or typical use conditions, the vehicle may be configured with a battery pack of all standard type (e.g. type D).

Figure 22:
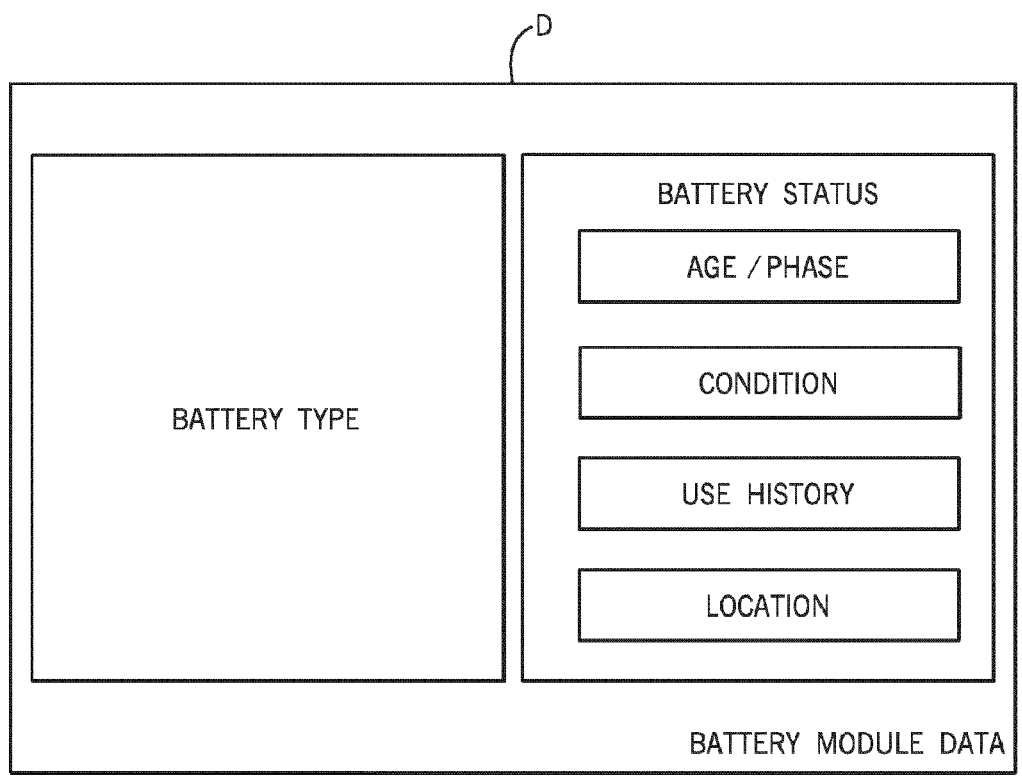
FIG. 22 is a schematic system block diagram of types/categories of data sets for a battery module according to an exemplary embodiment.
Figure 23:
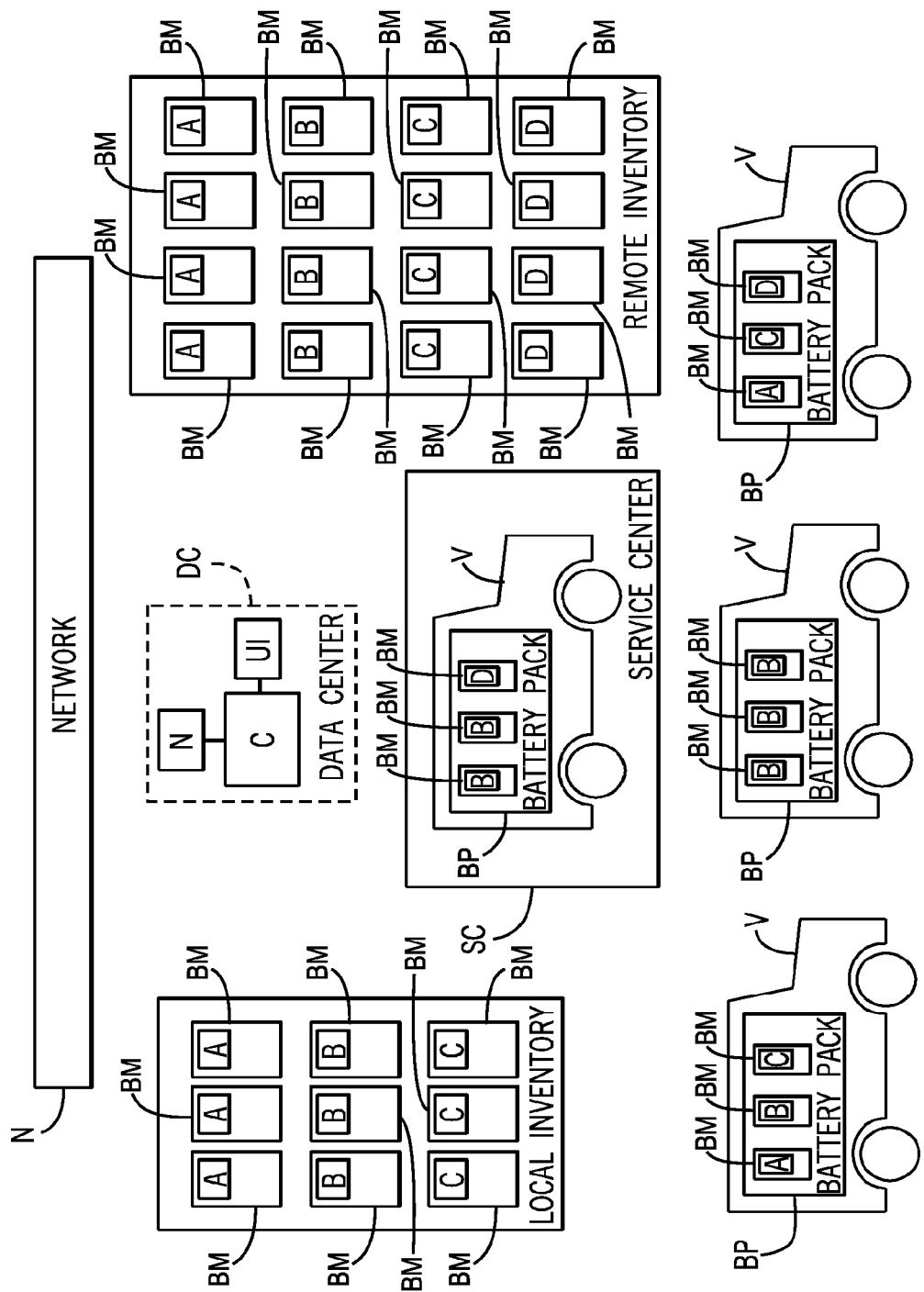
FIG. 23 is a schematic block diagram of an inventory management system with a data center and a service center to configure components of a vehicle system such as battery packs/modules of a battery system for vehicles according to an exemplary embodiment.
Figure 24:
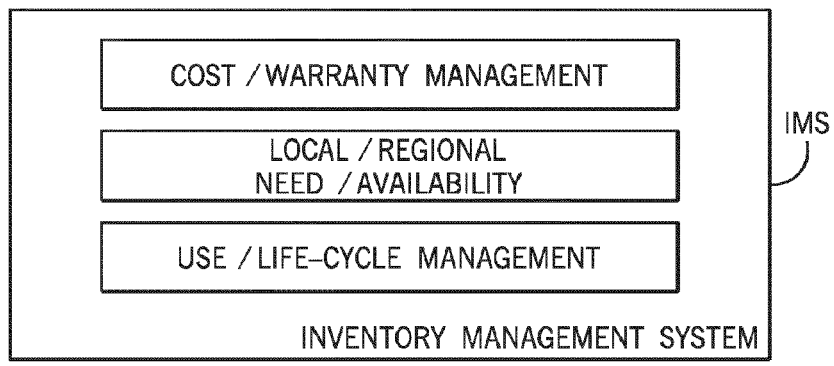
FIG. 24 is a schematic system block diagram of system functions/programs for the inventory management system to configure components of a vehicle system such as battery packs/modules of a battery system for a vehicle according to an exemplary embodiment.

As indicated in FIG. 22, battery modules from a local inventory (e.g. at a service location) or remote inventory (e.g. available to a service location upon delivery) can be located and installed in battery system for vehicles in a manner intended to optimize performance of the battery systems in which the battery module is installed. As indicated in FIGS. 23-24, the inventory management system performs a set of functions in the management of an inventory of battery modules; each battery module in the system may be categorized by type and status and availability to an outlet (among other considerations). As indicated, data as to type may relate to performance characteristics and classifications (as well as chemistry/design, etc.); data as to status may relate to age/phase of life-cycle, condition (e.g. state of charge/state of health), use history (e.g. events and prior use/performance) and current location (e.g. information as to availability). See also TABLE B.

Figure 25:
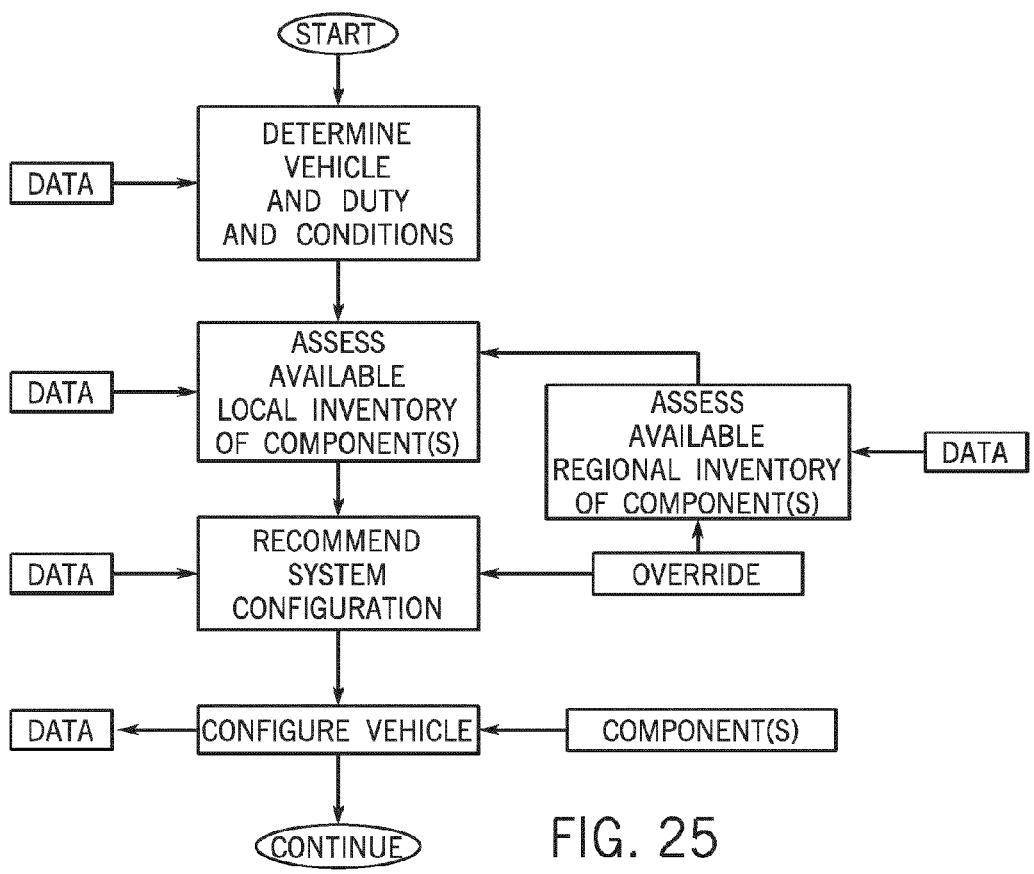
FIG. 25 is a schematic flow diagram of the operation of an inventory management system for components of vehicle systems such as a battery system according to an exemplary embodiment.

As indicated in FIGS. 22, 24 and 25, according to an exemplary embodiment, the inventory management system may be configured to manage and deploy inventory of components according to a wide variety of considerations using data available to a data center (and/or other computing systems); inventory may be available as local inventory at a local site such as a service center/outlet where battery systems are configured and installed in vehicles or are available as remote inventory from various other sites such as storage locations, warehouses, etc. (e.g. sites within a particular region), as indicated schematically in FIG. 22. Inventory may be shared and managed within a region, within an entity (e.g. company, enterprise, institution, cooperative, etc.) or according to other arrangements (e.g. managed by a vendor/supplier, etc.); according to an exemplary embodiment, data as to inventory composition and availability is made available to vehicles, vehicle operators, service centers, managers/fleet managers, etc. over a network (see FIGS. 18 and 22). As shown schematically in FIGS. 11A-11E, 20A-20C and 22, according to an exemplary embodiment in operation of the inventory management system, vehicles may have a battery system installed in any of a wide variety of configurations of battery modules using available inventory of battery modules (e.g. access at a service center or similar facility for installation).

A method of implementing an inventory management system according to an exemplary embodiment, is shown schematically in FIG. 25; as indicated, the method uses data from data sources including battery module data and other data (see FIGS. 14, 15A-15B and 23 and TABLES A and B). The vehicle (e.g. vehicle type, vehicle system configuration, etc. see TABLE C) is determined; in addition the anticipated duty of the vehicle (e.g. available resources, route, activities, duration, operator, etc., see TABLE D) as well as conditions of operation (e.g. time of day, weather, traffic, etc., see TABLES E, F, G, H and I) can be considered (among other considerations) in allocation and development of inventory of components such as battery modules for a battery system of a vehicle as indicated in FIGS. 11A-11E and 22-25. According to an exemplary embodiment, there will be an assessment of available local inventory of components and recommendation of a system configuration; there is an option for override of the recommended system configuration (e.g. the configuration is not considered to be optimal, acceptable, possible, etc. due to identified factors or considerations) and can be an alternative assessment of remote/regional inventory of components that can be made available (e.g. in combination with local inventory of components) for installation in a vehicle. According to an exemplary embodiment, data from data sources available over a network can be accessed in operation of the method/system (e.g. in real time). The vehicle as configured is then able to be put into service in order to perform the duty under the conditions of operation (and performance of vehicle systems and components in actual operation can be monitored), as indicated in FIGS. 1A-1C and 2A-2B.

Life-Cycle Management

According to an exemplary embodiment, the system/method can be implemented to manage the life-cycle of components of vehicle systems. According to an exemplary embodiment the vehicle system may be an energy storage system such as a battery system with battery modules as components, as indicated schematically in FIGS. 26A-26B. For example, a battery module may be characterized with a data set that indicates (among other data) the status including age/phase, condition and use history of the battery module, as indicated in FIG. 22.

Figure 26A:
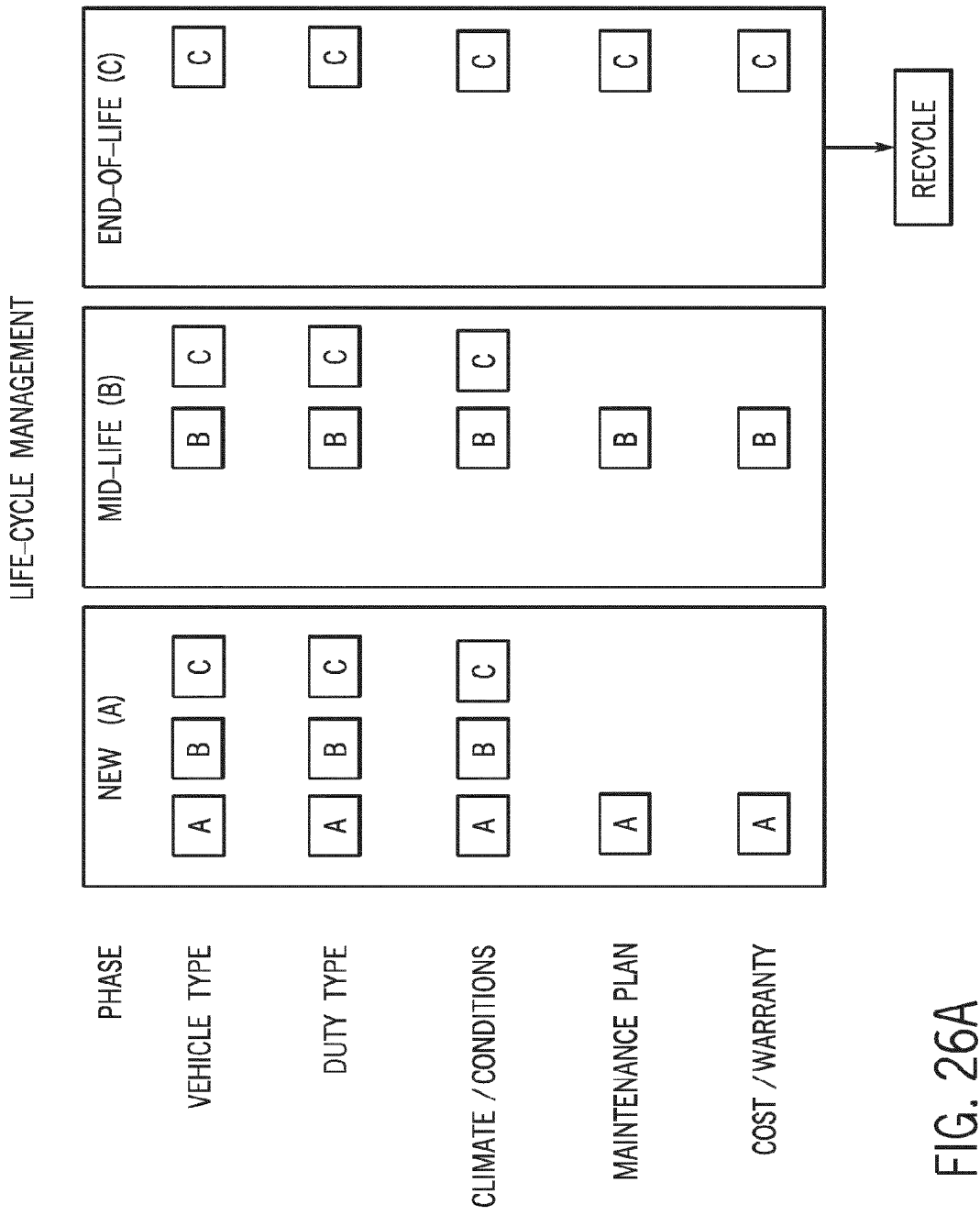
FIG. 26A is a schematic system block diagram for a life-cycle management system of an inventory management system for components of a vehicle system of a vehicle according to an exemplary embodiment.
Figure 26B:
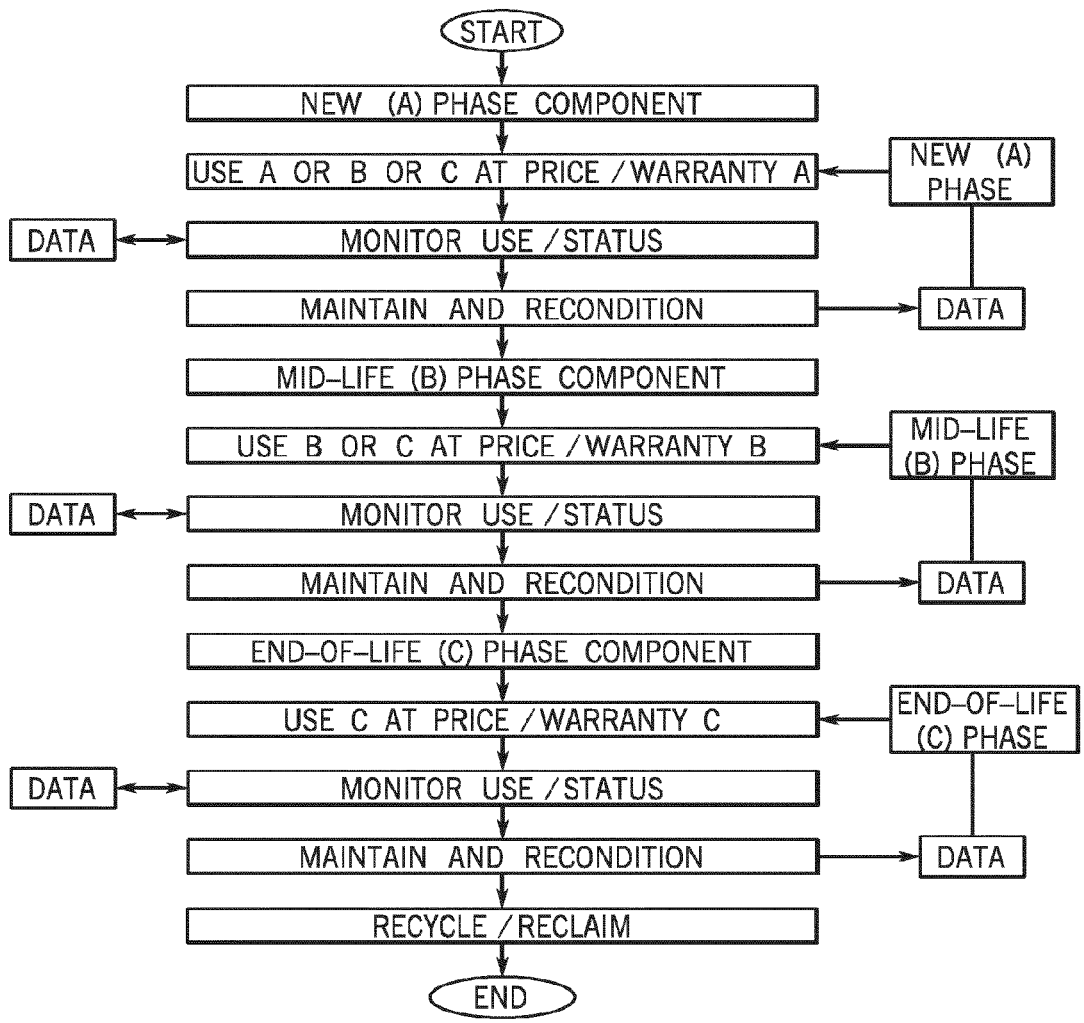
FIG. 26B is a schematic flow diagram of the operation of a life-cycle management system of an inventory management system for components of a vehicle system of a vehicle according to an exemplary embodiment.

In the management of the life-cycle of a battery module, operating parameters (such as categories of use) may be correlated to data as to the status/phase of life-cycle of the battery module. According to an exemplary embodiment, as indicated in FIGS. 26A-26B, a new battery module is indicated as A phase; a mid-life battery module is indicated as B phase; an end-of-life battery module is indicated as C phase. A battery module may be classified as in a phase based on evaluation of data such as age, time in service, charge-recharge cycles, energy throughput, service/maintenance records, use/event history, etc. as well as measurements of performance and condition (e.g. state of health, impedance, capacity, etc.); periodic reclassification of the battery module may occur during the life-cycle of an interchangeable reusable component such as a battery module. As indicated, the cost (e.g. pricing, use fee, etc.) and warranty terms (e.g. length and conditions) may vary for a battery module during each phase of a managed life-cycle; for a battery type, a battery module at new phase (A phase) will allow or command a different value (e.g. higher price/use rate) than a battery module at mid-life phase (B phase), for example. As also indicated, the maintenance plan (e.g. reconditioning method and frequency etc.) may vary during each phase of a managed life-cycle for a component such as a battery module.

As indicated schematically in FIGS. 26A-26B, categories of operating parameters for a component of a vehicle system may include the vehicle type, the duty type, climate and conditions, etc. Vehicle types may include heavy-duty work vehicles to unoccupied light-duty vehicles as well as other vehicles in of a wide range, generally indicative of the anticipated demand on the vehicle system and components. Duty types may be characterized by the intensity and frequency of demand as well as the frequency/availability of servicing and level of monitoring; duty types may also be characterized by fault/failure tolerance and redundancy as well as safety considerations. Climate conditions and environmental conditions may be characterized by temperature extremes (e.g. excessive heat or cold), humidity and precipitation, types of use (e.g. land, marine, road, agriculture, mining/excavation, etc.), shock/vibration, etc.

As shown schematically in FIGS. 26A-26B, according to an exemplary embodiment, each category of operating parameters can be given a classification (or class) of A or B or C (as corresponding to the life-cycle phase of the battery module most suited for use under the classification of operating parameter). As indicated schematically in FIG. 9D, a battery system may comprise a set of battery packs having battery modules of a different type or age/stage of life-cycle. See also FIGS. 26A and 26B.

Referring to FIGS. 26A-26B, use under operating parameters in the A classification would be characterized by greater relative demand for performance and need of capability/reliability as would be expected from a battery module in the A phase of life-cycle; use under operating parameters in the B classification would be characterized by moderate relative demand for performance and need of capability/reliability as would be expected from a battery module in the B phase of life-cycle; use under operating parameters in the C classification would be characterized by moderate relative demand for performance and need of capability/reliability as would be expected from a battery module in the C phase of life-cycle. As indicated, a battery module in each respective phase of life-cycle could be managed according to a maintenance plan for the phase of life-cycle. As the battery module advances along the life-cycle, the level of demand/intensity of the recommended operating parameters of use are able to be reduced; the cost and warranty of the battery module may also be reclassified (e.g. reduced) as the battery module advances along the life-cycle.

According to an exemplary embodiment, the inventory management system will classify available battery modules by phase as well as type and other data available through data source. As indicated, according to an exemplary embodiment, in the A (new) phase of life-cycle, the battery module would be capable of performing to standard or specification under operating parameters of use in the A or B or C classification (or class), for example, in an A or B or C class duty type in an A or B or C class vehicle type in climate/conditions in an A or B or C class (see FIG. 26B). At the mid-life phase (B), the battery module is considered to be capable of performing to a reduced standard and specification of operating parameters in the B class (e.g. less demanding than the A class) (see FIG. 26B). As the battery module reaches the end-of life phase (C), the battery module is not considered to be capable of performing to a standard or specification other than the C class of operating parameters (e.g. a less demanding class of duty in a less demanding type of vehicle/system in a less demanding climate and less demanding conditions than the B class) (see FIG. 26B). As indicated, according to an exemplary embodiment, a battery module can be deployed for use in a manner that matches the class of use (e.g. operating parameters) with the present condition of the battery module to be installed which will allow for more reliable performance of the battery module during the life-cycle of the battery module.

As indicated, according to an exemplary embodiment, a battery module in a managed life-cycle will be expected to pass through each phase of life-cycle and be expected to perform according to the operating parameters of each phase/class in each phase of the life-cycle. Data for a battery module (or types of battery modules) can be acquired (e.g. from testing or from operating vehicles/vehicle systems) to determine what conditions of operation accelerate aging or deterioration of performance of a battery module; data then can be (stored in a database and) used to enhance the accuracy of performance of the life-cycle management systems for battery modules. See e.g. FIGS. 27B-27C and 30A-30B.

As indicated in FIGS. 11E, 15B and 17, according to an exemplary embodiment, the battery module can be provided with an identifier device such as a tag configured to provide, store and/or interchange data relating to the battery module (e.g. identifier, RFID tag, serial number, etc.). According to an exemplary embodiment, as shown schematically in FIG. 17E, the tag or identification may provide current/updated condition and phase of life-cycle that can be used and/or stored in data records for the battery module (see FIG. 15B) along with current (updated) data model to reflect predicted performance at the current life-cycle phase (see FIG. 17); other data sources may also contain the operational/acquired data for each battery module (e.g. for a period of time or for the time of service to date). According to an exemplary embodiment, as indicated schematically in FIG. 26B, a method of life-cycle management, monitoring of the battery module (e.g. according to standards and specifications) will indicate when a battery module is to be considered in the next phase of life-cycle; an event of misuse or abuse or other history event (e.g. thermal/high temperature exposure of overheating, physical impact or accident, overcharge or drain, etc.) may cause or indicate that a battery module be reclassified to another phase (e.g. from phase A to phase C, subject to reconditioning).

After the end-of-life phase, the battery module is expected to be recycled; according to a particularly preferred embodiment, the inventory management system can work to relocate battery modules for use in vehicles or in inventory at a location nearer recycling facilities at the end-of-life phase as to reduce the distance and cost of shipping to recycling facilities. According to an exemplary embodiment, prior to being removed from service and transported to a facility for recycling, battery modules may be reconditioned and used in non-vehicle applications such as stationary power (or backup) under suitable monitoring conditions to extend further the life-cycle of usefulness performance of the battery module.

Data Analytics

The system may provide a data analytics system for vehicle systems and components. See FIGS. 13, 16-17, 27A-27D, 28, 29 and 30A-30B. As indicated schematically in FIGS. 16 and 17, data acquired from data sources can be processed for a data analytics function; the data analytics function/system can be used to improve the detail or accuracy of data sets and data models for components of the vehicle systems. For example, actual performance data for a particular type of battery module may be processed in an analytics function to improve the accuracy of the data model associated with a battery module; an updated data model may be made available to management systems for vehicles using the battery module in a battery system. See FIGS. 27A-27D, 28-29 and 30A-30B.

Referring to FIGS. 27A-27D, 28-29 and 30A-30B (see also FIG. 13), a data analytics function (e.g. system and method) for vehicle systems and components is shown schematically according to an exemplary embodiment. According to an exemplary embodiment, the data analytics system is configured (among other functions) to improve the operation (e.g. efficiency, performance, etc.) of vehicle systems as well as to improve the quality (e.g. depth, consistency, accuracy, etc.) of data/computational models and data sets used by the management system and programs/algorithms/routines and other systems/tools used to operate or manage vehicle systems, vehicles, fleets of vehicles, etc. See FIGS. 1A-1B, 2A-2B, 12A-12B, 13-14, 17, 27A-27D, 28-29 and 30A-30B. As indicated schematically in FIG. 27A, the analytics system uses data acquired and/or aggregated from data sources (e.g. network-connected data sources) including a database of information comprised of various data sets that are provided by and to a vehicle (e.g. a network-connected vehicle), for example, as to the vehicle (vehicle type), vehicle systems and components (such as battery modules of a battery system), route/duty information, driver/operator information, operating conditions and environmental/other conditions. (As schematically shown in FIGS. 1A-1C, 2A-2B and 3 data sources may comprise data sources used or accessed by the management system for a vehicle or any vehicle system.)

Figure 27A:
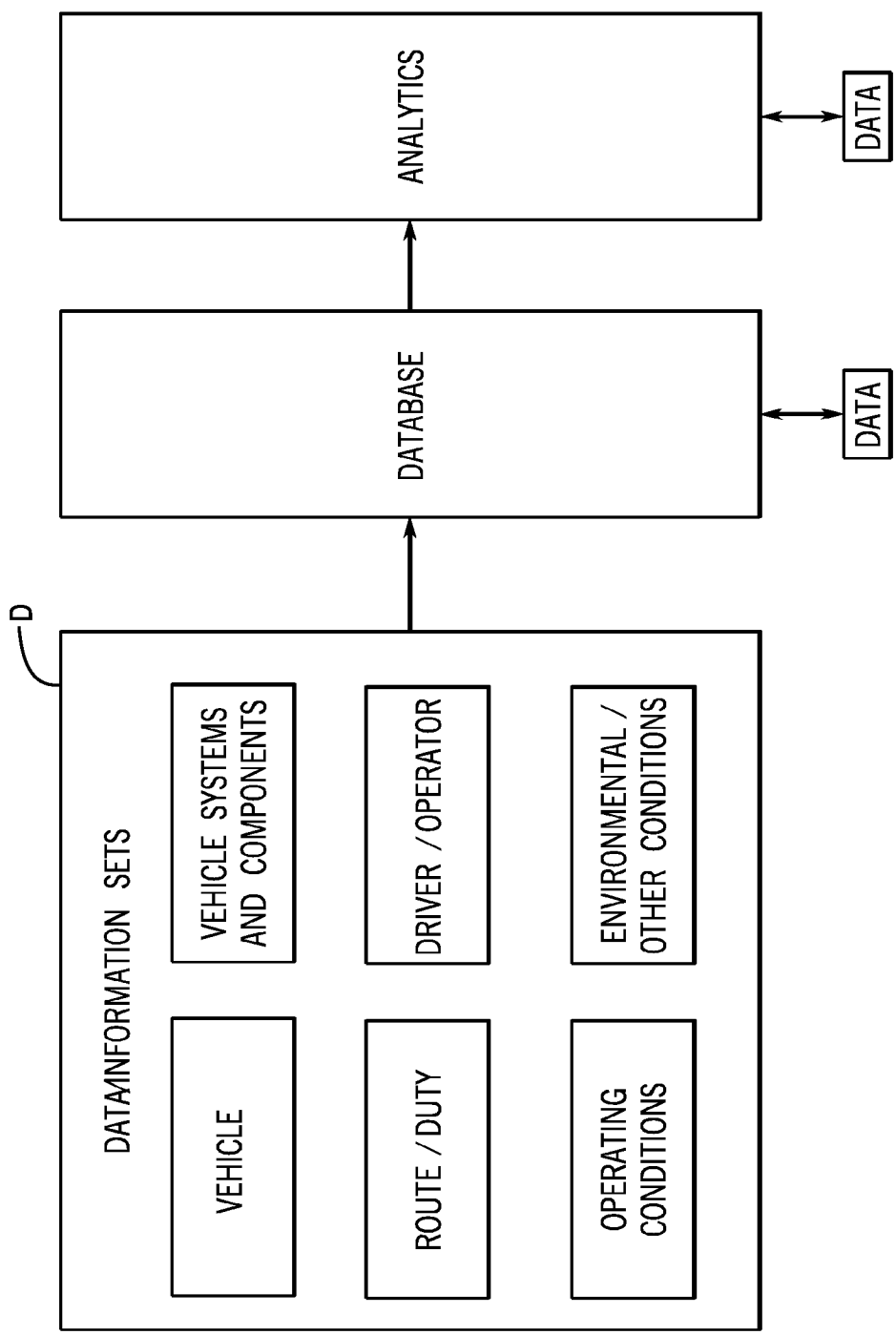
FIG. 27A is a schematic system diagram of data operations for an analytics system for vehicle systems such as an energy storage system comprising a battery system with components such as battery modules for a vehicle according to an exemplary embodiment.
Figure 27B:
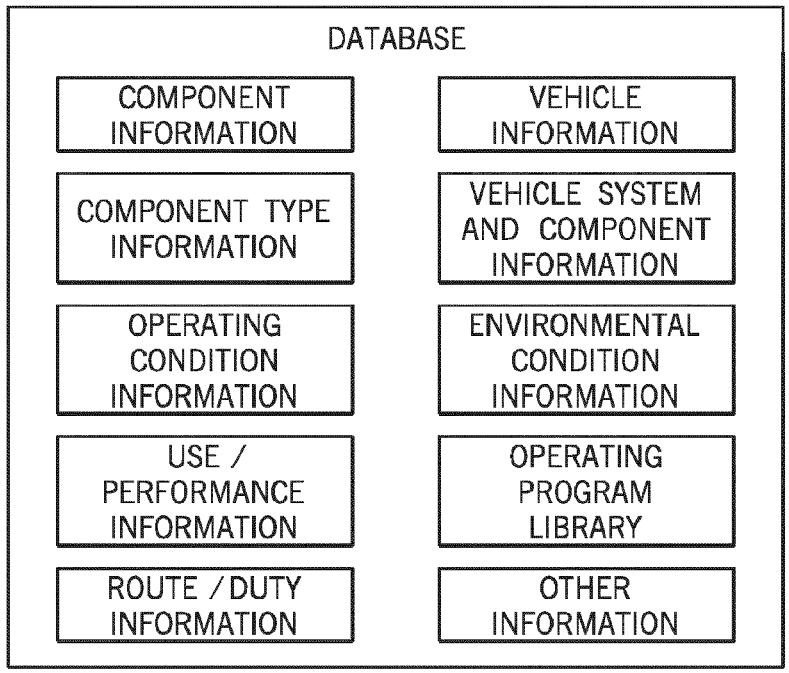
FIG. 27B is a schematic block diagram of types/categories of data for a database for an analytics system for a vehicle system for a vehicle according to an exemplary embodiment.

As shown schematically in FIG. 27B, according to an exemplary embodiment, where the vehicle is an electric or hybrid-electric vehicle and a vehicle system is an energy storage system in the form of a battery system comprising battery modules (as components), the database may comprise data and information acquired and aggregated from individual components (e.g. data and a data model for each battery module), component/module type, vehicle information (e.g. type, make, model, manufacturer, etc.), vehicle system and component information (e.g. type, configuration, etc.), route/duty information (e.g. recorded or tracked routes and activities as well as energy use, etc.), use/performance information (e.g. measured/acquired or calculated during operation), operating condition information (e.g. acquired during operation from instrumentation, sensors, etc.), environmental condition information (e.g. weather, temperature, etc.), and other information available from data sources (e.g. acquired on/from the vehicle or external to the vehicle and/or available from other networks such as the internet). The database may also include a library of stored operating programs or plans that have been used, developed, created or otherwise made available to a management system for vehicle system such as the battery management system of a battery system. See FIGS. 12B, 13 and 16 (e.g. management plan developed for a vehicle system). According to an exemplary embodiment, the analytics system is able to use and access the data acquired and aggregated and stored in the database to perform an analytics function for one or more components of the vehicle system and/or for data sets used in the management and operation of the vehicle.

Figure 27C:
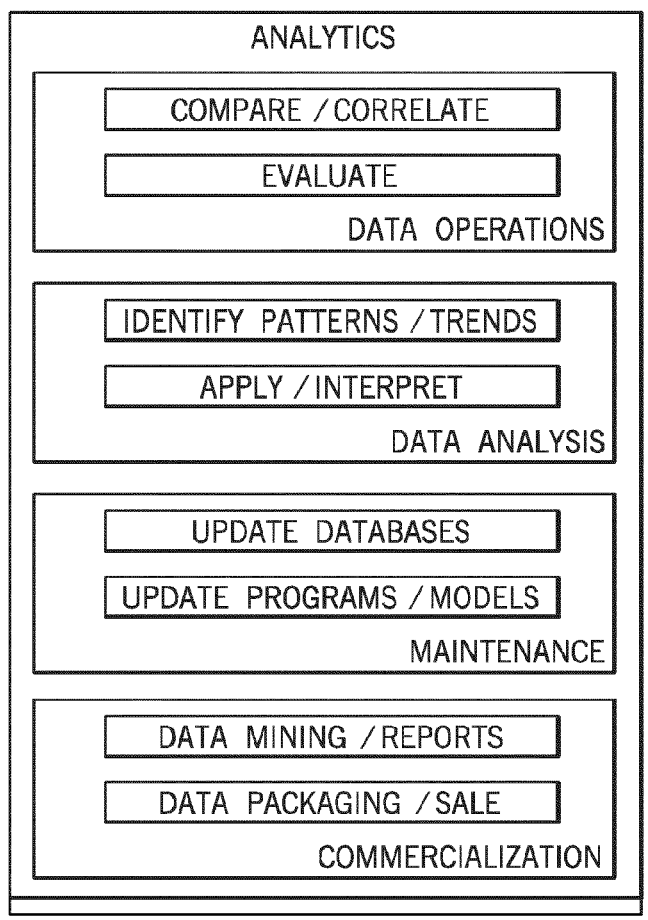
FIG. 27C is a schematic system block diagram of system functions/programs for an analytics system for vehicle systems for a vehicle according to an exemplary embodiment.

Referring to FIG. 27C, the analytics system is shown schematically and representationally by functions according to an exemplary embodiment; the functions of analytics system are performed by one or more computing systems (see FIGS. 5 and 28) using programs or routines (e.g. algorithms, models, applications, application program interfaces/APIs, tools, etc.). As indicated, according to an exemplary embodiment, the analytics system may be configured to perform data operations such as comparing and correlating data and evaluating data, data analysis such as pattern/trend identification as well as application/interpretation of data, and data maintenance such as providing updates to databases/data sets and updates for data models for components (such as battery modules) to improve the quality and performance of control/management programs that use the data sets and data models. According to an exemplary embodiment, the analytics system may also be configured to distribute/share and commercialize data such as by performing or allowing data mining and/or by packaging and monetizing data records (e.g. by sale, license, etc.).

Figure 27D:
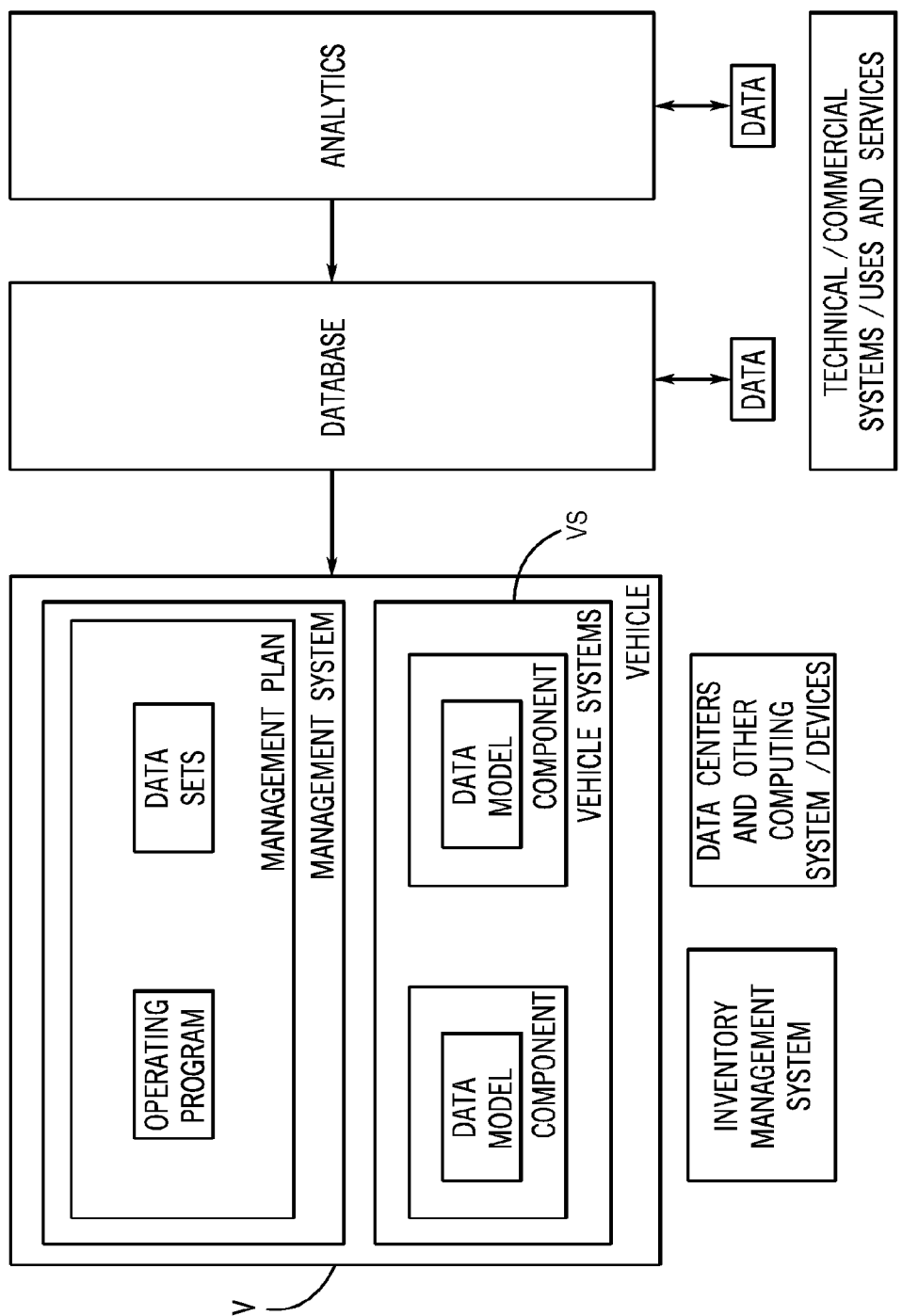
FIG. 27D is a schematic system diagram of system/data operations for an analytics system for vehicle systems such as an energy storage system comprising a battery system with components such as battery modules for a vehicle according to an exemplary embodiment.
Figure 28:
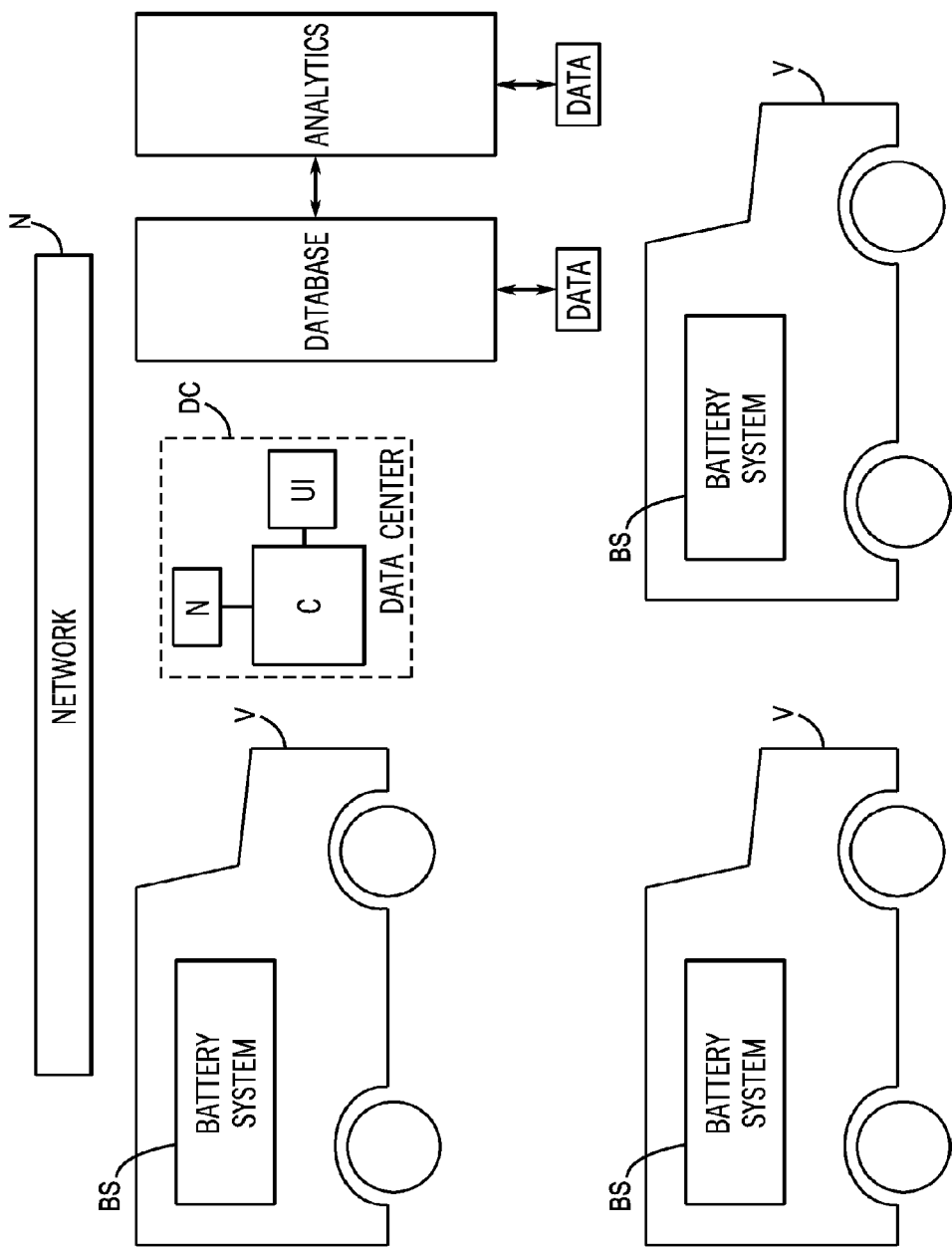
FIG. 28 is a schematic block diagram of implementation of an analytics system for a set or fleet of vehicles with an energy storage system shown as a battery system according to an exemplary embodiment.
Figure 29:
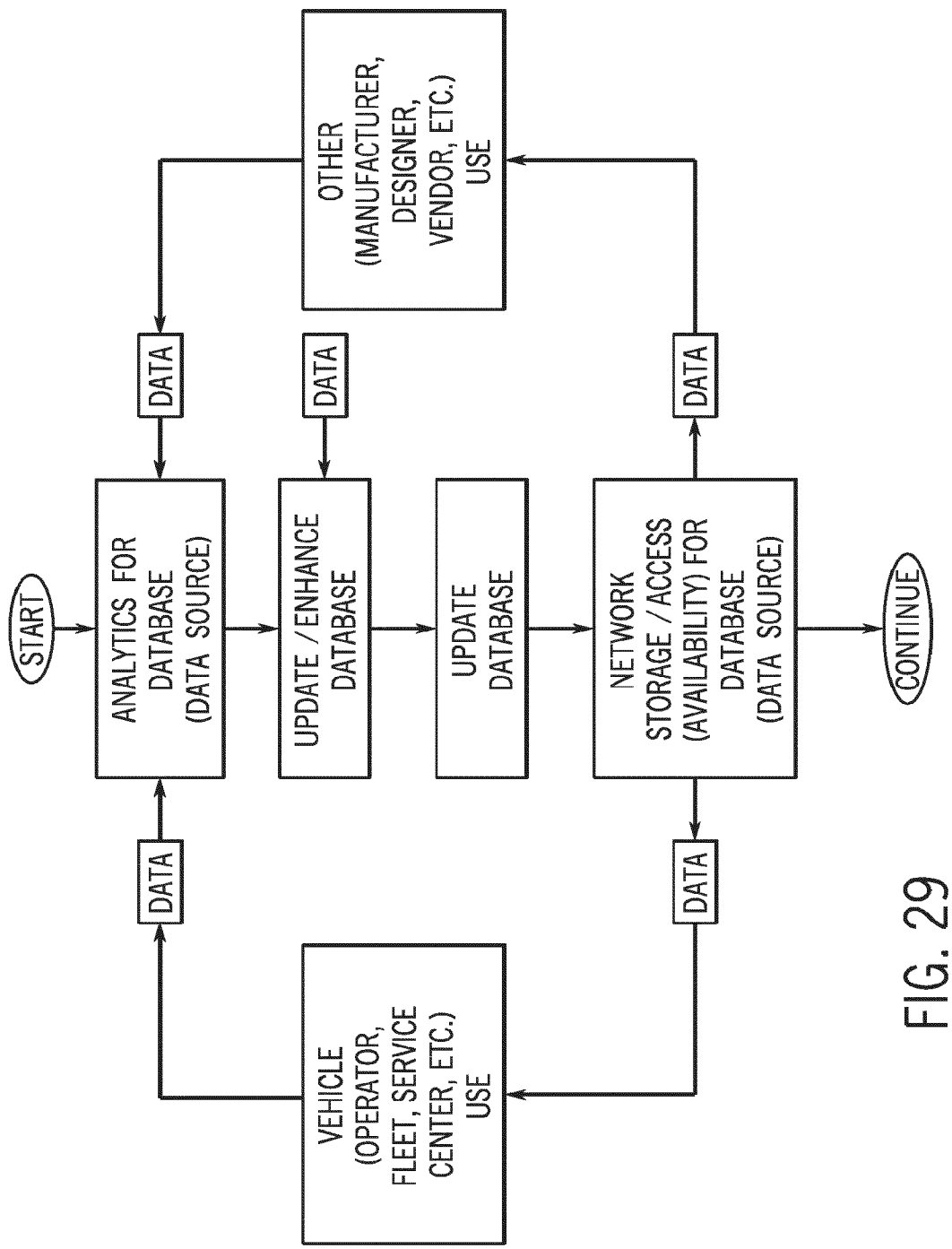
FIGS. 29 and 30A-30B are schematic flow diagrams of operations of an analytics system for vehicle systems such as an energy storage system comprising a battery system with components such as battery modules for a vehicle according to an exemplary embodiment.
Figure 30A:
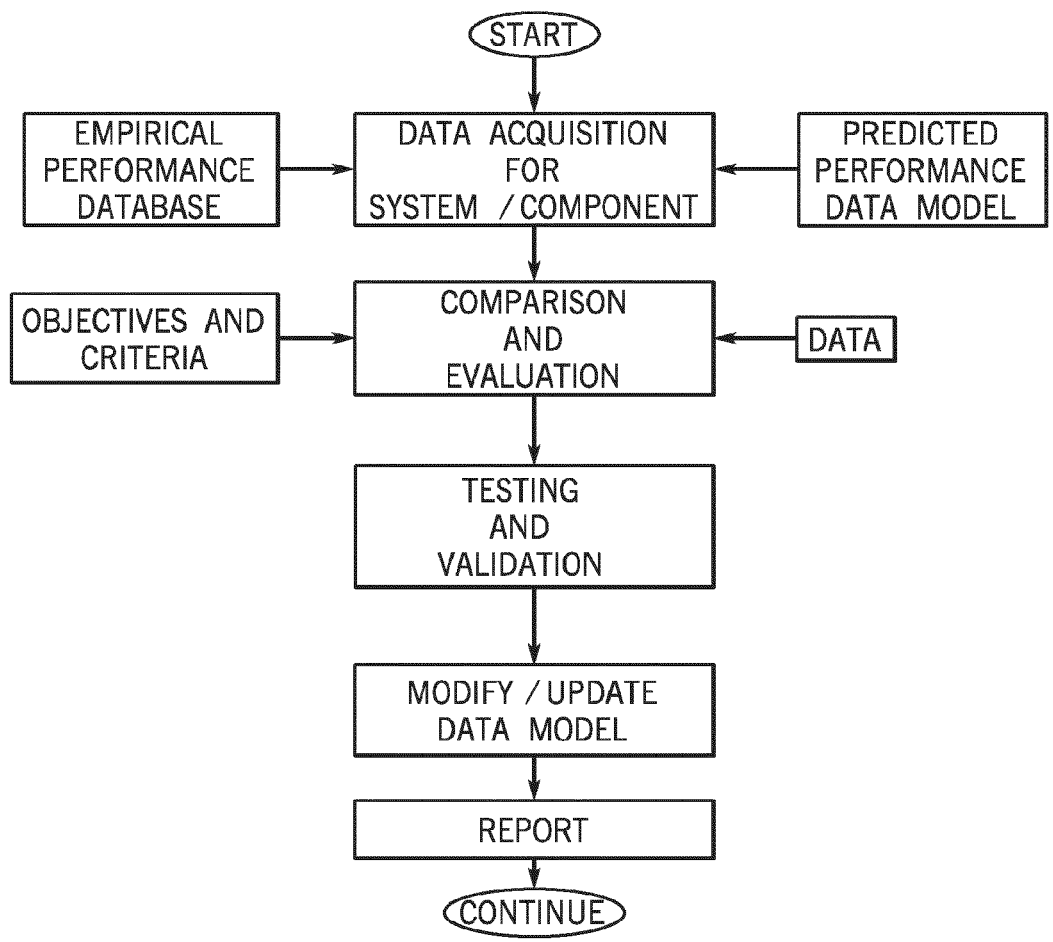
Figure 30B:
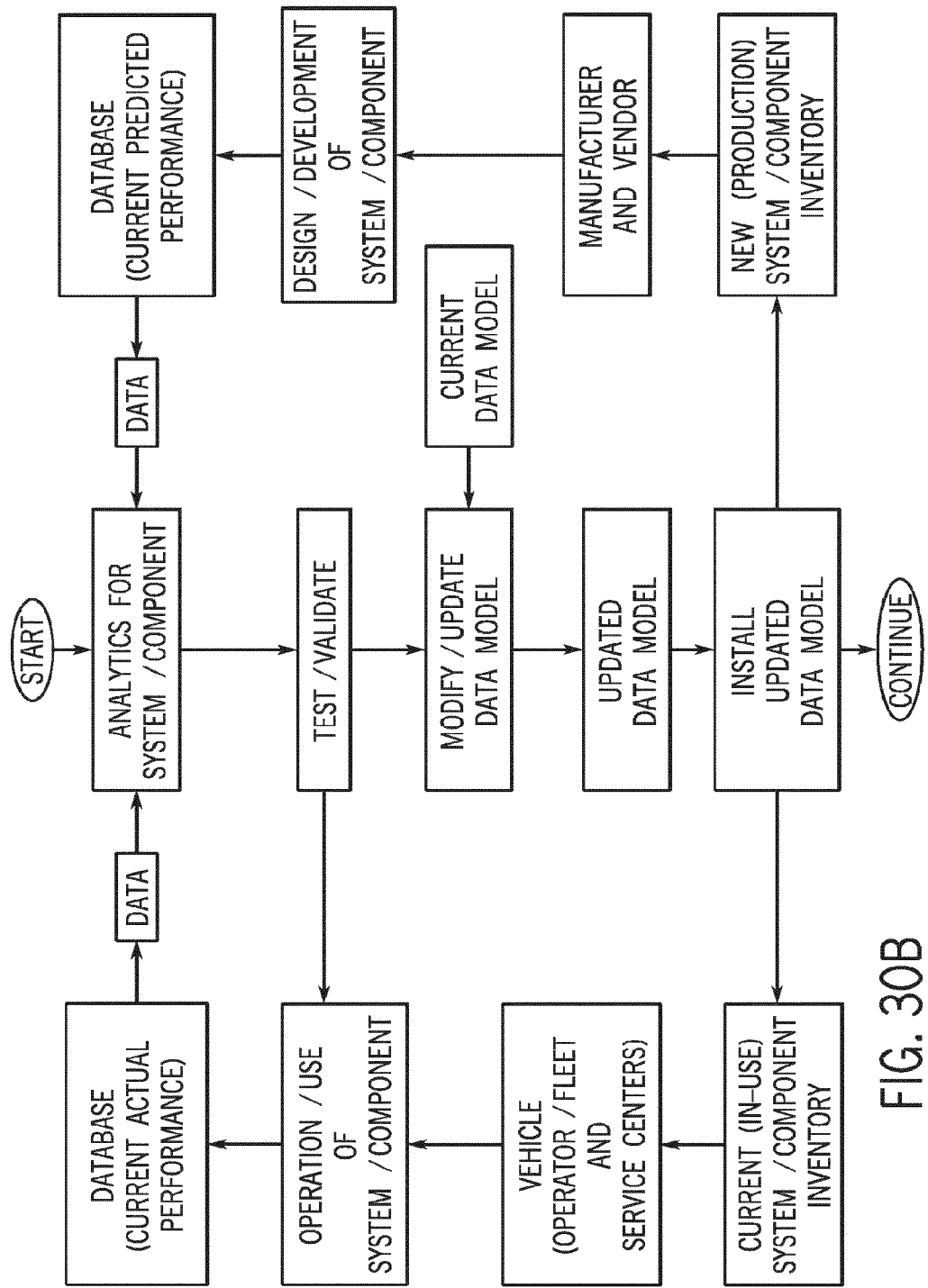

Referring to FIG. 27D, according to an exemplary embodiment, the analytics system is configured to provide enhanced functionality for management and operation of vehicles and vehicle systems (including vehicle fleet management, see e.g. FIGS. 1A-1C, 2A-2B, 12A-12B, 28 and 31), for inventory management systems for components including for life-cycle management (see FIGS. 23-25 and 26A-26B), for data centers and other computing systems/computing devices connected to various networks that allow sharing of data sources (see, e.g. FIGS. 3, 4A-4C, 12A-12B, 18 and 23), and for other technical/commercial systems uses and services (e.g. component developers, designers, manufacturers, vendors, etc., see e.g. FIGS. 29 and 30A-30B). According to an exemplary embodiment (as shown in FIGS. 27A-27D), the analytics system provides data, data sets and data models to the vehicle in the form of updated data models for components of vehicle systems such as battery modules of a battery system (see also FIGS. 15A-15B and 17), data sets and operating programs for management/control systems for vehicle systems such as the battery management system/controller for the battery system (see also FIGS. 13, 16 and 18). As indicated, data sets and data models (as well as operating programs) for components of vehicle systems and otherwise available from the data analytics system may be commercialized to component manufacturers, vehicle manufacturers, service centers, data centers, entities and institutions operating and/or servicing vehicles or vehicle fleets, vehicle owners, etc. as a product or service (e.g. subscription for data access and updates under contract or license).

According to an exemplary embodiment, as indicated schematically in FIG. 28, for vehicles where the vehicle system is a battery system analytics function/system will access a database or databases of aggregated data from multiple data sources including from multiple vehicles having battery systems (with battery management systems and battery packs/modules as indicated in FIGS. 6, 7A-7C, 11A-11D), from networks including the internet (see FIGS. 3 and 18), from data centers (and other computing devices as indicated in FIGS. 3, 4A-4C and 5) and other databases; in the analytics function/operation data as acquired and aggregated can be stored in databases and are interchanged with each computing system operating (or operating as) the analytics system. See FIGS. 27A-27D.

According to an exemplary embodiment, a method of data analytics for data sets/data sources for a vehicle and vehicle systems is shown schematically in FIG. 29; as indicated, the data analytics function is employed to maintain and enhance the accuracy and content of any database used in connection with the vehicle (e.g. vehicle systems, operators/drivers, fleet management/operations, service centers, inventory managers/centers, etc.) or by other entities in relation to the vehicle (e.g. manufacturers, designers, vendors/suppliers, etc. for vehicles, vehicle systems, related systems and services). See e.g. TABLES B through I. Data from data sources as indicated in FIG. 27B is provided to the analytics system for data operations/analysis, etc. as indicated in FIG. 27C; database content is updated and enhanced in the analytics system and then stored and made available (e.g. by network connectivity, etc.) in the database. According to an exemplary embodiment, as indicated in FIG. 29, ongoing monitoring of data sets can be performed and the analytics function may be ongoing based on data made available from data sources. According to an exemplary embodiment, data analytics can be used to maintain and/or enhance the quality of data of any of a wide variety of types and sources (including but not limited to data/information of the types indicated in TABLES B through I and other items of data/information used by or acquired from vehicle systems, management systems, data centers, data sources, etc.).

As indicated schematically in FIGS. 30A and 30B, data analytics for data models of components of vehicle systems can be performed at a small scale (e.g. local/fleet/institutional) level for a vehicle or local fleet of vehicles (see FIG. 30A) or at a large scale (e.g. regional/national/global) level for large groups and classes of vehicles and components (see FIG. 30B). According to an exemplary embodiment, at a small scale level, modification and refinement of data models for components may be made using objectives and criteria for the localized vehicle or fleet (see TABLE J) as well as using a comparison and evaluation of empirical (e.g. actual measured) performance data acquired at the localized vehicle or fleet and predicted performance data (e.g. from the current data model); testing of modifications and enhancement of a modified data model may be performed; after validation the data model may be updated and provided to the vehicle for operation/use of the component; the updated data model will be installed in the management system for the vehicle (and will become the predicted performance data model for subsequent analytic functions). According to an exemplary embodiment, at a large scale level, modification of data models may be made using aggregated data acquired on a large scale of many vehicles in a large class or group (e.g. regionally/nationally/internationally); the analytics function is performed (see FIG. 27C) on the aggregated data of current actual performance of the component (e.g. from acquired empirical data for the large group of vehicles) in comparison to the current predicted performance of the component (e.g. from the current data model); the data model may be updated to enhance performance and accuracy; the updated data model is available to be installed in current in-use inventory of the component (e.g. as an upgrade) and in subsequently manufactured components (e.g. provided to manufacturer and vendor) or inventory not yet sold or distributed (e.g. components not yet in use). According to an exemplary embodiment, the updated data model for the component after installation in a vehicle can be monitored with acquired data as to actual performance made available to the analytics system for ongoing analysis and update/modification of the data model.

According to an exemplary embodiment, a data model may be provided for at least one of the components of a vehicle system to provide a representation of the expected performance or response of the component in the expected operating conditions. The data model may comprise data values (e.g. a database such as for look-up tables) and/or algorithms/equations (e.g. providing values derived by computation or from formula or empirical data). (As indicated, the data model for component or vehicle system may comprise a data set and/or a computational model/program or algorithm; the term "data model" is intended to cover any type of data-based model, algorithm-based, computational-based, etc. model for any type of component or system, without limitation.)

According to an exemplary embodiment, as shown in FIGS. 14 and 15A-15B, the vehicle with access to the data analytics system/function comprises a vehicle system including a battery system and the components of sets and the battery system are battery modules that comprise data sets and a data model (e.g. data/computational model) that is employed by a battery management system as part of a vehicle management system in operation of a vehicle (see FIGS. 1A-1B, 2A-2B and 16-17) and that can also be used by systems to manage the configuration of the battery system of the vehicle (see FIGS. 9A-9E, 10A-10F, 11A-11D and 19) and to manage inventory of battery modules (see FIGS. 22-25) and to manage the life-cycle of battery modules (see FIGS. 26A-26B) or to manage a fleet of vehicles (see FIGS. 12A-12B and 31).

According to an exemplary embodiment, the analytics system can be configured to use any of a wide variety of categories of data and information from data sources regularly available or periodically available including categories of information that may only periodically be available (such as dependent upon connectivity by vehicles or vehicle systems to external networks including the internet); the analytics system can be programmed to use the data and information as is available from databases and/or to perform, acquire or obtain data and information (e.g. updated) from sources according to a hierarchy or routine according to availability intended to ensure that reliable/accurate data and information is used; the analytics system may provide checks and redundancy in data sources to enhance system reliability. See FIGS. 2A-2B, 3, 16, 27A-27D and 28. The analytics system may be configured to anticipate need and use of data and information and to obtain data updates for storage in a data base (e.g. autonomously or by program) as useful or necessary when updated data and information is available. See, e.g., FIGS. 2A-2B. According to any preferred embodiment, the system will be provided with data storage (e.g. databases) to store all data and information needed for use and operation. According to a preferred embodiment, items of data and information for the system may be structured in categories relating to the type of the item of data and information and the manner in which the item of data and information can be acquired or otherwise obtained for the management system. See FIGS. 27A-27C.

According to an exemplary embodiment, data sources provide data as data records accessible to the computing system of the analytics system by data communications or from data storage (e.g. managed in a database and/or data files). See FIGS. 27A-27D and 28. The data sources from a vehicle may include instrumentation of systems and components associated with vehicle systems. See FIGS. 1A-1C, 2A-2B and 27A-27C. According to an exemplary embodiment, instrumentation providing data for analytics is associated with vehicle systems such as the battery system; instrumentation may comprise a global positioning system, an accelerometer, data acquisition systems for monitored systems and components, a thermal monitoring system (e.g. thermocouple or other temperature monitoring system or device), etc.; the instrumentation devices may comprise data storage capability (e.g. to buffer and store data to be transmitted).

According to an exemplary embodiment, the system for analytics may be connected to a network so that data sources include other sources (e.g. sources available on an external proprietary network or the internet). See FIGS. 2B, 3, 4A-4C, 18, 27A-27D and 28. According to an exemplary embodiment, data sources may provide data relating to operating conditions for vehicles and vehicle systems in duty, such as duty or route of vehicles, operators of vehicles, types of vehicles, configurations of vehicle systems, operating conditions of vehicles in the duty and environmental conditions of vehicles in the duty. See FIGS. 27A-27D. According to an exemplary embodiment, operating conditions available from data sources (on vehicles and external to vehicles) may include at least one of temperature, weather, weather forecast, time of day, day of week, day of year, global positioning system (GPS) location data, traffic conditions at locations, route information for vehicles in duty and available resources for vehicle systems. Experimental data or empirical data for vehicles and vehicle systems/components may be available. According to an exemplary embodiment, available resources from vehicle systems may comprise data related to refueling and/or recharging, energy cost data and network connectivity to the internet; the system can be configured so that updated/current data is used when available and actual data is obtained or used if available.

Data and information from the analytics system can be retrieved and accessed from network-connected databases/data stores computing device for purposes of review, backup, evaluation, forensic and analytics. Data and information from multiple data sources can be collected, aggregated, combined and compared and used for any of a wide variety of purposes, including evaluating of system/vehicle/component performance, driver/operator profiling, trend identification, optimization program/routine development and modification, business analytics, resource and facility planning, pattern identification, profile development, capacity monitoring and development, performance comparison, product evaluation, cause-effect evaluation, experimentation, etc. (see e.g. TABLES B through J).

According to any exemplary embodiment, the system is configured to use data from data sources to enhance the performance of vehicle systems such as the energy storage system and/or vehicles in operation, for example, to improve energy efficiency to extend component life, to optimize performance of duties, to reduce the occurrence of malfunctions/failure, to ensure proper use of components, to manage service routines, to manage and optimize product life-cycle, etc.

According to an exemplary embodiment, the data analytics system may use data and other considerations in the performance of various functions (and combinations of functions) including but not limited to: improve accuracy of data used by systems (e.g. data models and data sets); identify patterns and trends in aggregated data (e.g. as to performance of vehicle systems and components and/or conditions of operation); update data models for components; update data sets from data sources; optimize data sets/data models and/or programs relating to performance of various combinations of components and conditions; optimize data sets/data models and/or programs relating to performance of various combinations of components and duties in conditions; optimize data sets/data models and/or programs relating to performance of various combinations of components and vehicles for duties; optimize data sets/data models and/or programs relating to performance of various combinations of components and vehicles in conditions; optimize management of vehicle systems with components; improve accuracy of data models including computational models and related development; facilitate data-mining of aggregate data for research (e.g. as to performance of vehicle systems and components and/or conditions of operation); facilitate data operations including comparison and evaluation; facilitate data analysis and interpretation of aggregated data; maintain accurate database content for systems; identify opportunities for component and vehicle performance improvement; update operating programs for systems; enhance data sets with empirical data from actual performance; improve predictive management of vehicle systems based on data; management of vehicle systems using data from actual performance of components; create data models and operating programs using actual performance data for components (e.g. supplemental data models and operating program routines/modules); identify failure modes and conditions for components from data of actual performance; improve data quality from data sources; commercialize data sets aggregated from data sources (e.g. to data vendors/services, component producers/service stations, etc.); update locations of available system resources (e.g. charging stations, wireless charging locations, etc.); package data sets for commercialization to outside entities (e.g. to data vendors/services, component producers/service stations, etc.); and manage life-cycle of components including using data as to phase of life-cycle and classifications of duties/routes, conditions/climate, etc. See also TABLES B-I.

According to an exemplary embodiment, the data analytics function/system also provides commercialization opportunities to establish data-related opportunities to improve revenues and enhance productivity including partnerships with customers, suppliers or other entities that make it possible to combine external data with internal data. Data made available through an analytics function/system can be interchanged within an enterprise to build institutional knowledge, identify opportunities/options, identify risks and hazards, analyze and make trade-offs (e.g. "build versus buy" trade-offs), datamined for hidden trends, improve insights into customer relationships (e.g. retention and pricing), perform modeling and analysis (including core data, models and tools such as predictive or optimization models) evaluate and establish strategic objectives, identify expected performance improvements, develop new metrics, etc.

Fleet Management

According to an exemplary embodiment, a fleet management system (FMS) is provided for a group or fleet (F) of multiple vehicles having vehicle systems such as an energy storage system. See FIGS. 12A-12B and 31.

Referring to FIG. 12A, a set or fleet of vehicles each with a management system with a data center connected by network through a computing device is shown schematically according to an exemplary embodiment. See also FIG. 12B (showing fleet of vehicles with identified battery systems). According to an exemplary embodiment, the systems and methods for configuration, management, operation, etc. of an individual vehicle having an energy storage system such as a battery system with interchangeable components such as battery modules will apply to a fleet comprising one or more such vehicles.

The fleet of vehicles is connected by network to a computing system at a facility from which fleet management operations (or some portion of fleet operations) may be performed; according to an exemplary embodiment as shown schematically, the computing system comprises a computing device C with a network interface/adapter N and a user interface UI. See FIGS. 4A-4C and 12A-12B. At computing device C, a person will be able to access the management system of a network-accessible vehicle in the fleet and perform operations such as programming of certain vehicle systems, uploading and downloading data and information, diagnostic tests and monitoring, etc. Data records available may be accessed from information from a mobile device, such as a smart phone, a mobile phone, a tablet, etc. See FIG. 18.

Referring to FIG. 31, system and data operations for a fleet management system comprising a fleet of vehicles with vehicle systems, such as an energy storage system comprising a battery system with components such as battery modules, is shown schematically according to an exemplary embodiment (see also FIGS. 1A-1C, 2A-2B and 12A). The fleet of vehicles comprises each of the vehicles with vehicle systems as installed and/or configured/configurable with components to perform functions and duties such as travel on designated routes for designated activities under the operation of drivers/operators: data and information as to the fleet and functions/duties is provided to the computing system and database for the fleet management system along with data and information as to vehicle systems and components (e.g. type and status, see FIGS. 14, 15A-15B, 22 and 26A). According to an exemplary embodiment, the fleet management system uses data and objectives (e.g. criteria, objectives, considerations, weighting, etc. for operation of the fleet such as cost efficiency, reducing total cost, extending component life, etc. as determined and implemented) in an operating program/algorithm to manage fleet operations; the fleet management system identifies options (among other considerations) for configuration of vehicles and vehicle systems and for routes/duties for vehicles in the fleet. See also TABLES A-J. According to an exemplary embodiment, the fleet operations comprise (among other functions) assignment of route/duty to specific vehicles in the fleet, configuration of vehicles and vehicle systems with components for the duty (see e.g. FIGS. 11E, 19, 20A-20B, 21A-21B, 23, 25 and 26A-26B), loading of a program/plan for management and operation of each of the vehicles and vehicle systems (see e.g. FIGS. 3, 4A-4C, 13 and 16-17) and monitoring of the fleet of vehicles. According to an exemplary embodiment, monitoring of the fleet of vehicles will comprise collection of data for an analytics system/function (such as indicated in FIGS. 27A-27D, 28, 29 and 30A-30B).

As indicated in FIGS. 4A-4C (and 12B), vehicles may be operated individually (e.g. as a personal/family or small-business vehicle) or may be operated in fleets (e.g. by entities such as commercial entities, rental agencies, governmental/municipal entities, etc.). According to an exemplary embodiment, multiple individual or fleet vehicles may be aggregated or associated in one or more groups or fleets (e.g. fleets or groups according to common or shared attributes such as type, manufacturer, model, location, service center/pattern, component configuration, driver/operator association or type, use or use history, etc.); data/network connectivity and data operations for groups (formal, informal, or selective) may be configured based on the needs, interests or capabilities of the group/fleet and network/user interfaces and nodes developed or configured for vehicles (and operators of vehicles) in the group or fleet. For example, a group of vehicles sold by or serviced at a vehicle dealer, from a particular manufacturer, registered with an association or club (e.g. automobile association/club, etc.) or otherwise affiliated in some manner or with a collective interest/purpose may be provided with shared network and data connectivity (e.g. operated under a fleet management system and with shared use of related data/information access).

As indicated schematically in FIGS. 2A-2B, 3, 4A-4C, 12A-12B and 31, the management system for a vehicle or fleet of vehicles may be configured to allow network-connected access from various other computing systems, such as mobile devices, home/office computers, fleet/service center, data center, etc.

According to an exemplary embodiment, vehicles within a fleet may also be operated according to a management plan/program and with a configuration modified for a particular operator/driver or use/duty. For example, fleet vehicles such as rental/motor pool/company vehicles may be assigned (typically temporarily) to an individual operator on a long-term or short-term basis; the operator may be provided with personal access for data interchange as well as control for the vehicle management system via an authorized mobile/computing device (e.g. smart phone, cellular telephone, tablet computer, etc.).

Fleet management operations may be coordinated with an analytics function to use data to build, share and update databases (e.g. data sets, data models, etc. using actual performance data from components in operation vehicles in conditions or test data) that can be used by multiple vehicles and vehicle systems (both within a fleet and outside a fleet of vehicles).

Scenarios/Examples

The operation and practice of the methods/systems and components can be further described with reference to various scenarios/examples in various conditions for vehicle systems such as an energy storage system shown as a battery system for a vehicle. See e.g. FIGS. 1A-1B and 2A-2B.

Example A

Personal Vehicle Configuration/Reconfiguration

Data sources make data available to the vehicle and operator as indicated in FIGS. 2A-2B, 3 and 4A-4C. Data inputs comprise anticipated vehicle use/duty and available battery configurations for the vehicle.

For a battery system with interchangeable battery modules, different configurations of the battery system may be recommended and installed/implemented for different anticipated operating conditions through installation of different types of battery modules in the vehicle.

In operation according to an exemplary embodiment, the system provides direction for configuration of the battery system based on data available from data sources. As indicated, with various other (interchangeable) battery modules of various other type/phase/condition, the battery system can be configured to provide a wide range of performance characteristics adapted or adaptable to suit intended specialization/optimization objectives or requirements comprising or according to any of a wide variety of other considerations such as energy efficiency, total costs, etc. See TABLE J. Battery types comprise a high energy type (e.g. with enhanced range/capacity) and a high power type (e.g. with enhanced rate of power delivery/energy transfer). The vehicle may be configured with an objective to enhance performance in anticipated conditions of operation: for typical commuting, two high power modules and four high energy modules (see FIG. 20A); for a long trip (accepting reduced acceleration but increased range), six high energy modules (see FIG. 20B); for intensive recreation activity such as street racing or mountain driving, five high power modules and one high energy module (see FIG. 20C).

Actual use and performance data will be provided to a database and data center for data analytics.

Example B

Single Vehicle Use/Management

Data sources make data available to the vehicle as indicated in FIGS. 2A-2B, 3 and 4A-4C. Data inputs comprise predicted route (e.g. based on prior GPS history or user input) plus topographic/road information plus predicted ambient temperatures (cold weather) plus battery capacity and capacity versus discharge rate, plus battery charge state, etc.

Data analysis determines that the intended route has steep slopes which in cold ambient conditions will drain batteries at high rate, reducing overall capacity sufficiently to require early recharge (before end-of-route).

In operation according to an exemplary embodiment, the management system provides that recommended plan for control output is to limit maximum sustained power drain (and therefore limit uphill speed) until battery internal temperature has risen to a higher value. The system may also activate a battery heater (consuming some stored energy) to raise battery temperature before encountering high-drain part of the route.

If battery modules are interchangeable (swappable) modules, the system may recommend or select installation of high-power batteries versus high-energy batteries. The system will provide alerts and communication to advise the user/operator to either limit total distance traveled (provide a message "don't run extra errands today") or to recharge the battery module during the day. Communications may be provided to the user/operator at a user interface in the vehicle as well as to computing devices such as a home computer, table computer and smart phones.

Actual use and performance data will be provided to a database and data center for data analytics.

Example C

Single Vehicle Use/Management

Data sources make data available to the vehicle as indicated in FIGS. 2A-2B, 3 and 4A-4C. Data inputs comprise predicted route, traffic prediction (e.g., heavy traffic due to a scheduled sports event at/or along the route), battery capacity and regenerative charge efficiency, battery charge state, driver habits (tendency of the operator to be impatient in traffic and use of abrupt acceleration Data analysis determines that there is a significant probability that the vehicle will be caught in stop-and-go traffic with low battery charge state at end of day; resultant in frequent heavy discharge/charge cycles at low charge will tend to decrease battery life (and use history will be recorded on data/ID tag on battery module as data record).

In operation according to an exemplary embodiment, the management system provides that recommended plan for control output (in addition to other measures, e.g., limiting maximum discharge rate) should include exceeding normally optimum recharge rate during a mid-day charging stop so that battery charge state will be higher at the end of the day.

In operation according to an exemplary embodiment, the system provides that recommended plan for configuration with interchangeable modular batteries is to select at least one module with high cycle life to accommodate stop-and-go conditions.

Actual use and performance data will be provided to a database and data center for data analytics.

Example D

Small-Fleet Management (e.g., Delivery Trucks, Buses)

Data sources make data available to the vehicle as indicated in FIGS. 2A-2B, 3 and 4A-4C. Data is available to a data center to perform fleet management operations for a fleet of vehicles with battery systems.

Routes and battery usage are predictable and are normally set up for efficient use of battery modules; e.g., battery packs with new (highest-capacity) battery modules are installed in vehicles with most demanding routes. However, a predicted weather event (very high temperatures) will make most demanding routes exceed the energy capacity of the best battery packs, due to air conditioning loads and battery losses at high temperature (as predicted and based on data/computation models).

In operation according to an exemplary embodiment, the management system provides that recommended plan for control output is to identify vehicles with battery systems comprising at-risk battery modules and assign special routes, modified to reduce demand; plan will also recommend swapping vehicles partway through the day between high and low demand routes, or otherwise provide additional support resources for possible in-field events/failures.

In operation according to an exemplary embodiment, the system provides that recommended plan for a fleet is to deliberately assign highest-capacity battery packs to less demanding routes that can be completed on one charge and low-capacity batteries to high demand routes with vehicles swapped out (e.g., use "reserve" vehicle to replace a "depleted" vehicle halfway through the day).

Additional inventory of new high-capacity battery modules is ordered from a regional center as needed; failed battery modules are designated in life-cycle management system and reconditioned or recycled.

Actual use and performance data will be provided to a database and data center for data analytics. Data models for battery module types will be updated to reflect actual performance data in the demanding route/weather conditions. Data will be shared with subscribers including other fleet managers and component/vehicle producers.

Example E

Large-Fleet Management (e.g., Delivery Trucks, Buses)

Data sources make data available to the vehicle as indicated in FIGS. 2A-2B, 3 and 4A-4C. Data is available to a data center to perform fleet management operations for a fleet of vehicles with battery systems.

Vehicles are in operation under the direction of a fleet management system. Vehicles are in operation at multiple locations. At one location the duty to be performed by the vehicles is demanding and requires more energy to be used.

Routes and battery usage are predictable and are normally set up for efficient use of battery modules; e.g., battery packs with new (highest-capacity) battery modules are installed in vehicles with most demanding routes. As battery modules are used the effects of age and use reduce the capacity and other performance characteristics of the battery modules.

In operation according to an exemplary embodiment, the management system will transfer battery modules from one location to the other location so that the battery system in the vehicles of the fleet of vehicles based at the location where the duty to be performed is more demanding each have installed higher-capacity/newer battery modules. Later in life-cycle the battery modules are used in the battery system of vehicles in the fleet of vehicles at the location where the duty to be performed is not as demanding.

In operation according to an exemplary embodiment, the system provides that recommended plan for a fleet is to assign highest-capacity battery packs (e.g. with new battery modules) to more vehicles in operation in more demanding duty stations. Use of battery modules is monitored regularly and as battery modules age and have reduced capacity/performance the battery modules are transferred for installation in other vehicles in the fleet that perform standard duty.

Additional inventory of new high-capacity battery modules is ordered from regional center as needed; failed battery modules are designated in life-cycle management system and reconditioned or recycled.

Actual use and performance data will be provided to a database and data center for data analytics. Data models for battery module types will be updated to reflect actual performance data in the demanding route/weather conditions. Data will be shared with subscribers including other fleet managers and component/vehicle producers.

Example F

Single Vehicle Use/Management (Deterministic) (Alternative)

Data sources make data available to the vehicle as indicated in FIGS. 2A-2B, 3 and 4A-4C. Data inputs comprise predicted route (e.g. based on prior GPS history or user input) plus topographic/road information plus predicted ambient temperatures (cold weather) plus battery capacity and capacity versus discharge rate, plus battery charge state, etc.

The vehicle is a hybrid-electric vehicle (with a fuel combustion power plant and electric motors each providing propulsion for the vehicle).

Data analysis determines that the intended route has steep slopes which in cold ambient conditions will drain batteries at high rate, reducing overall capacity sufficiently to require early recharge (before end-of-route).

In operation according to an exemplary embodiment, the management system provides that recommended plan for control output is to limit maximum sustained power drain (and therefore limit uphill speed) until battery internal temperature has risen to a higher value. The system may also command the fuel combustion engine to provide power when encountering high-drain part of the route.

If battery modules are interchangeable (swappable) modules, the system may recommend or select installation of high-power batteries versus high-energy batteries. The system will provide alerts and communication to advise the user/operator to either limit total distance traveled (provide a message "refuel the fuel combustion system") or to recharge the battery module during the day. Communications may be provided to the user/operator at a user interface in the vehicle as well as to computing devices such as a home computer, table computer and smart phones.

Actual use and performance data will be provided to a database and data center for data analytics.

Example G

Single Vehicle Use/Management (Probabilistic) (Alternative)

Data sources make data available to the vehicle as indicated in FIGS. 2A-2B, 3 and 4A-4C. Data inputs comprise predicted route, traffic prediction (e.g., heavy traffic due to a scheduled sports event at/or along the route), battery capacity and regenerative charge efficiency, battery charge state, driver habits (tendency of the operator to be impatient in traffic and use of abrupt acceleration).

The vehicle is a hybrid-electric vehicle (with a fuel combustion power plant and electric motors each providing propulsion for the vehicle).

Data analysis determines that there is a significant probability that the vehicle will be caught in stop-and-go traffic with low battery charge state at end of day; resultant in frequent heavy discharge/charge cycles at low charge will tend to decrease battery life (and use history will be recorded on data/ID tag on battery module as data record).

In operation according to an exemplary embodiment, the management system provides that recommended plan for control output (in addition to other measures, e.g., limiting maximum discharge rate) should include exceeding normally optimum recharge rate during a mid-day charging stop so that battery charge state will be higher at the end of the day. The fuel combustion engine will be used if the battery system capacity is reduced below a designated threshold value (and/or periodically for a generator to recharge the battery system).

In operation according to an exemplary embodiment, the system provides that recommended plan for configuration with interchangeable modular batteries is to select at least one module with high cycle life to accommodate stop-and-go conditions.

Actual use and performance data will be provided to a database and data center for data analytics.

It is important to note that the construction and arrangement of the elements of the inventions as described in system and method and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, variations in the arrangement or sequence of process/method steps, operating conditions and arrangement of the preferred and other exemplary embodiments without departing from the spirit of the present inventions.

It is important to note that the system and method of the present inventions can comprise conventional technology (e.g. vehicle technology, battery systems, battery technology, instrumentation/monitoring technology, control systems, computing systems, networking technology, data storage, systems/software, application programs, etc.) or any other applicable technology (present or future) that has the capability to perform the functions and processes/operations indicated in the FIGURES. All such technology is considered to be within the scope of the present inventions.

Tables

TABLE A

| Legend Data Sources (e.g. vehicle/component or network) | |
|---|---|
| Code | Data Source |
| VM | Vehicle measured/detected |
| VI | Vehicle input |
| VS | Vehicle data storage |
| OI | Operator/user input |
| ND | Network data |
| NS | Network data storage |
| NV | Network verified |
| SC | System calculated/estimated |

TABLE B

| Data from energy storage system (e.g. battery system) | |
|---|---|
| Data Item | Source |
| Battery module identifier(s) | VI/ND |
| Battery module type (chemistry/form) | VI/ND |
| Present system configuration | VI/ND |
| Battery module condition | VI/ND |
| Battery module phase (phase of life-cycle) | VI/ND |
| Battery module maintenance | VI/ND |
| Configuration options/inventory | VI |
| System instrumentation | VD |
| Event/trip/activity-demand history | VS/ND |

TABLE B-continued

Data from energy storage system (e.g. battery system)

| Data Item | Source |
|---|---|
| Battery module state (age/history/event) | VI |
| Battery system/module status | VD |
| Battery system monitoring | VD |
| Charge/discharge history (cycles)(depth of discharge) | VD/SC |
| State of health (SOH) | VD/SC |
| State of charge (SOC) | VD/SC |
| Power/energy remaining capacity/life (throughput) | VD/SC |
| Condition (internal resistance, deterioration) | VD |
| Shock/vibration data | VD |
| Operating limits/recommendations | VD |
| Internal resistance/impedance | VD |
| Self-discharge rate | VD |
| Overcharge/thermal event record | VD |
| Electrolyte level(if applicable) | VD |
| Gas pressure (if applicable) | VD |
| Reconditioning options/history | VI/ND |
| Voltage balance (cell balance) | VD |
| Total energy throughput | SC/VD/ND |
| Energy throughput history | VS/ND |
| Control strategy data | ND |
| Performance history | ND |
| Override factors | UI |
| Warranty Status | ND |

TABLE C

Vehicle type and use

| Data Item | Source |
|---|---|
| Vehicle identity | VS |
| Vehicle type | VS |
| Vehicle configuration | VI/VS/VD |
| Vehicle age | VS |
| Vehicle status (operations/systems) performance | VS/ND |
| Vehicle fuel level | VD |
| Service record | VS/ND |
| Duty/use history | VS/ND |
| Duty/use patterns | ND |
| Duty/use types | ND |
| Driver-vehicle relationships | ND |
| Vehicle systems/monitoring | VD/SC |
| Vehicle instrumentation | VD |
| Vehicle maintenance | ND |
| Vehicle analytics | ND |
| Vehicle events | ND |
| Vehicle mode/programs | VS/ND |
| Similar vehicle data | ND |

TABLE D

Route/duty (event/trip/activity)

| Data Item | Source |
|---|---|
| Duty/route type | VS/ND |
| Duty/route classification | VS/ND |
| Duty/route event history | VS/ND |
| Duty/route event log | VS |
| Duty/route history | VS |
| Duty/route activity history | VS/ND |
| Duty/route activity/trip log (track) | VI/VS/ND |
| Route definition/categories | UI/ND |
| Duty definition/categories | ND |
| Destination categories | ND |
| Destination (stops) | VI |
| Waypoints | VS |
| Stored routes/duties | VS |
| Custom routes/duties | ()I |
| Driver-event relationship | VS/ND |
| Services/service facilities | ND |

TABLE D-continued

Route/duty (event/trip/activity)

| Data Item | Source |
|---|---|
| Energy use history | ND |
| Duty/route trip-energy demand history | ND |
| GPS data (Global Positioning System) | VS/ND |
| Load/demand profile/history | ND |
| Criticality of duty/route | ND |

TABLE E

Resources/facilities

| Data Item | Source |
|---|---|
| Inventory availability (matching/use) | ND |
| Locations of facilities (types and options) | ND |
| Network access locations (by service provider) | ND |
| Fuel stations | ND |
| Fuel costs (by location) | ND |
| Maintenance/service centers | ND |
| Charging stations | VS/ND |
| Charging costs (by location) | ND |
| Mobile internet coverage (by service provider) | ND |
| Cellular network coverage (by service provider) | ND |
| Resource use history | ND |
| Facility use history | VS/ND |
| Network/internet access history | VS/ND |

TABLE F

Operator/driver identification and preferences

| Data Item | Source |
|---|---|
| Operator/driver identity | VI |
| Operator/driver style | VS/ND/OI |
| Operator/driver history | VS/ND |
| Operator/driver demographics | ND |
| Operator/driver record | ND |
| Operator/driver preferences | V S/ND/OI |
| Operator/driver destinations | ND |
| Operator/driver type/category | ND |
| Operator/driver patterns | SC/ND |
| Operator/driver-vehicle relationship | ND |
| Operator/driver-duty/route relationship | ND |
| Operator/driver analytics | ND |
| Similar operator/driver data | ND |
| Operator/driver events | VS/ND |

TABLE G

Road conditions/traffic (at location/on route/at destination)

| Data Item | Source |
|---|---|
| Traffic congestion | ND |
| Road conditions | ND |
| Road construction/detours/delays | ND |
| Road type | VS/ND |
| Terrain/grade (topography) | VS/ND |
| Alternative routing (GPS or override) | VS/ND |
| Seasonal road closures | ND |
| Vehicle restrictions (height/weight/etc.) | VS/ND |
| Traffic regulations/speed limits | VS/ND |
| GPS data | VS |
| GPS update | ND |

TABLE H

| Date/time/season | |
| --- | --- |
| Data Item | Source |
| Date (day/month/year) | ND |
| Time of day | ND |
| Day of week | ND |
| Time of year | ND |
| Season/climate | SC |

TABLE I

| Environmental condition/weather (at location/on route/at destination) | |
| --- | --- |
| Data Item | Source |
| Current temperature/conditions | VM |
| Current conditions (e.g. precipitation/cloud cover/etc.) | ND |
| Humidity | VM |
| Forecast temperature (average/high/low) | ND |
| Forecast conditions | ND |
| Recorded temperature (history) | ND |
| Recorded conditions (history) | ND |

TABLE J

| Plan Objectives |
| --- |
| Cost-reduction |
| Overall efficiency |
| Optimize time |
| Extended life |
| Reduced emissions |
| Net energy consumption |
| Maximum energy at destination |
| Optimize network connectivity |
| Reduced traffic |
| Access to resources |
| Redundancy/criticality |

The invention claimed is:

1. A system for configuration of an energy storage system of a vehicle having vehicle systems including the energy storage system which comprises interchangeable components comprising:
   (a) a computing system configured to determine a recommended configuration for the energy storage system;
   (b) connectivity by the computing system with an interface to report the recommended configuration for the energy storage system;
   (c) connectivity by the computing system to at least one data source on the vehicle providing data relating to the vehicle and the energy storage system;
   (d) a predictive controller configured to predict conditions of operation of the vehicle and further configured to manage operation of the energy storage system based on the predicted conditions of operation, wherein the predictive controller is in communication with the computing system;
   wherein the computing system is configured to use data from data sources to determine the recommended configuration of interchangeable components of the energy storage system based on considerations including objectives and the predicted conditions of operation of the vehicle; and wherein data from data sources available to the computing system for configuration of the energy storage system of the vehicle comprise at least data relating to (a) the vehicle, (b) a duty to be performed by the vehicle, (c) conditions of operation of the vehicle, and (d) components of the energy storage system;
   wherein data relating to a component of the energy storage system comprises at least data relating to (a) identity of the component; (b) type of the component; (c) status of the component; so that configuration of the energy storage system of the vehicle is based on data and information available from data sources including at least one data source on the vehicle; and
   wherein the recommended configuration of interchangeable components of the energy storage system includes instructions for including at least two different specific interchangeable components with different performance characteristics in the energy storage system.

2. The system of claim 1 wherein data from the data sources available to the computing system for configuration of the energy storage system comprises at least data from components of the energy storage system.

3. The system of claim 1 further comprising connectivity by the computing system to at least one data source external to the vehicle providing data for configuration of the energy storage system of a vehicle.

4. The system of claim 3 wherein the configuration of the energy storage system is based on data and information available from connectivity to data sources external to the vehicle.

5. The system of claim 1 further comprising a management system for the energy storage system so that performance of the vehicle and the energy storage system in operation of the duty can be managed according to a management plan and the conditions of operation.

6. The system of claim 1 wherein data relating to components comprises at least data relating to (d) history of the component.

7. The system of claim 1 wherein the data relating to interchangeable components comprises data relating to interchangeable components available to be installed in the energy storage system for the recommended configuration.

8. The system of claim 1 wherein the predicted conditions comprise operating conditions of the vehicle in the duty.

9. The system of claim 1 wherein the predicted conditions comprise environmental conditions in which the vehicle is expected to be operated.

10. The system of claim 1 wherein the energy storage system comprises at least one modular component, and wherein the data sources comprise a data model for the component stored on memory associated with the component.

11. The system of claim 1 wherein the computing system is configured to provide a signal to a controller for the energy storage system to manage use of energy by vehicle systems.

12. The system of claim 1 wherein the energy storage system comprises at least two packs each comprising at least one interchangeable component.

13. The system of claim 1 wherein the energy storage system comprises at least two interchangeable components.

14. The system of claim 1 wherein objectives for the recommended configuration of the energy storage system comprise at least one of
   energy efficiency;
   total operating cost;
   energy availability;
   emissions; and
   extending component life.

15. The system of claim 1, wherein the predictive controller is configured to predict the conditions of operation of the vehicle based on at least one of a driver identity, an anticipated duty of the vehicle, an anticipated use of the vehicle, a location of the vehicle, a route of the vehicle, a time of day, traffic conditions, weather conditions, an operation regulation, an operation restriction, local fuel availability information, local fuel cost information, grade information corresponding to a route, and/or topographical information.

16. A system for configuration of a battery system of a vehicle having vehicle systems including the battery system which comprises interchangeable battery modules comprising:
   (a) a computing system configured to determine a recommended configuration for the battery system;
   (b) connectivity by the computing system with an interface to report the recommended configuration for the battery system;
   (c) connectivity by the computing system to at least one data source on the vehicle providing data relating to the vehicle and the battery system;
   (d) a predictive controller configured to predict conditions of operation of the vehicle and further configured to manage operation of the battery system based on the predicted conditions of operation, wherein the predictive controller is in communication with the computing system;
   wherein the computing system is configured to use data from data sources to determine the recommended configuration of interchangeable battery modules of the battery system based on considerations including objectives and the predicted conditions of operation of the vehicle; and wherein data from data sources available to the computing system for configuration of the battery system of the vehicle comprise at least data relating to (a) the vehicle, (b) a duty to be performed by the vehicle, (c) conditions of operation of the vehicle, and (d) battery modules of the battery system;
   wherein data relating to a battery module of the battery system comprises at least data relating to (a) identity of the battery module; (b) type of the battery module; (c) status of the battery module;
   so that configuration of the battery system of the vehicle is based on data and information available from data sources including at least one data source on the vehicle; and
   wherein the recommended configuration of interchangeable battery modules of the battery system includes instructions for including at least two different specific interchangeable battery modules with different performance characteristics in the battery system.

17. The system of claim 16, wherein the predictive controller is configured to predict the conditions of operation of the vehicle based on at least one of a driver identity, an anticipated duty of the vehicle, an anticipated use of the vehicle, a location of the vehicle, a route of the vehicle, a time of day, traffic conditions, weather conditions, an operation regulation, an operation restriction, local fuel availability information, local fuel cost information, grade information corresponding to a route, and/or topographical information.

18. A method of configuring a battery system in a vehicle having vehicle systems, the battery system having battery modules, the method comprising:
   (a) obtaining, by a processor, data relating to the vehicle in data categories from data sources;
   (b) determining a route and duty;
   (c) determining, using the processor, the configuration of vehicle systems;
   (d) evaluating, using a predictive controller, data to predict anticipated conditions for the route and duty, wherein the predictive controller is in communication with the processor and is configured to manage operation of the battery system based on the predicted anticipated conditions;
   (e) determining, using the processor, a recommended configuration of the battery system based on data for operation of the vehicle and vehicle systems including at least the predicted anticipated conditions;
   wherein the recommended configuration comprises instructions regarding the type and number of at least two different battery modules to be installed in the battery system of the vehicle.

19. The method of claim 18 wherein further comprising the steps of:
   configuring the battery system of the vehicle;
   operating the vehicle; and
   monitoring, using the processor, the operation of the vehicle.

20. The method of claim 19 further comprising the step of reconfiguring the vehicle.

21. The method of claim 18 wherein further comprising the steps of (e1) comparing, using the processor, route and duty information with a set of recommended uses of the battery module; (e2) determining the recommended configuration of the battery system based on the recommended use of the battery module.

22. The method of claim 18 wherein the battery system comprises a battery pack comprising a set of battery modules, and wherein the data sources comprise a data model of anticipated performance of each battery module.

23. The method of claim 18 further comprising the step of providing a report and recommendation for the battery system using the processor.

24. The method of claim 18 further comprising the step of overriding the recommended configuration of the vehicle.

25. The method of claim 18 further comprising the step of assessing a status of vehicle systems using the processor.

26. The method of claim 18 further comprising the step of modifying the route or duty.

27. The method of claim 18 further comprising the step of providing a modified plan for operation using the processor.

28. The method of claim 18 further comprising the step of obtaining data from a network using a network connection.

29. An energy storage system for a vehicle comprising:
   a pack comprising a set of interchangeable modules for energy storage, the pack configured to provide power to the vehicle;
   wherein each module in the pack comprises:
   an identifier; and
   at least one specified characteristic;
   wherein the pack can be selectively configured by selection and installation of at least two different individual modules that each provide a characteristic so that the pack provides a composite characteristic based on a combination of characteristics of each module in the set of modules,
   wherein the characteristic includes at least one of a battery type, a phase of operation, a battery cell chemistry, a battery module cost or warranty information, and
   wherein the energy system is configured to be coupled to a predictive controller and operate based on predicted conditions of operation determined by the predictive controller.

30. The system of claim 29, wherein the predictive controller is configured to predict the conditions of operation based on at least one of a driver identity, an anticipated duty of the vehicle, an anticipated use of the vehicle, a location of the vehicle, a route of the vehicle, a time of day, traffic conditions, weather conditions, an operation regulation, an operation restriction, local fuel availability information, local fuel cost information, grade information corresponding to a route, and/or topographical information.

* * * * *